(12) United States Patent
Zhang et al.

(10) Patent No.: US 12,724,523 B2
(45) Date of Patent: Sep. 1, 2026

(54) INFORMATION DISPLAY METHOD AND ELECTRONIC DEVICE

(71) Applicant: Honor Device Co., Ltd., Shenzhen (CN)

(72) Inventors: Taolin Zhang, Shenzhen (CN); Jiazi Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 442 days.

(21) Appl. No.: 18/546,712

(22) PCT Filed: May 25, 2022

(86) PCT No.: PCT/CN2022/094883
§ 371 (c)(1),
(2) Date: Aug. 16, 2023

(87) PCT Pub. No.: WO2023/016045
PCT Pub. Date: Feb. 16, 2023

(65) Prior Publication Data

US 2024/0126404 A1 Apr. 18, 2024

(30) Foreign Application Priority Data

Aug. 12, 2021 (CN) ........................ 202110927122.5

(51) Int. Cl.
*G06F 3/0481* (2022.01)
*G06F 3/04845* (2022.01)

(52) U.S. Cl.
CPC ........ *G06F 3/0481* (2013.01); *G06F 3/04845* (2013.01)

(58) Field of Classification Search
CPC .... G06F 3/0481; G06F 3/0482; G06F 3/0483; G06F 3/0484; G06F 3/04842;
(Continued)

(56) References Cited

U.S. PATENT DOCUMENTS 7,289,772 B1 10/2007 Bonansea et al.
10,345,986 B1 * 7/2019 No ...................... G06F 3/04845
(Continued)

FOREIGN PATENT DOCUMENTS

CN 107395868 A 11/2017
CN 109213402 A 1/2019
(Continued)

*Primary Examiner* — Daniel Samwel
(74) *Attorney, Agent, or Firm* — Conley Rose, P.C.

(57) ABSTRACT

This application discloses an information display method. In the method, when the electronic device detects that a current location is within a travel station area range, an electronic device displays a display window in a first shape in a content display area, and displays critical information of a transport code-related application in the display window in the first shape, where the critical information of the transport code-related application includes an icon and station information of the transport code-related application and reminding information about opening the transport code-related application; and in response to an operation of dragging the display window in the first shape displayed in the content display area to a status bar, the electronic device displays a capsule-shaped display window in the status bar, and displays identification information of the transport code-related application in the capsule-shaped display window.

20 Claims, 58 Drawing Sheets

(58) Field of Classification Search

CPC ............. G06F 3/04845; G06F 3/04847; G06F 3/0485; G06F 3/04855; G06F 3/0486; G06F 3/0488

See application file for complete search history.

(56) References Cited

U.S. PATENT DOCUMENTS

| | | | | |
|---|---|---|---|---|
| 2007/0245256 | A1 | 10/2007 | Boss et al. | |
| 2009/0228820 | A1 | 9/2009 | Kim et al. | |
| 2014/0058860 | A1 | 2/2014 | Roh et al. | |
| 2014/0095227 | A1* | 4/2014 | Parker | G07B 15/00 705/5 |
| 2014/0129302 | A1 | 5/2014 | Amin et al. | |
| 2014/0359436 | A1 | 12/2014 | Kim et al. | |
| 2015/0012878 | A1* | 1/2015 | Chen | G06F 3/0486 715/788 |
| 2016/0260086 | A1 | 9/2016 | Cho et al. | |
| 2016/0309321 | A1 | 10/2016 | Song et al. | |
| 2017/0054670 | A1* | 2/2017 | Lee | H04M 1/72436 |
| 2018/0034985 | A1* | 2/2018 | Dandoko | H04N 1/00411 |
| 2018/0068313 | A1 | 3/2018 | Van Os et al. | |
| 2018/0260742 | A1* | 9/2018 | Li | G06K 19/06028 |
| 2019/0230215 | A1* | 7/2019 | Zhu | H04M 1/724634 |
| 2022/0214743 | A1* | 7/2022 | Dascola | G06F 3/017 |
| 2022/0269405 | A1 | 8/2022 | Wu et al. | |
| 2023/0117161 | A1 | 4/2023 | Han | |

FOREIGN PATENT DOCUMENTS

| | | | |
|---|---|---|---|
| CN | 109614025 | A | 4/2019 |
| CN | 110489043 | A | 11/2019 |
| CN | 111966439 | A | 11/2020 |
| CN | 112114722 | A | 12/2020 |
| CN | 112306440 | A | 2/2021 |
| CN | 113791850 | A | 12/2021 |
| CN | 114466102 | A | 5/2022 |
| EP | 3065098 | A1 | 9/2016 |
| EP | 3082030 | A1 | 10/2016 |
| WO | 2021018067 | A1 | 2/2021 |

* cited by examiner

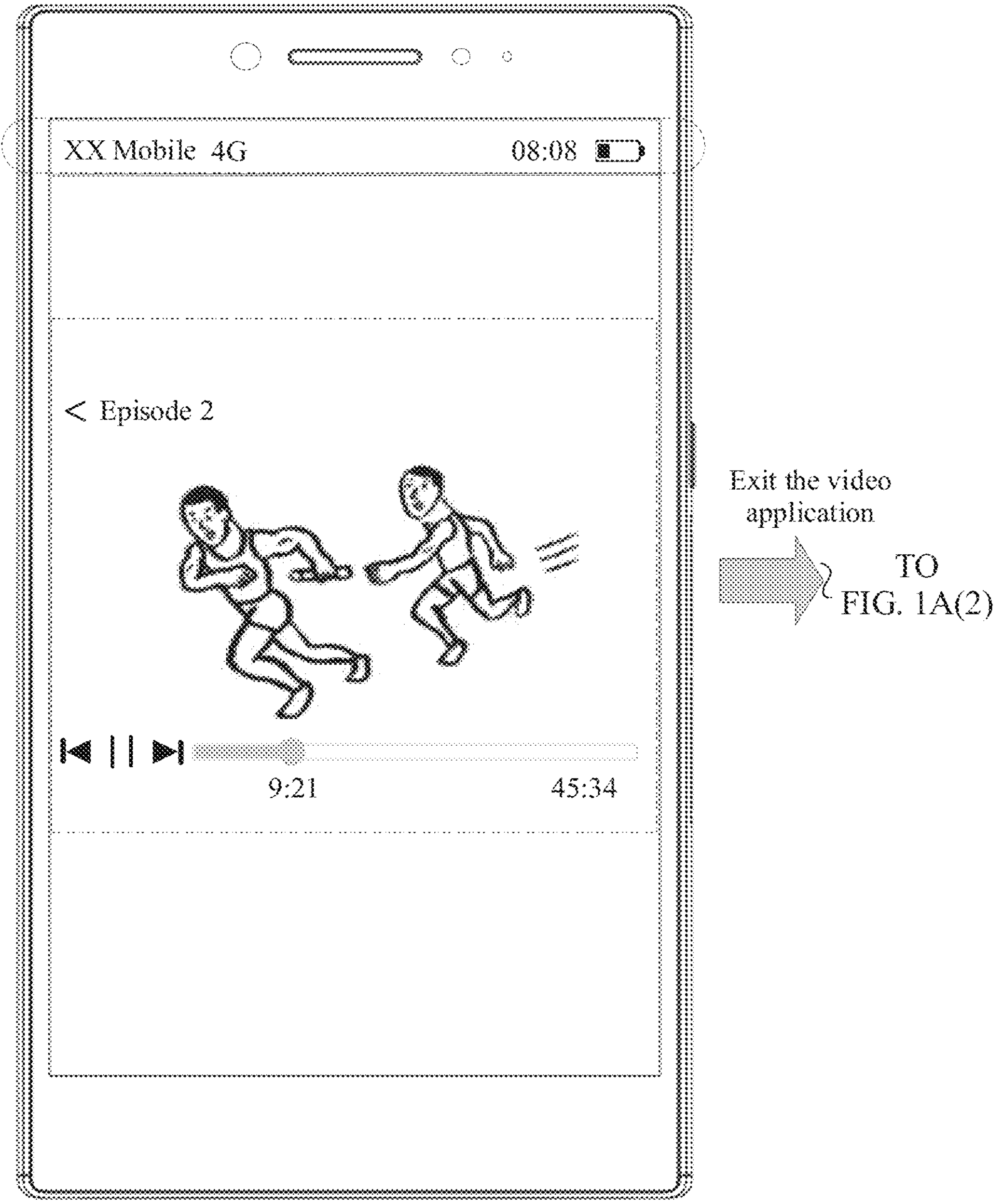
FIG. 1A(1)

CONT. FROM FIG. 1A(1)
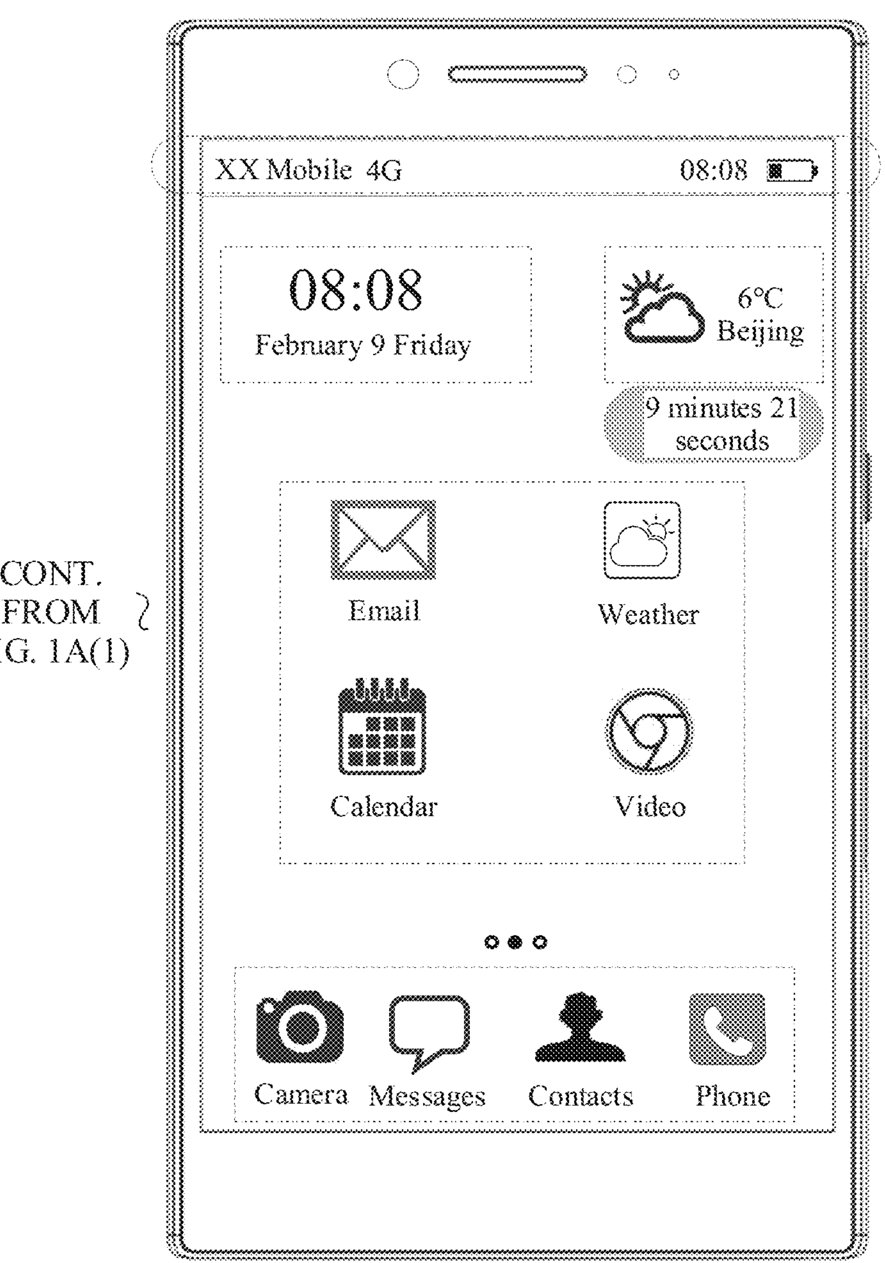
FIG. 1A(2)

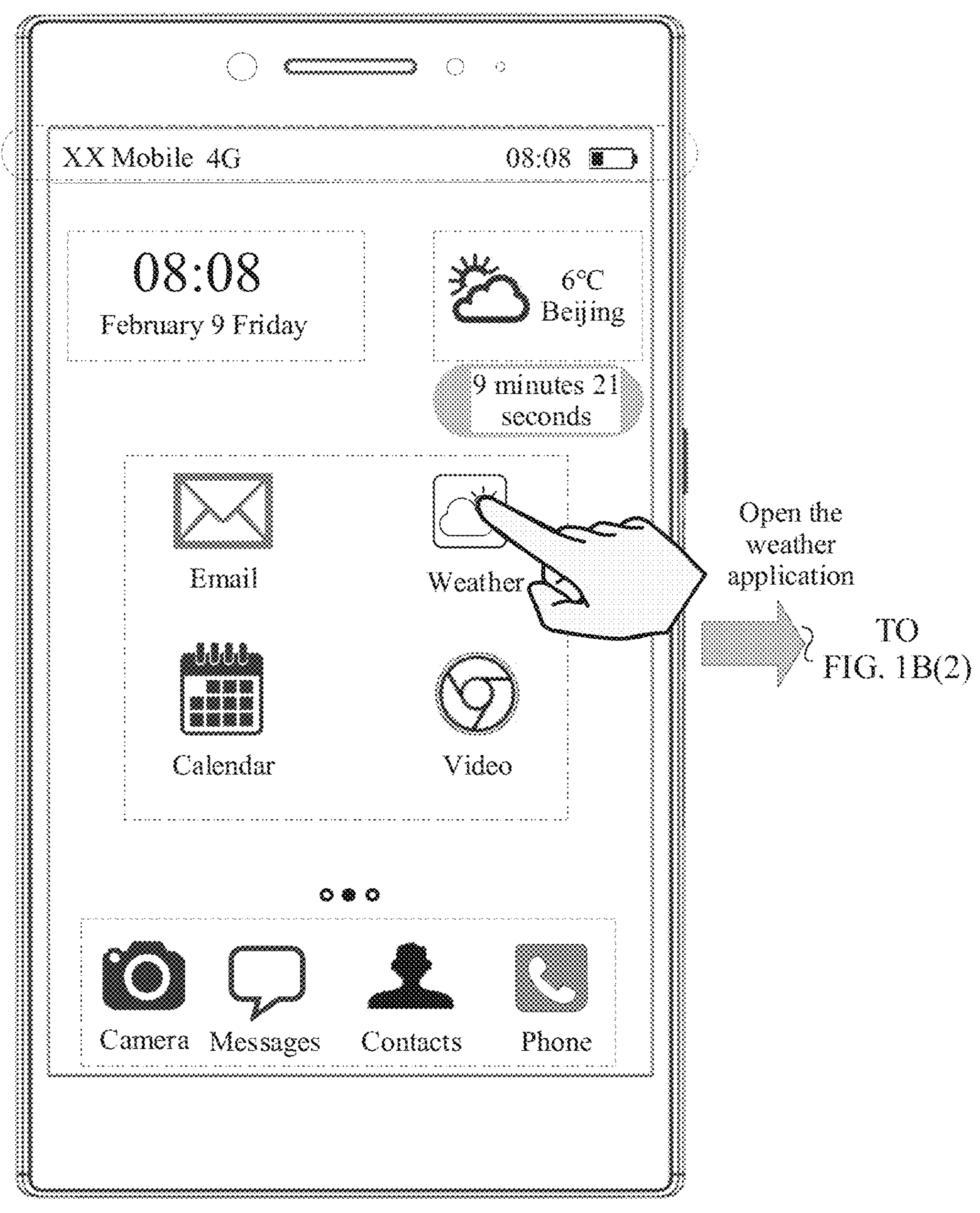
FIG. 1B(1)

CONT. FROM FIG. 1B(1)
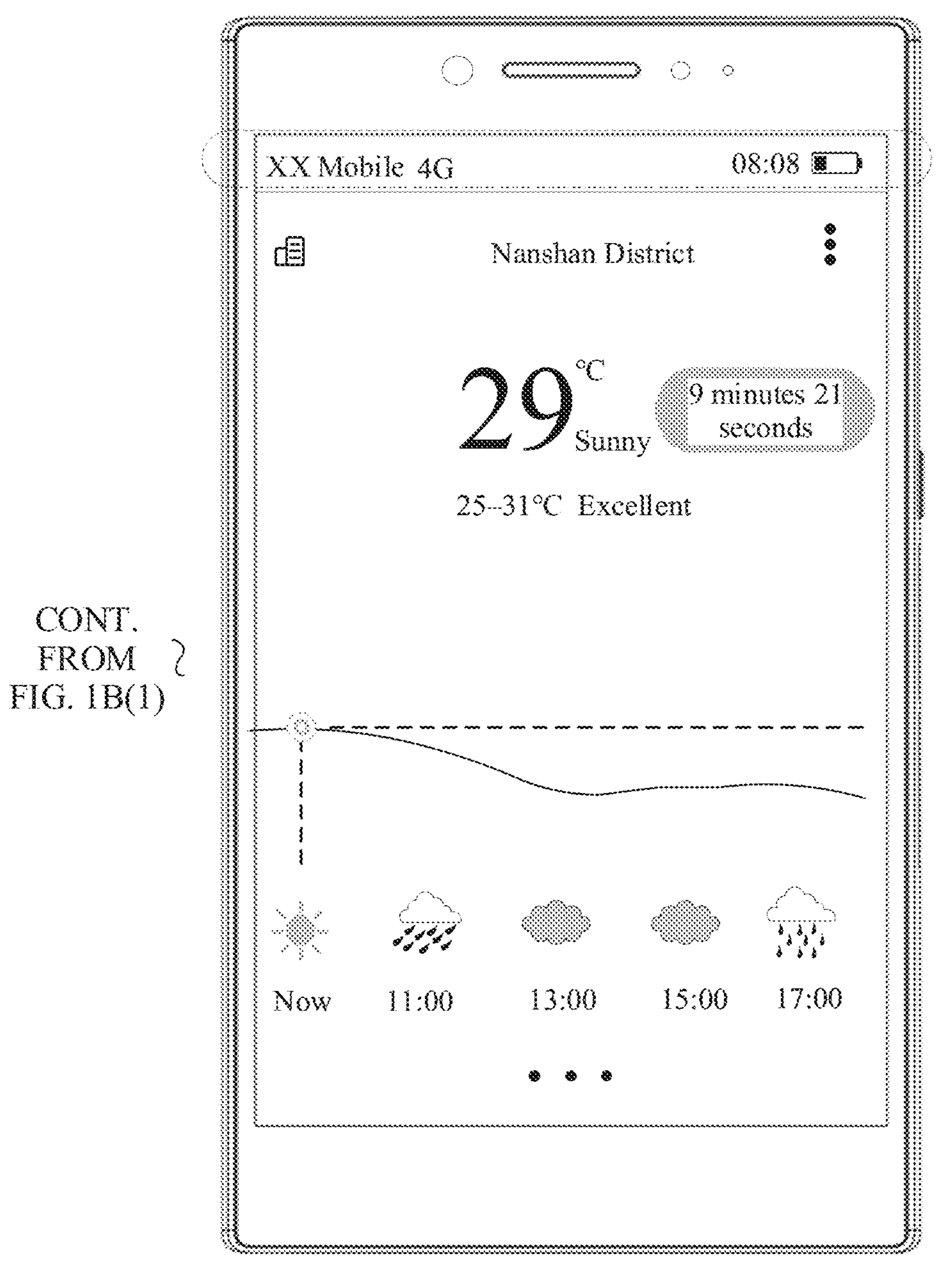
FIG. 1B(2)

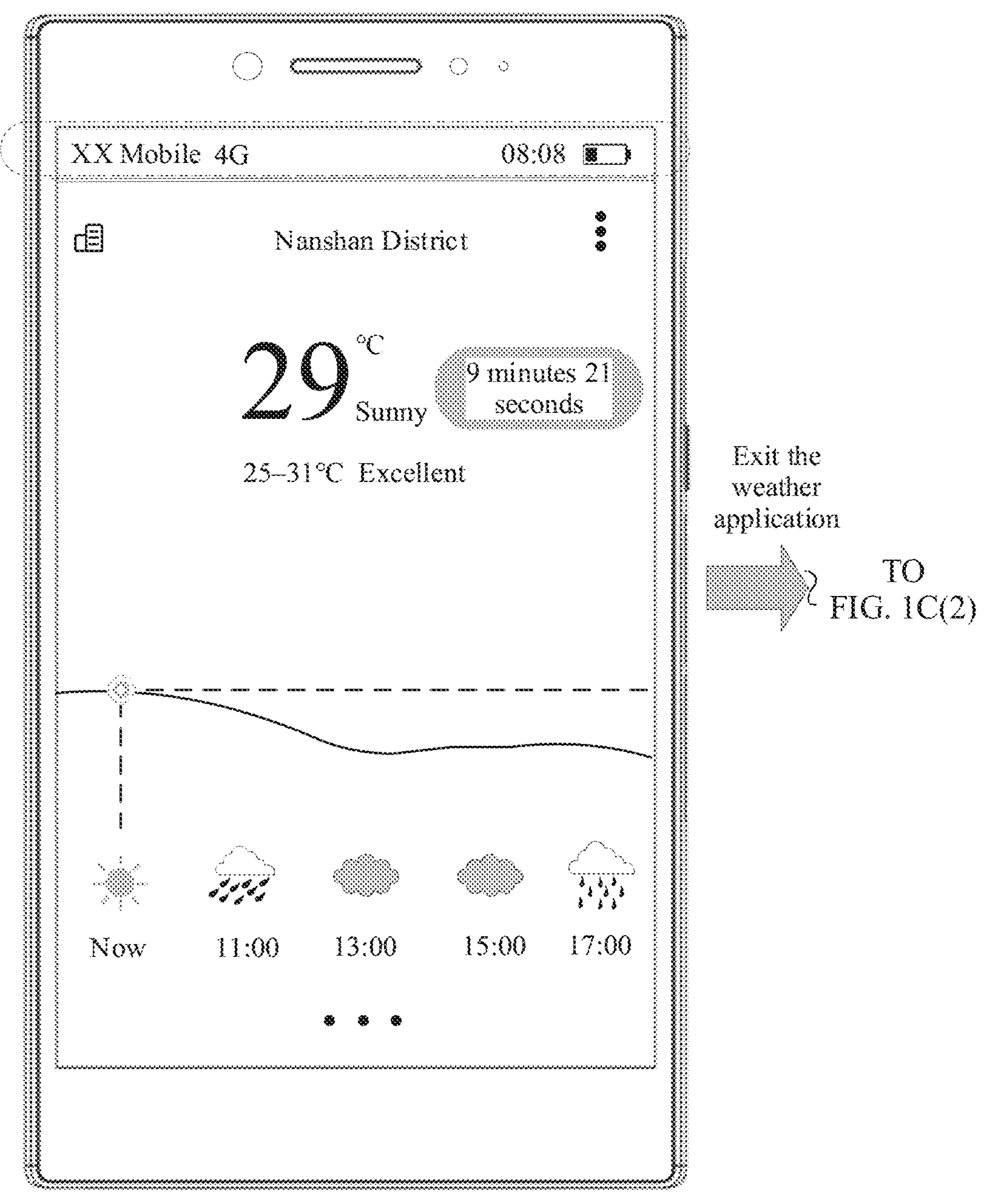
FIG. 1C(1)

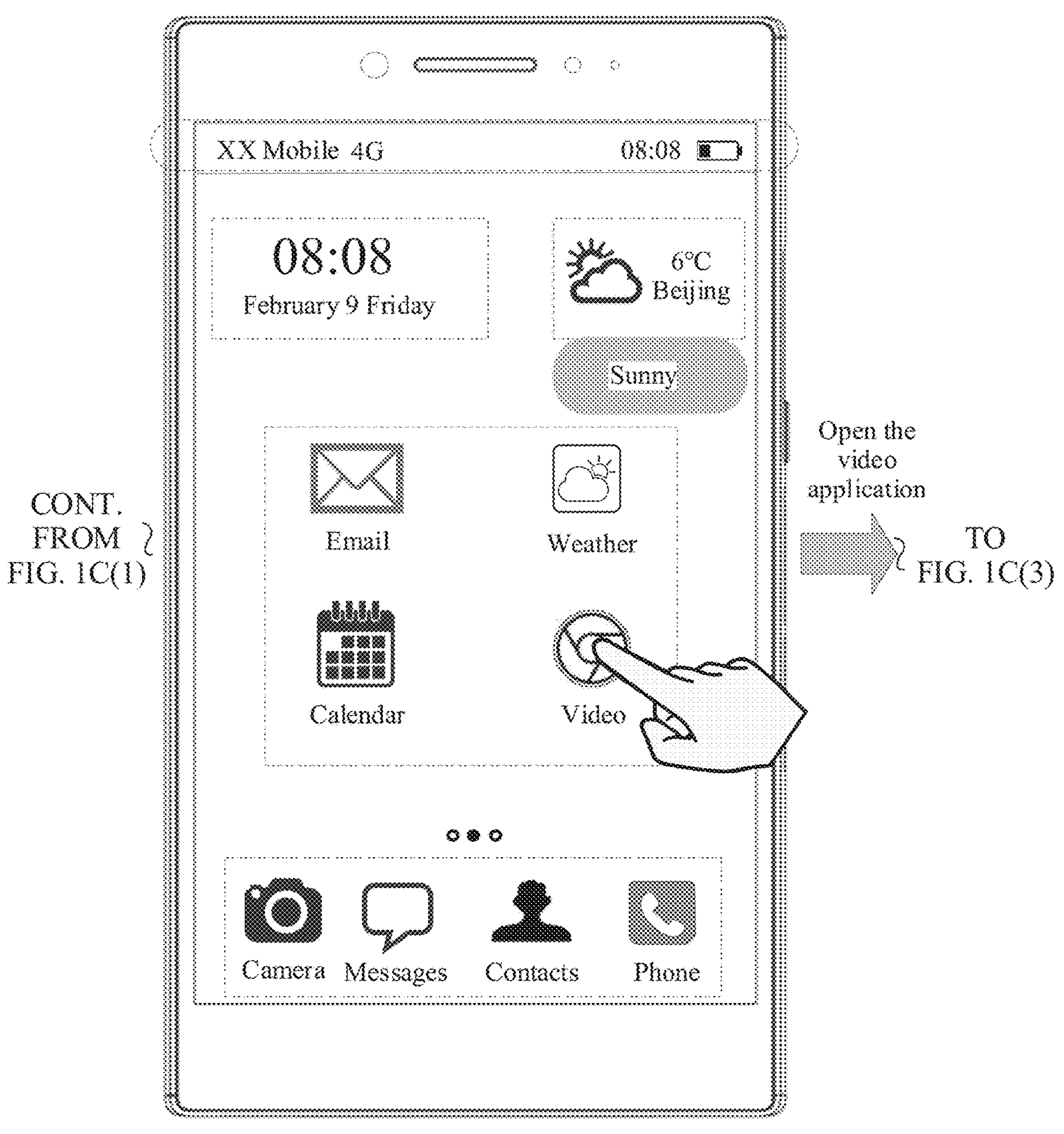
FIG. 1C(2)

CONT. FROM FIG. 1C(2)
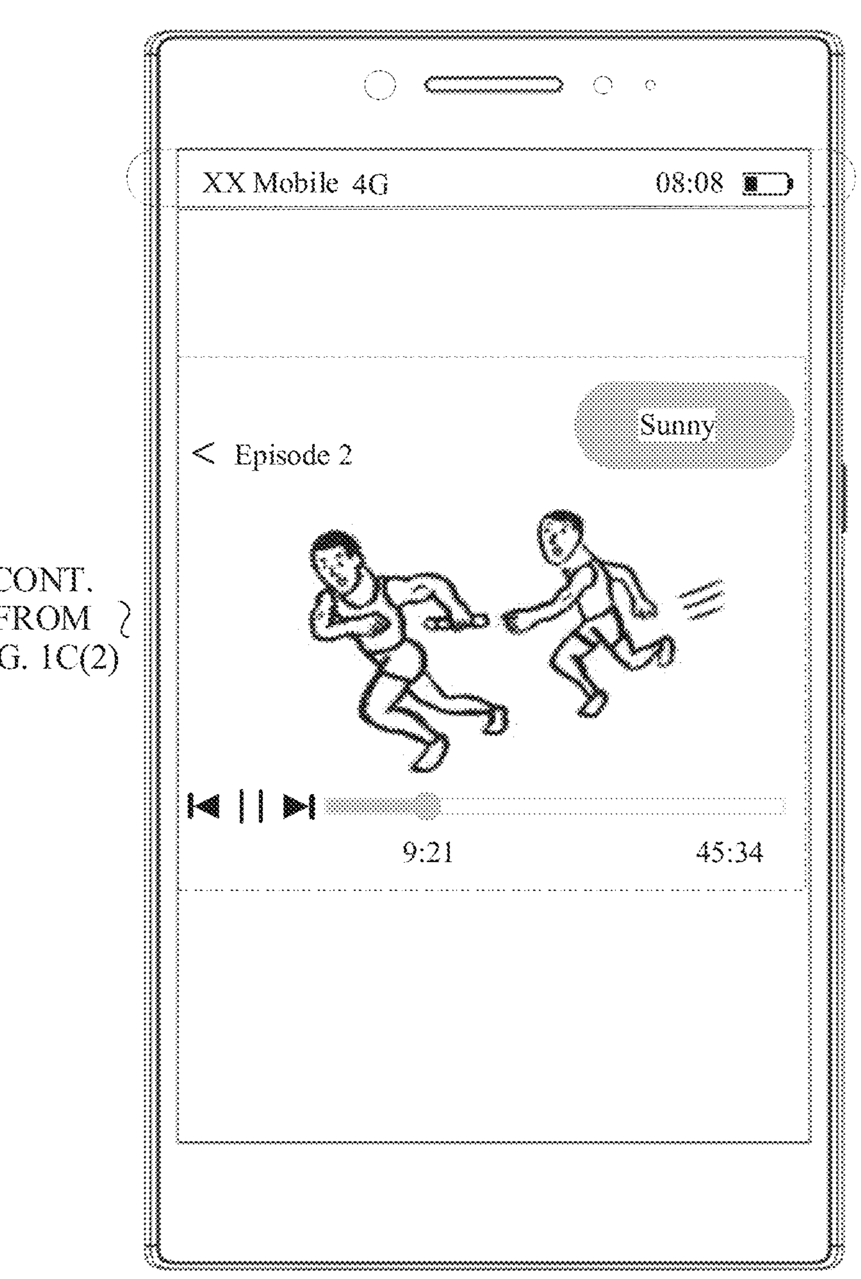
FIG. 1C(3)

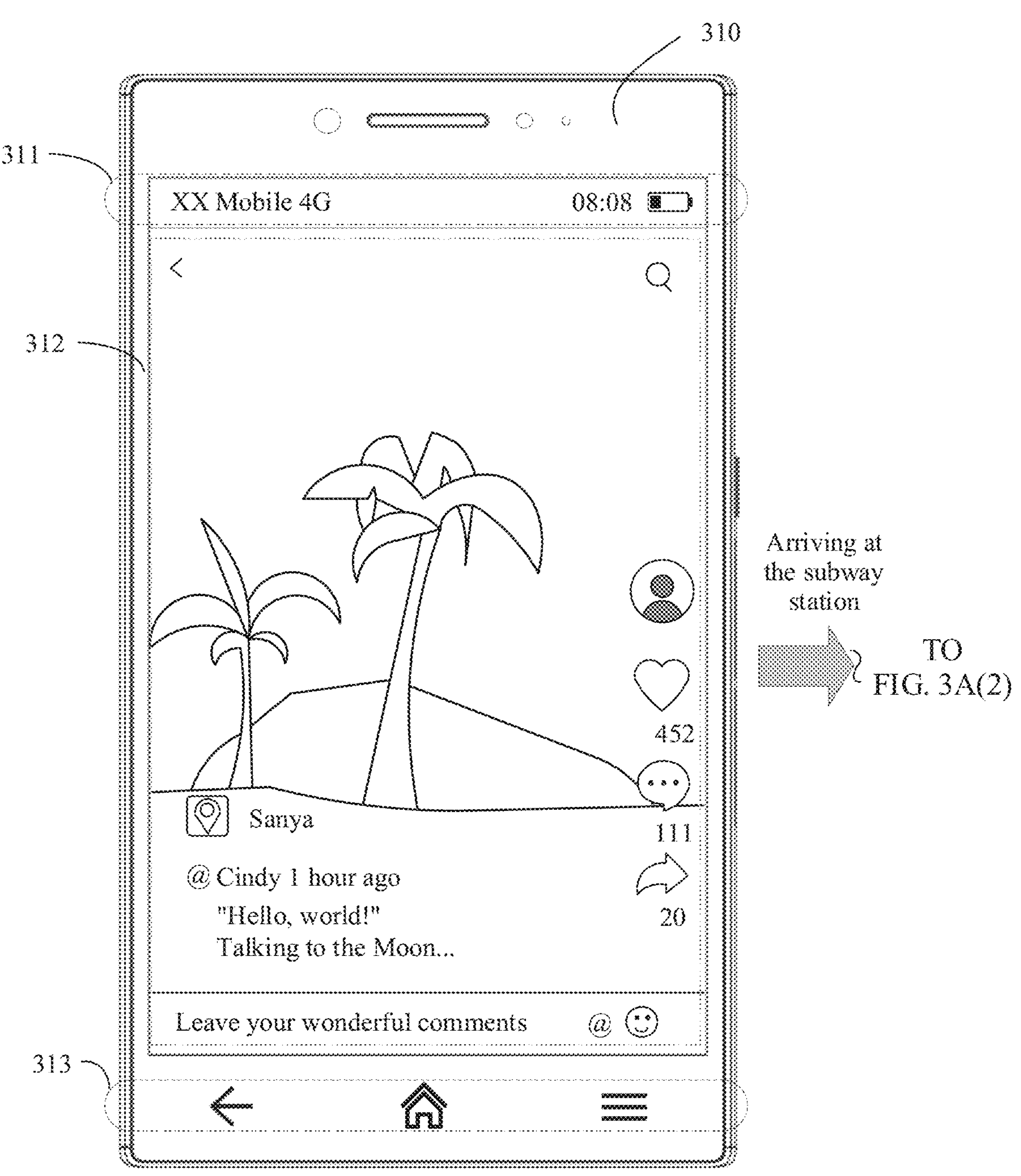
FIG. 3A(1)

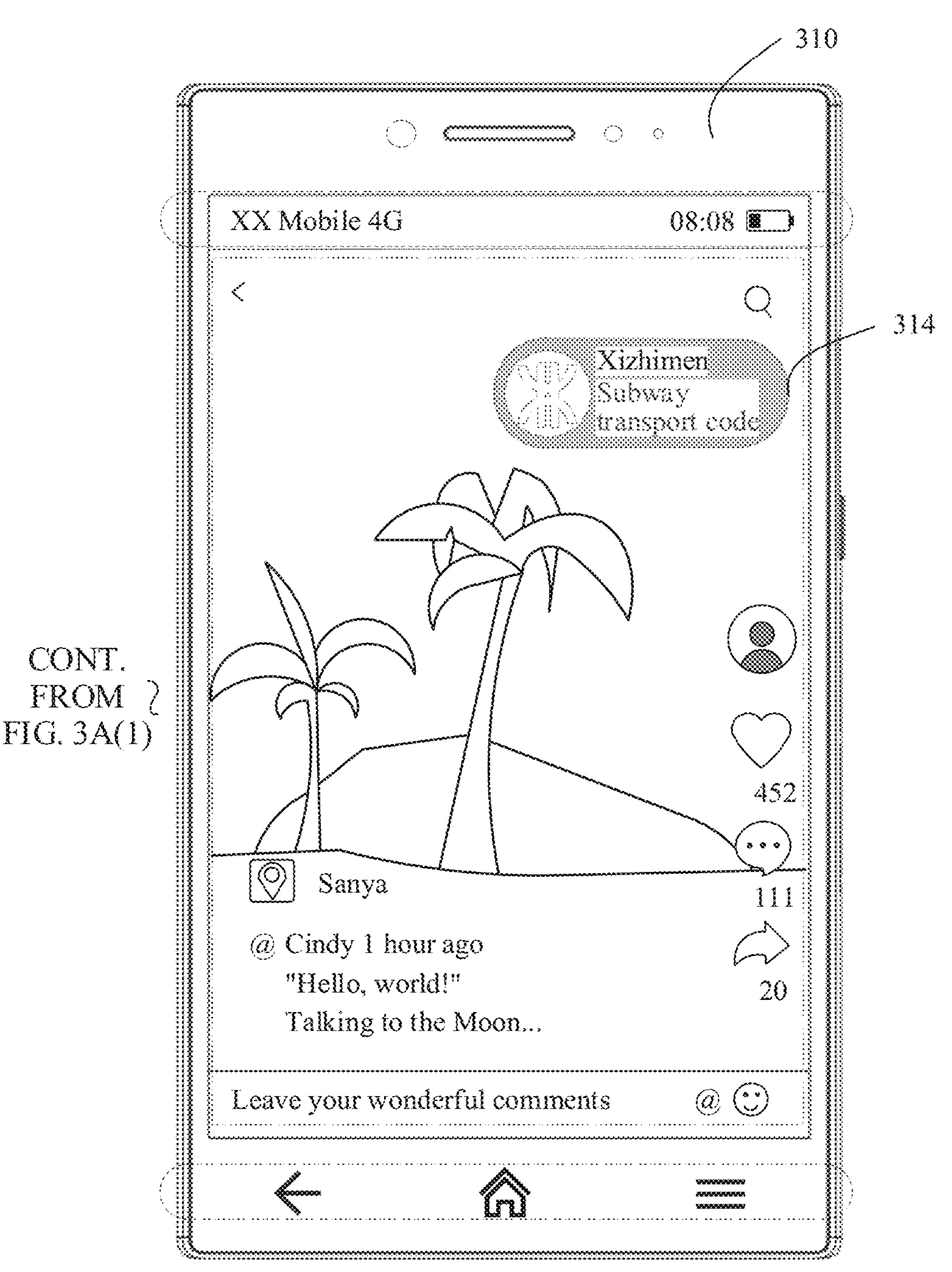
FIG. 3A(2)

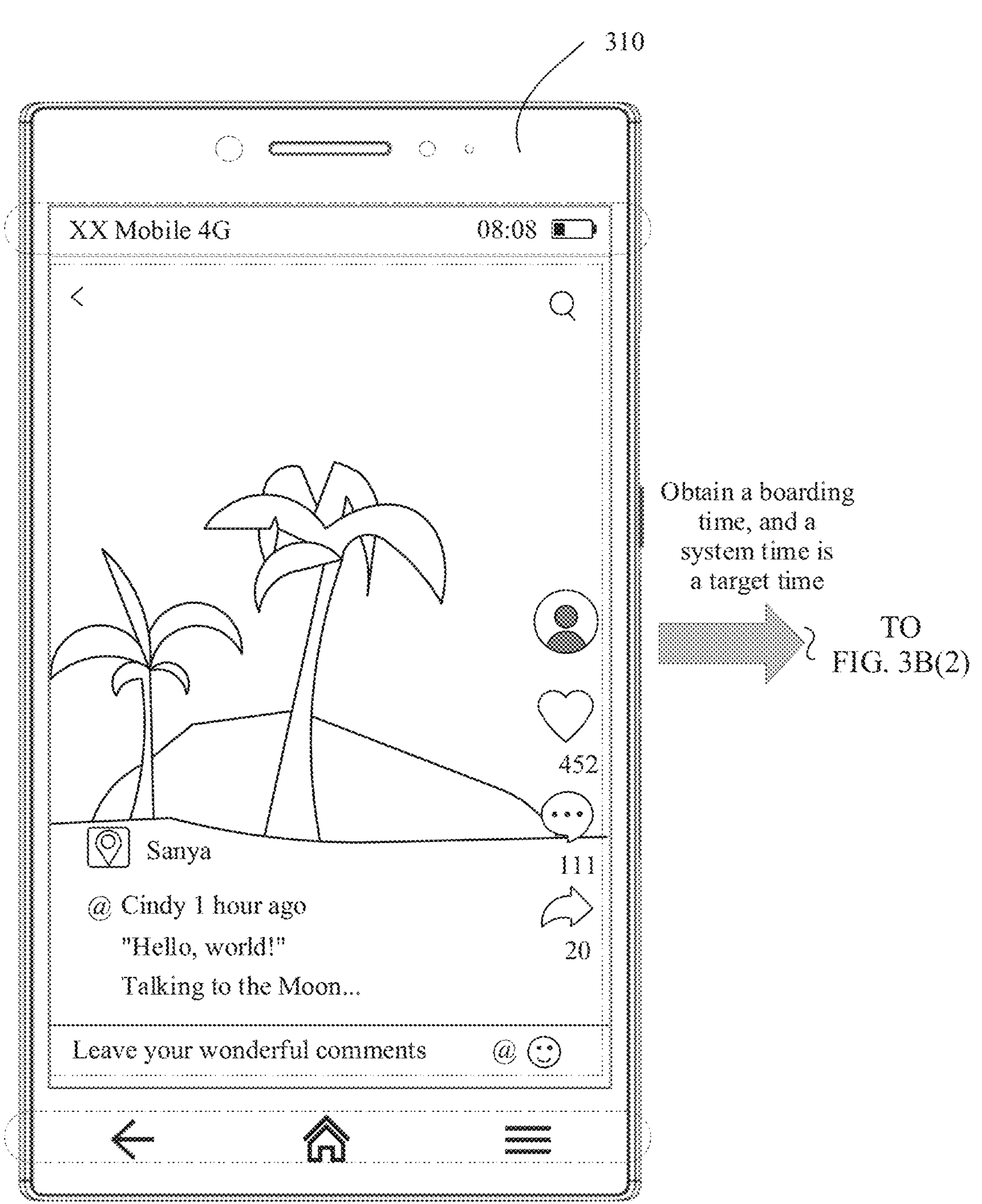
FIG. 3B(1)

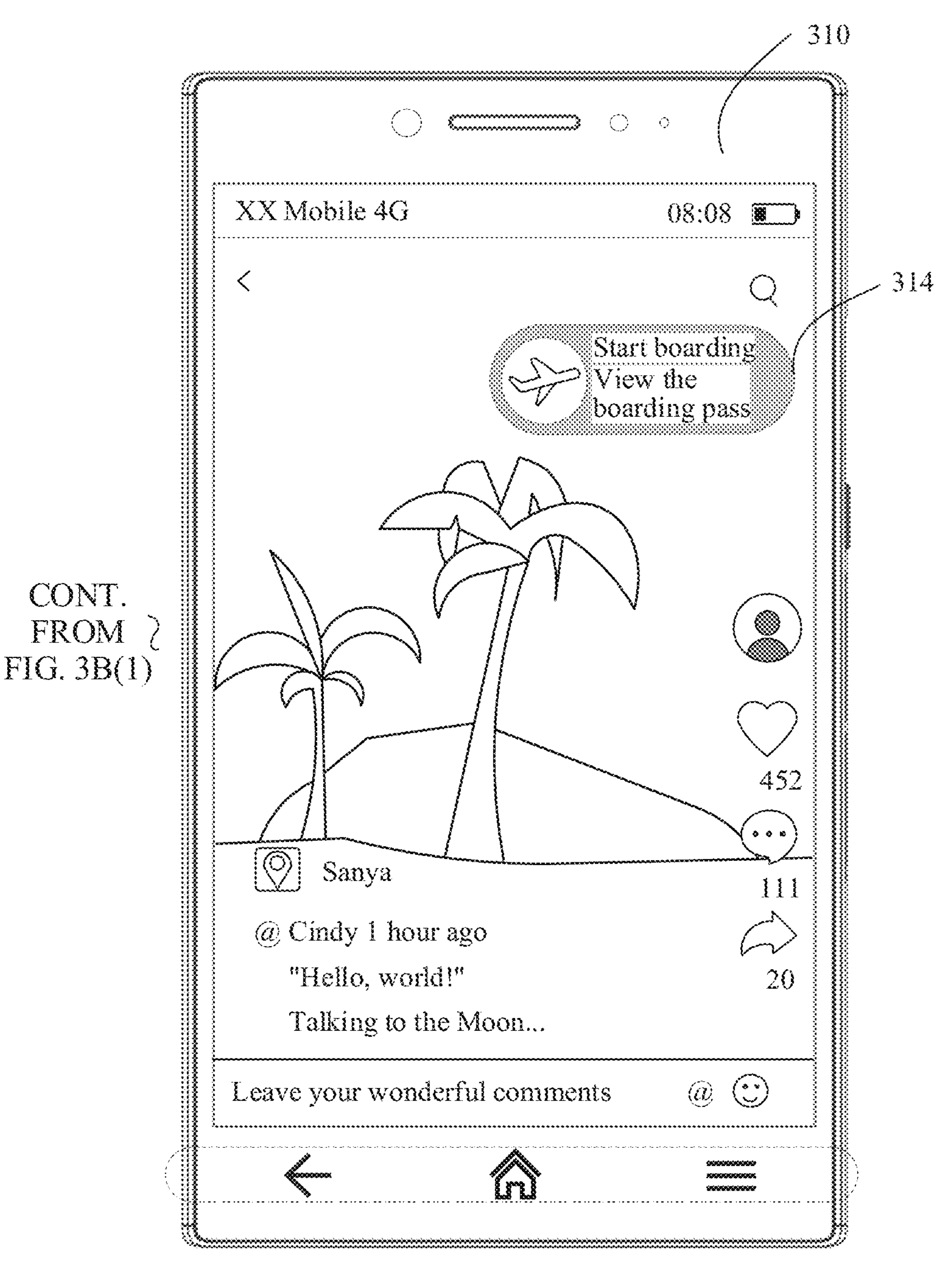
FIG. 3B(2)

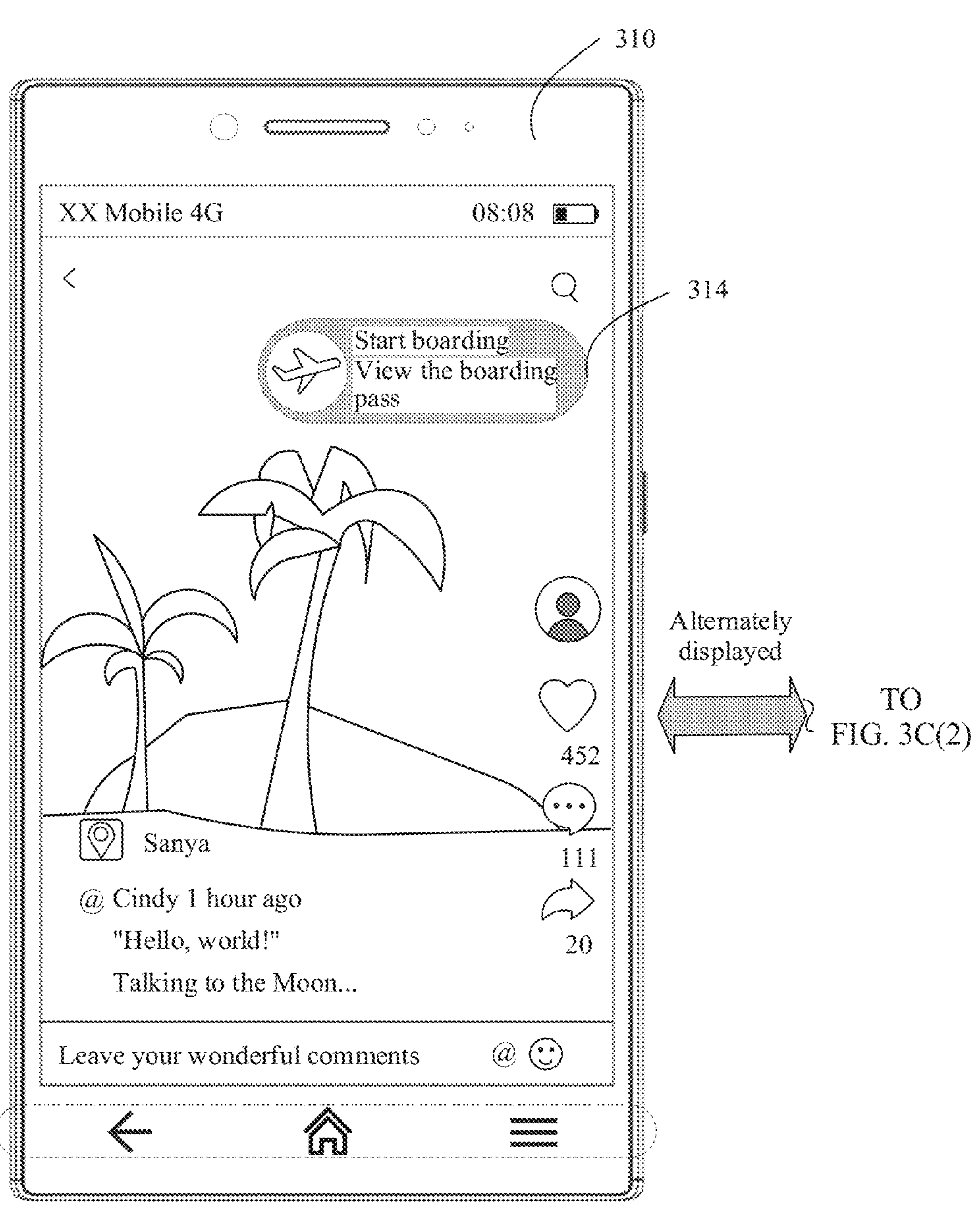
FIG. 3C(1)

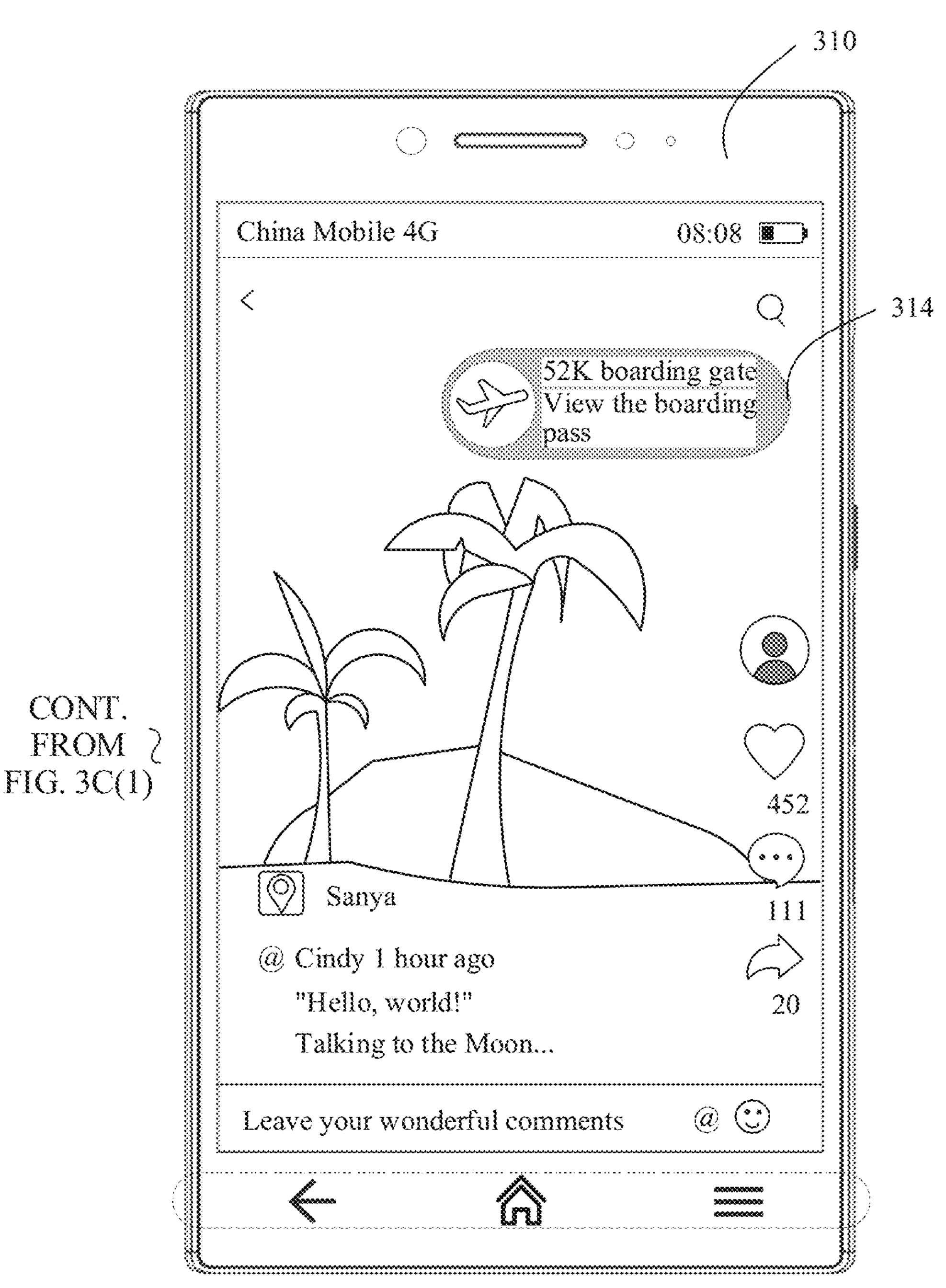
FIG. 3C(2)

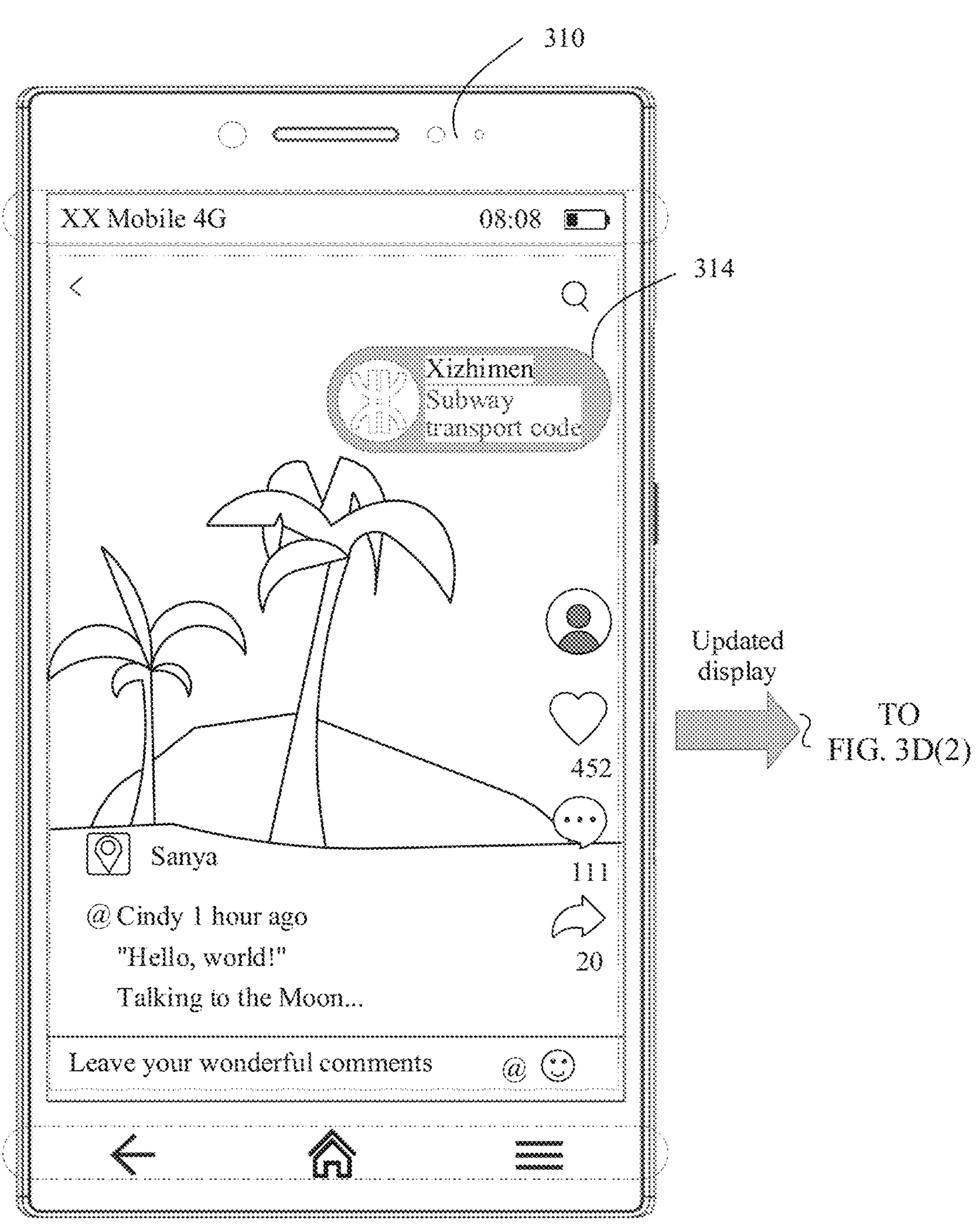
FIG. 3D(1)

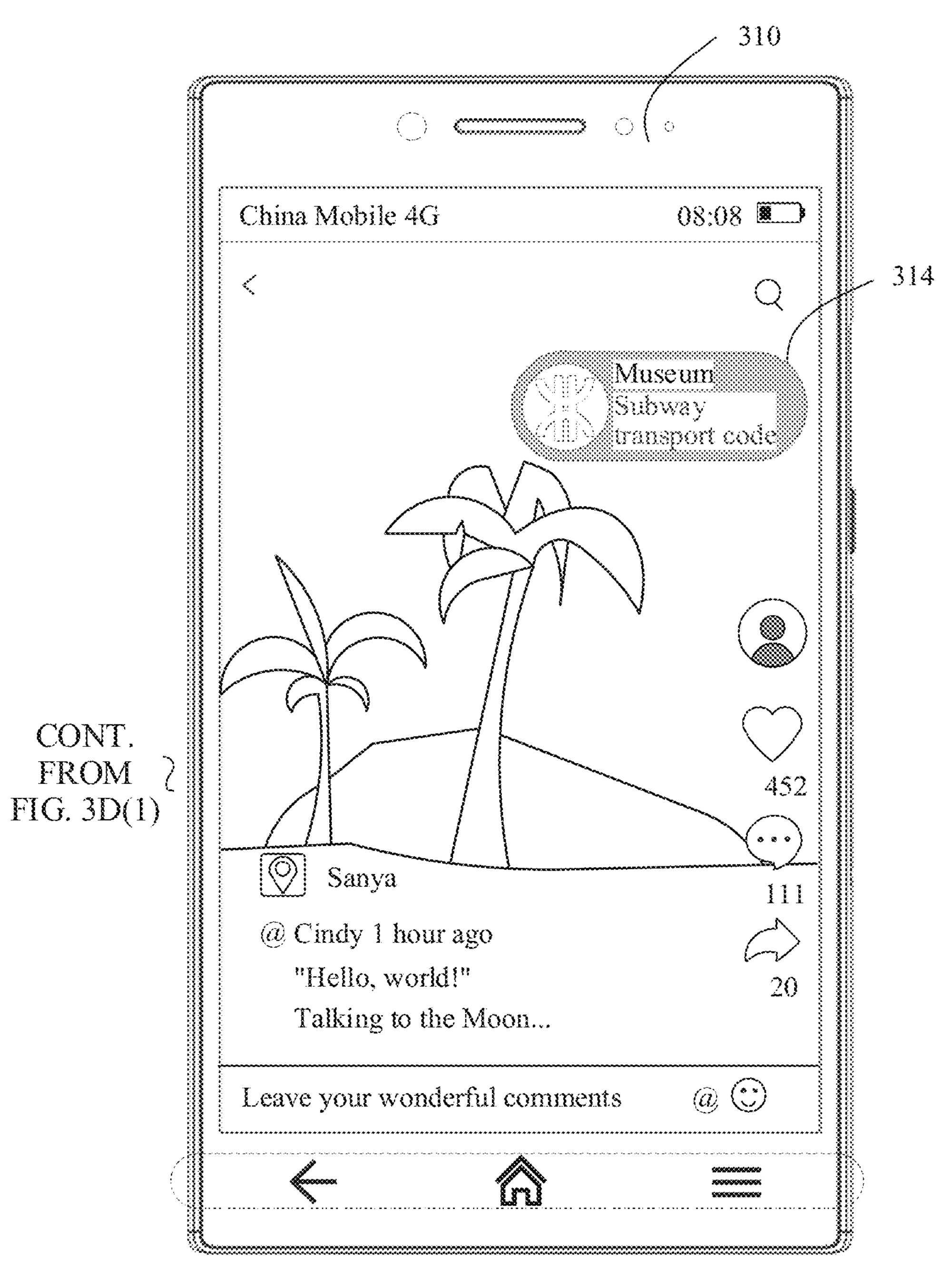
FIG. 3D(2)

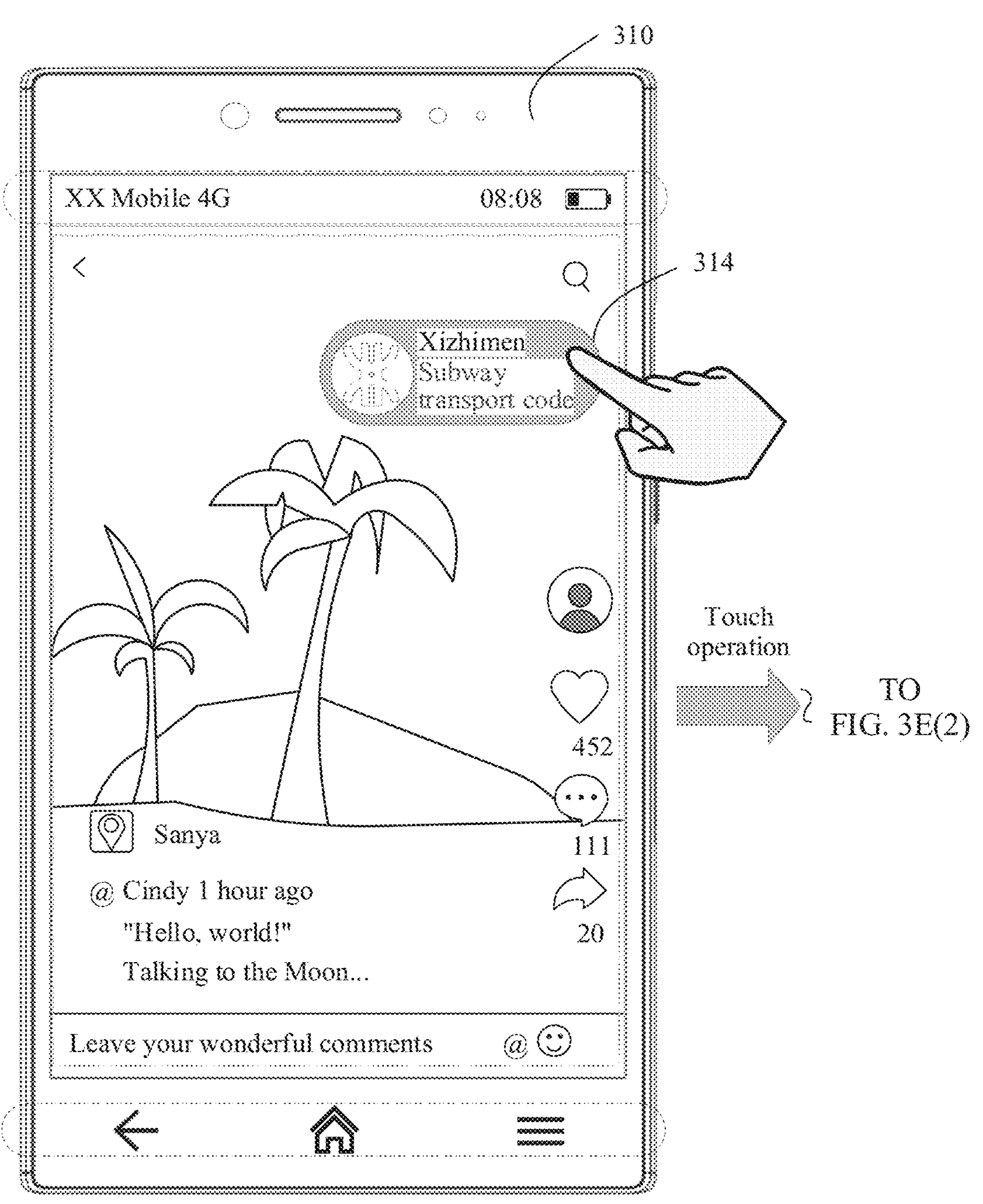
FIG. 3E(1)

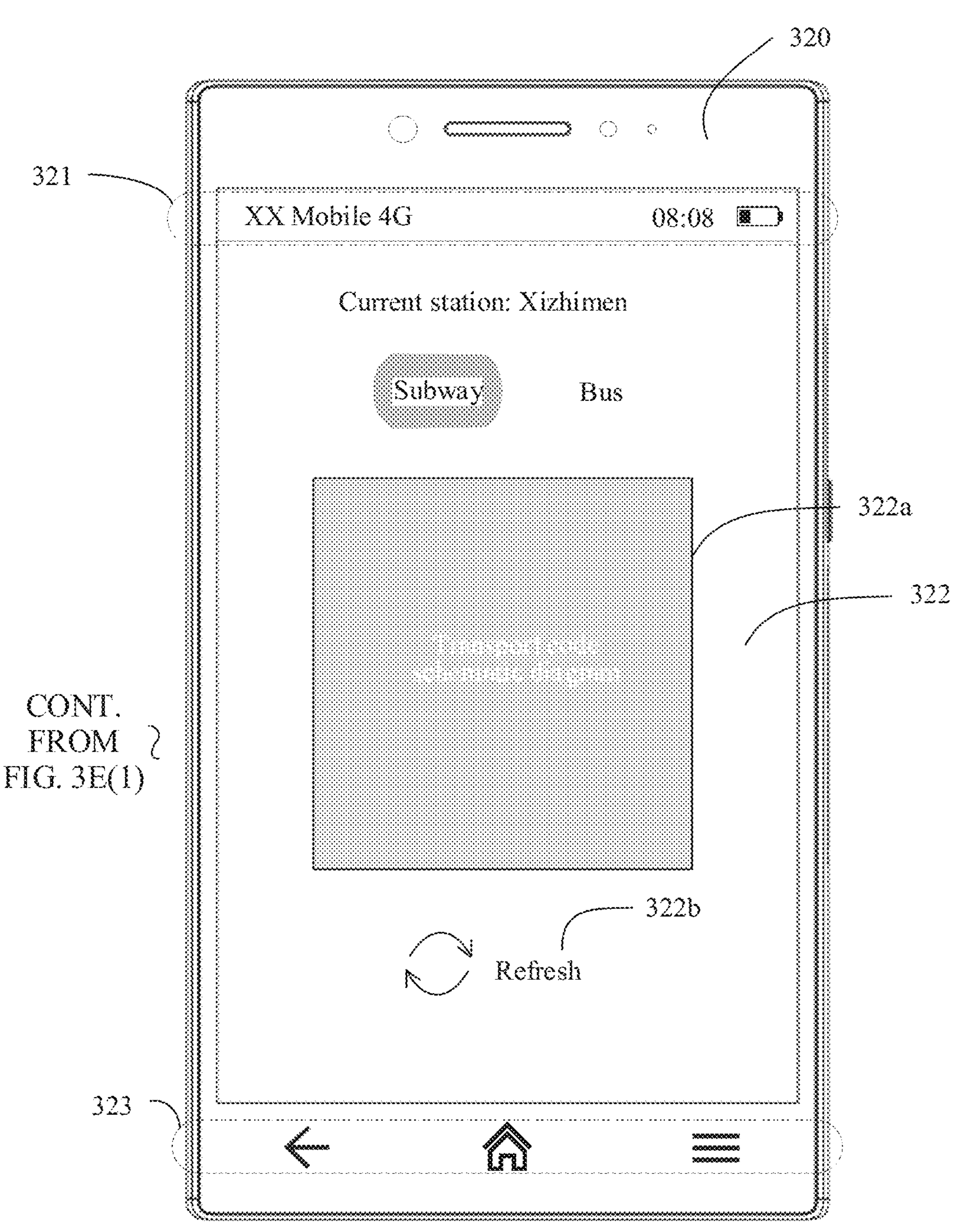
CONT. FROM FIG. 3E(1)
FIG. 3E(2)

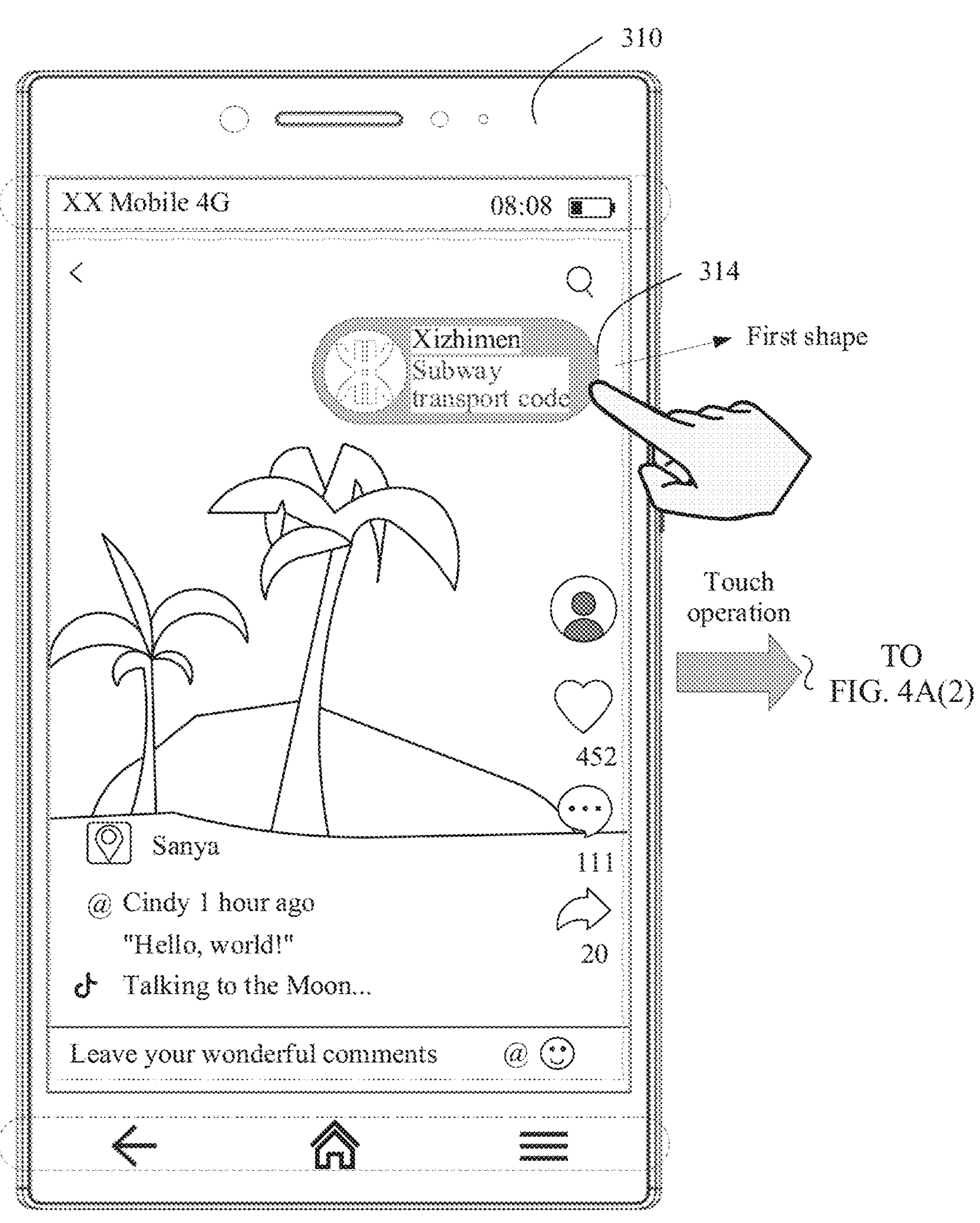
FIG. 4A(1)

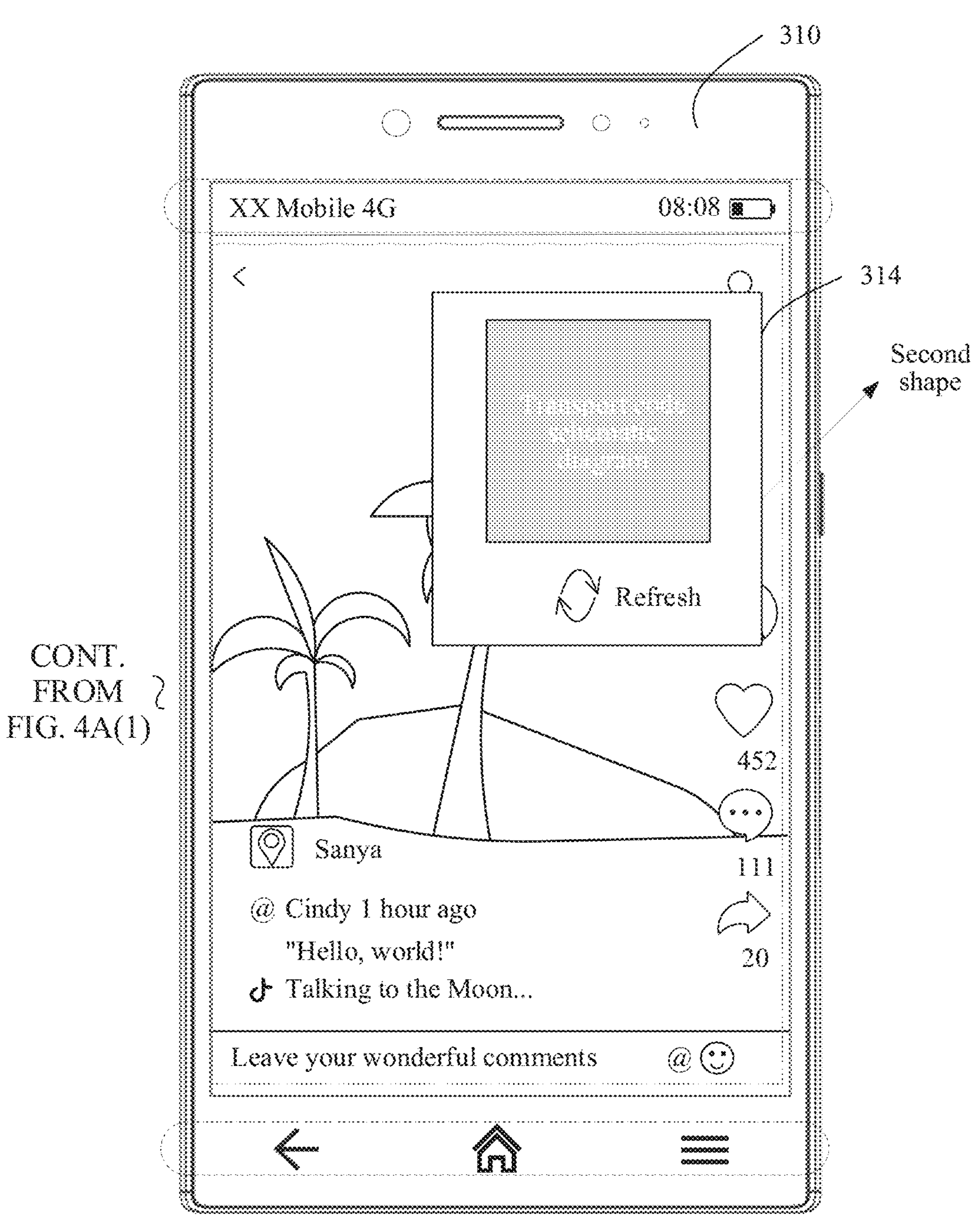
CONT. FROM FIG. 4A(1)
FIG. 4A(2)

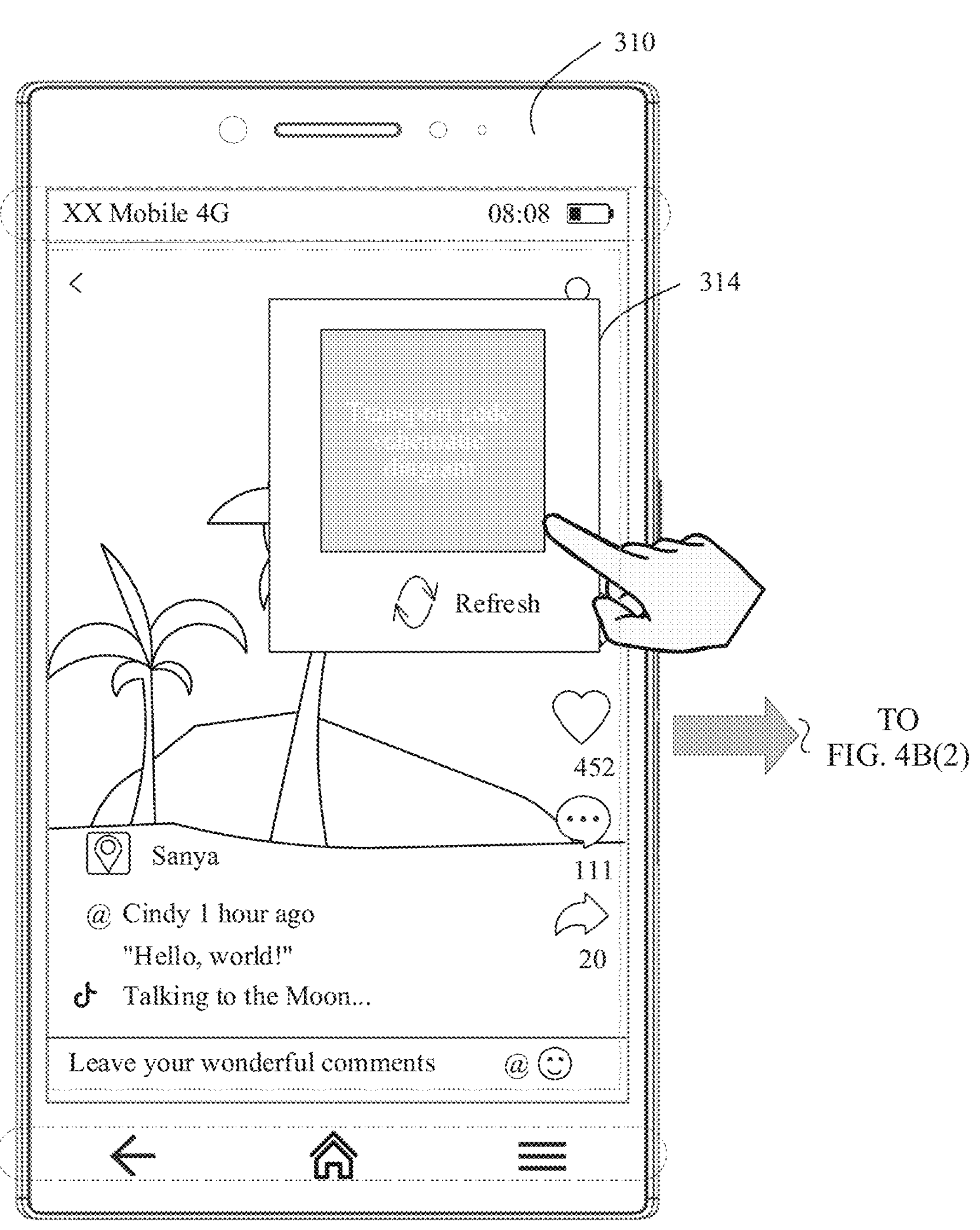
FIG. 4B(1)

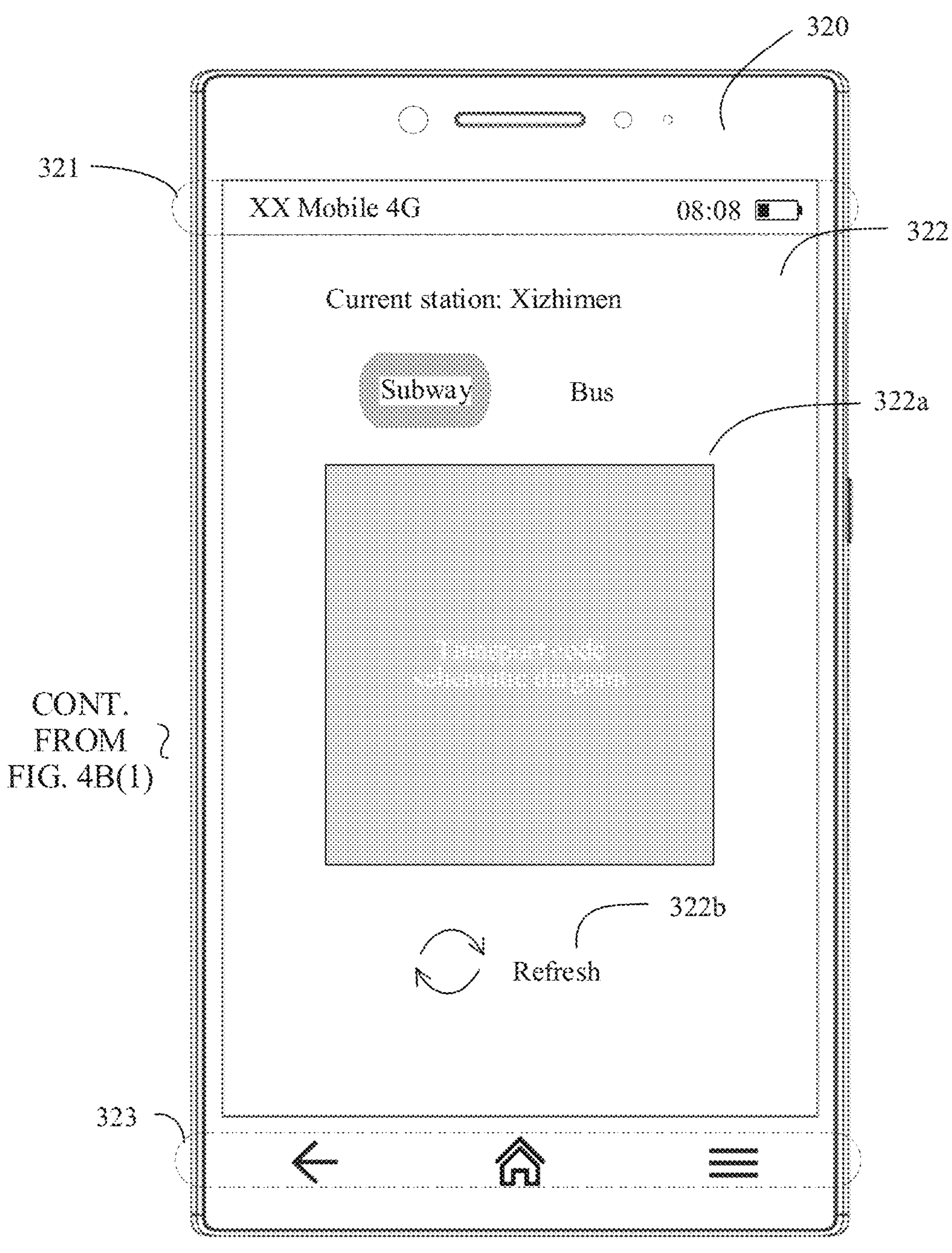
FIG. 4B(2)

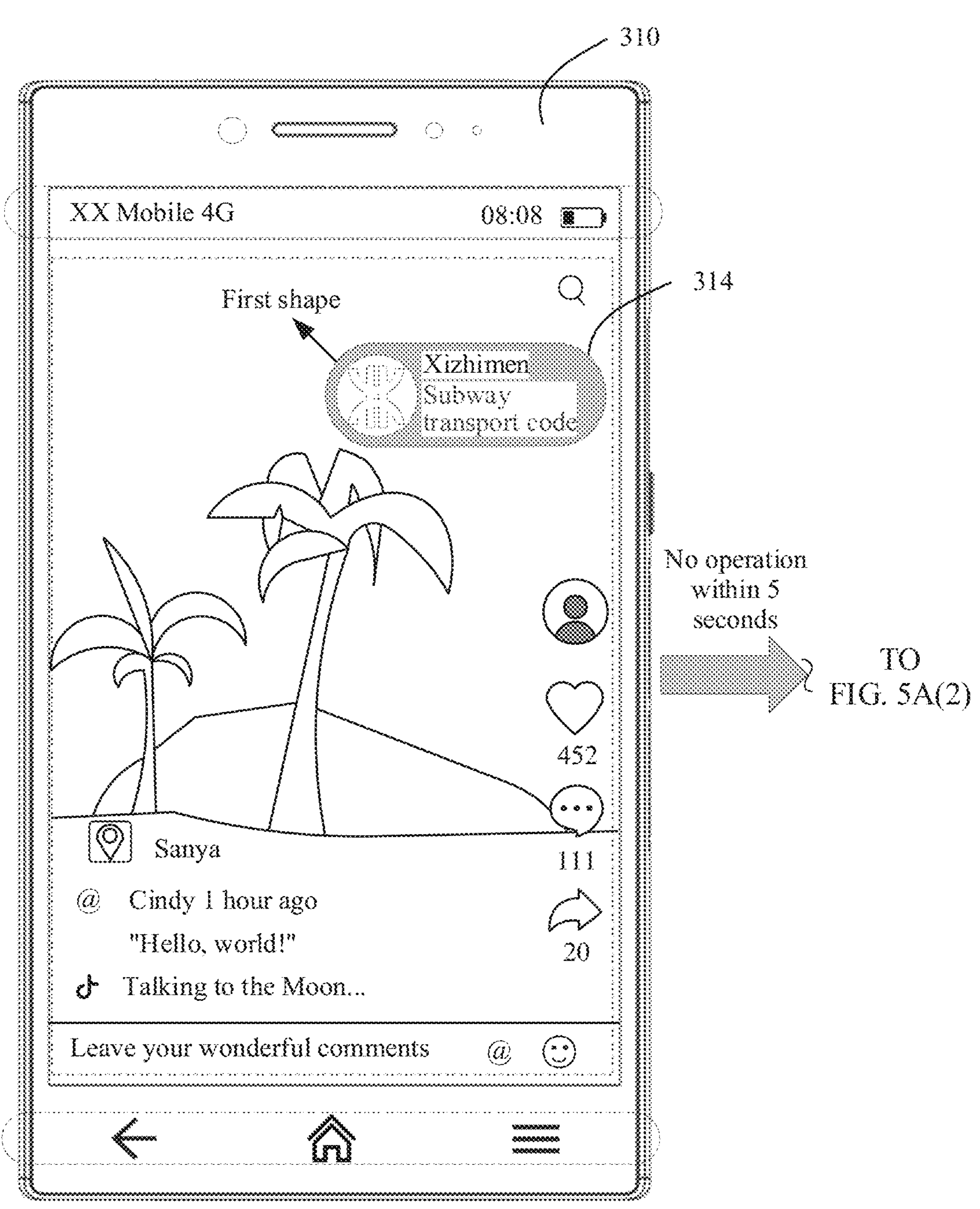
FIG. 5A(1)

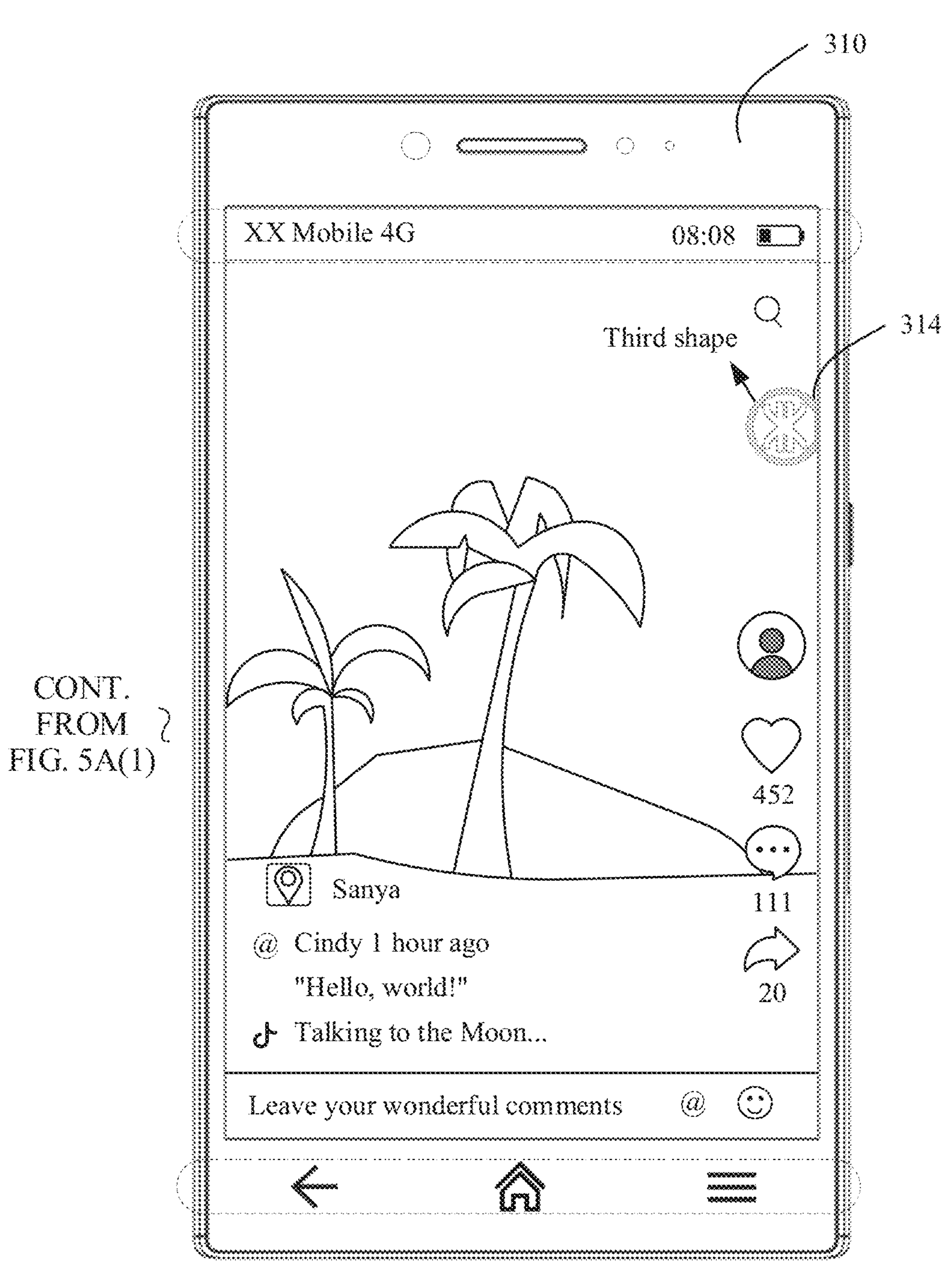
FIG. 5A(2)

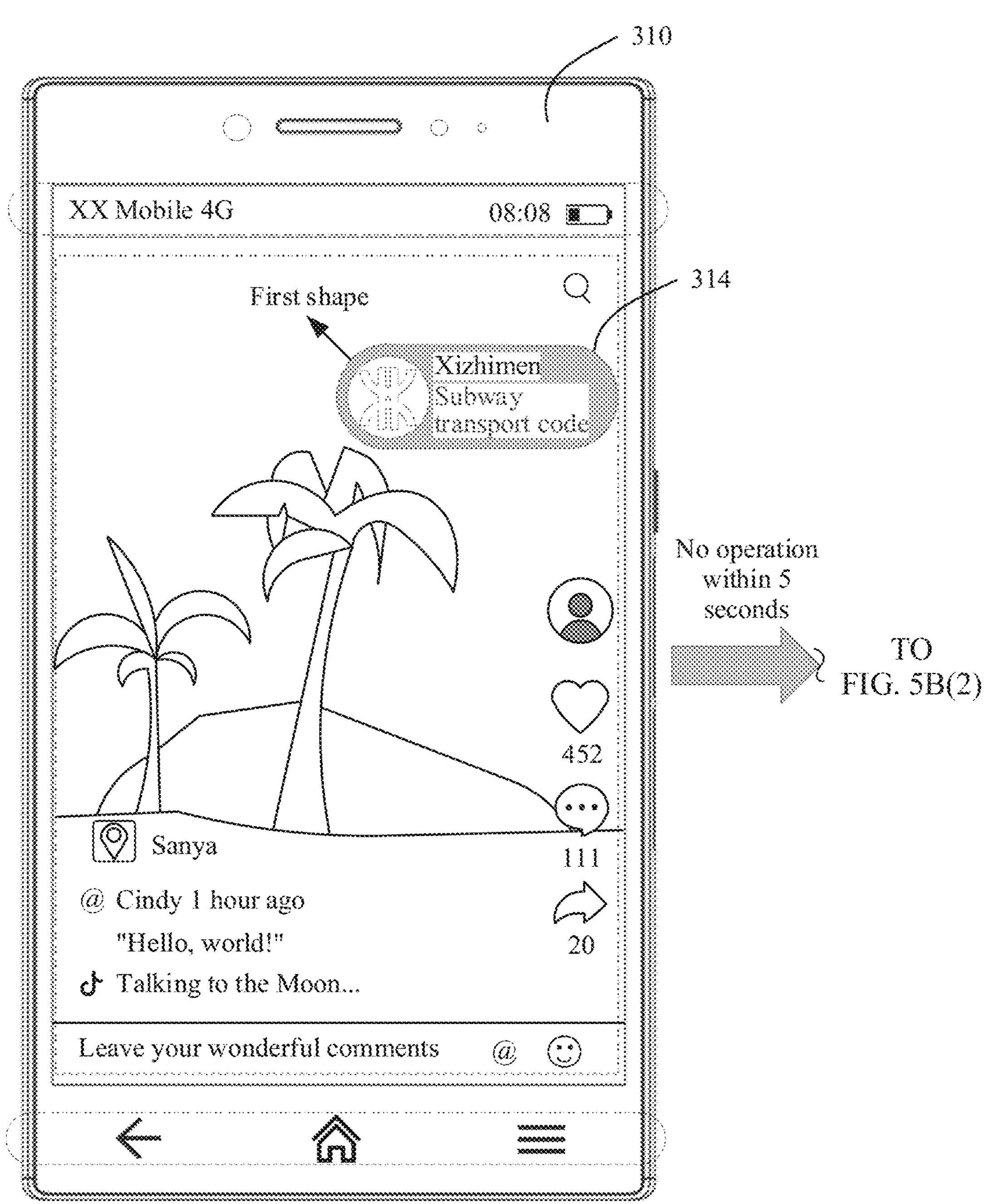
FIG. 5B(1)

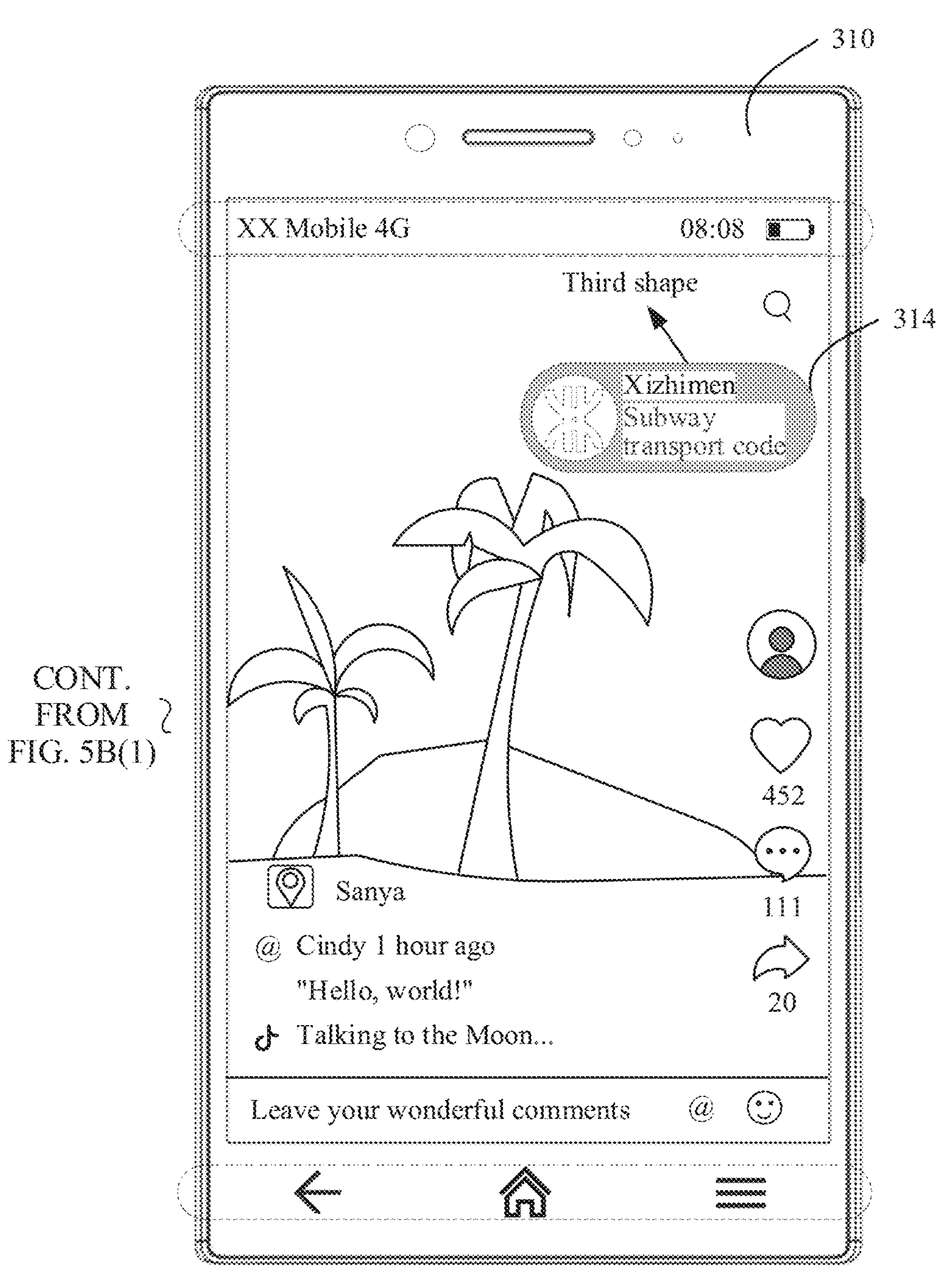
FIG. 5B(2)

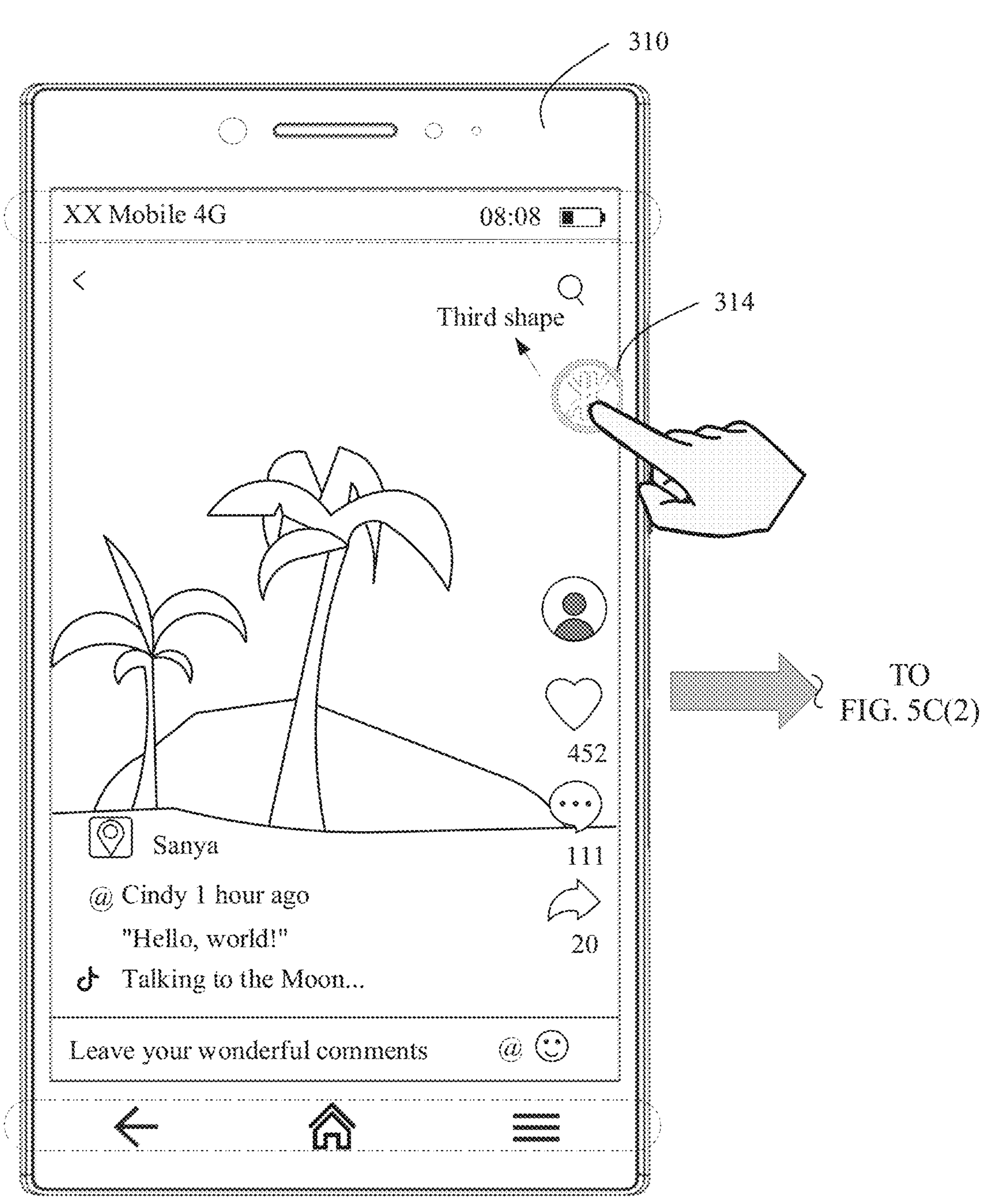
FIG. 5C(1)

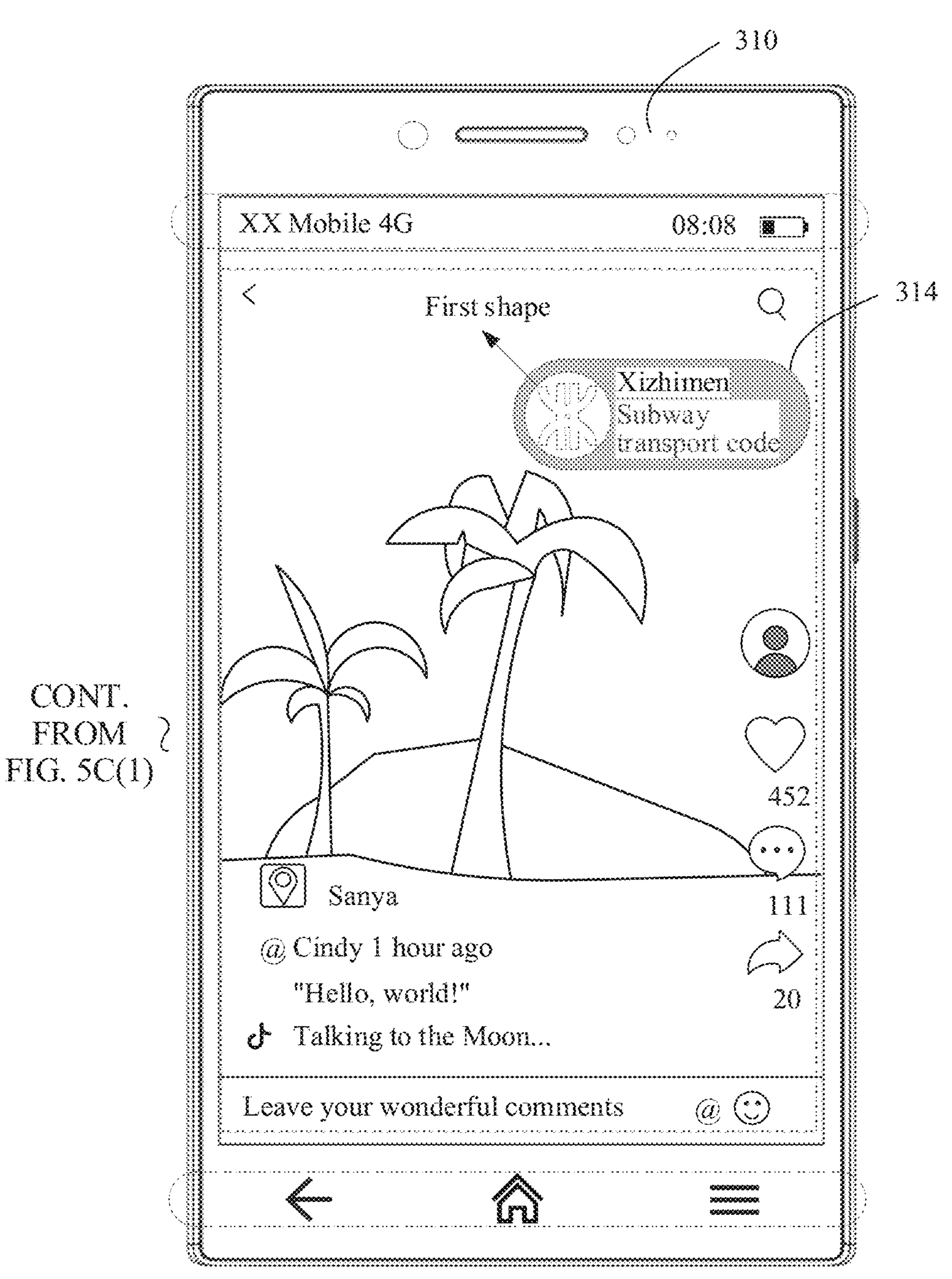
FIG. 5C(2)

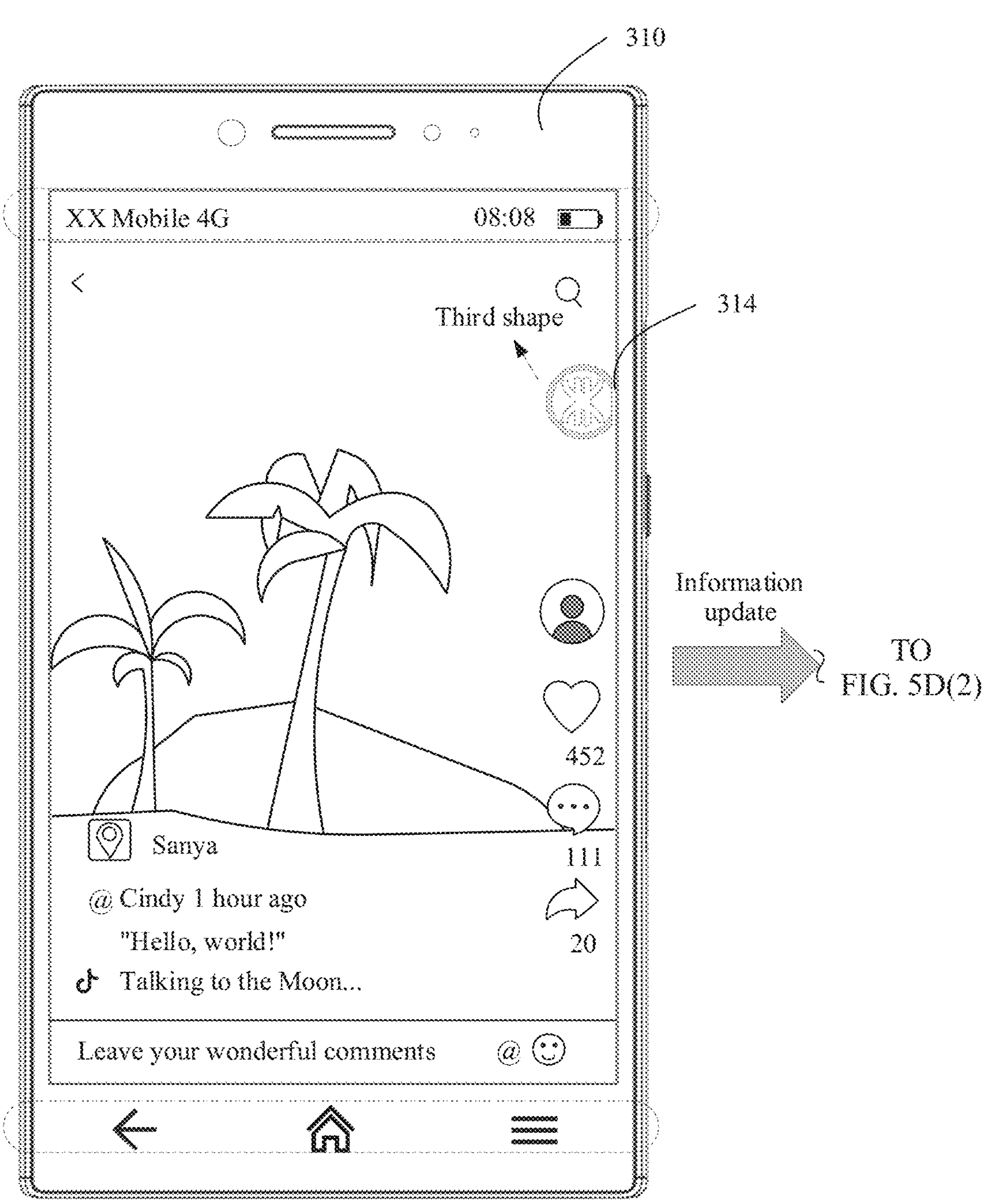
FIG. 5D(1)

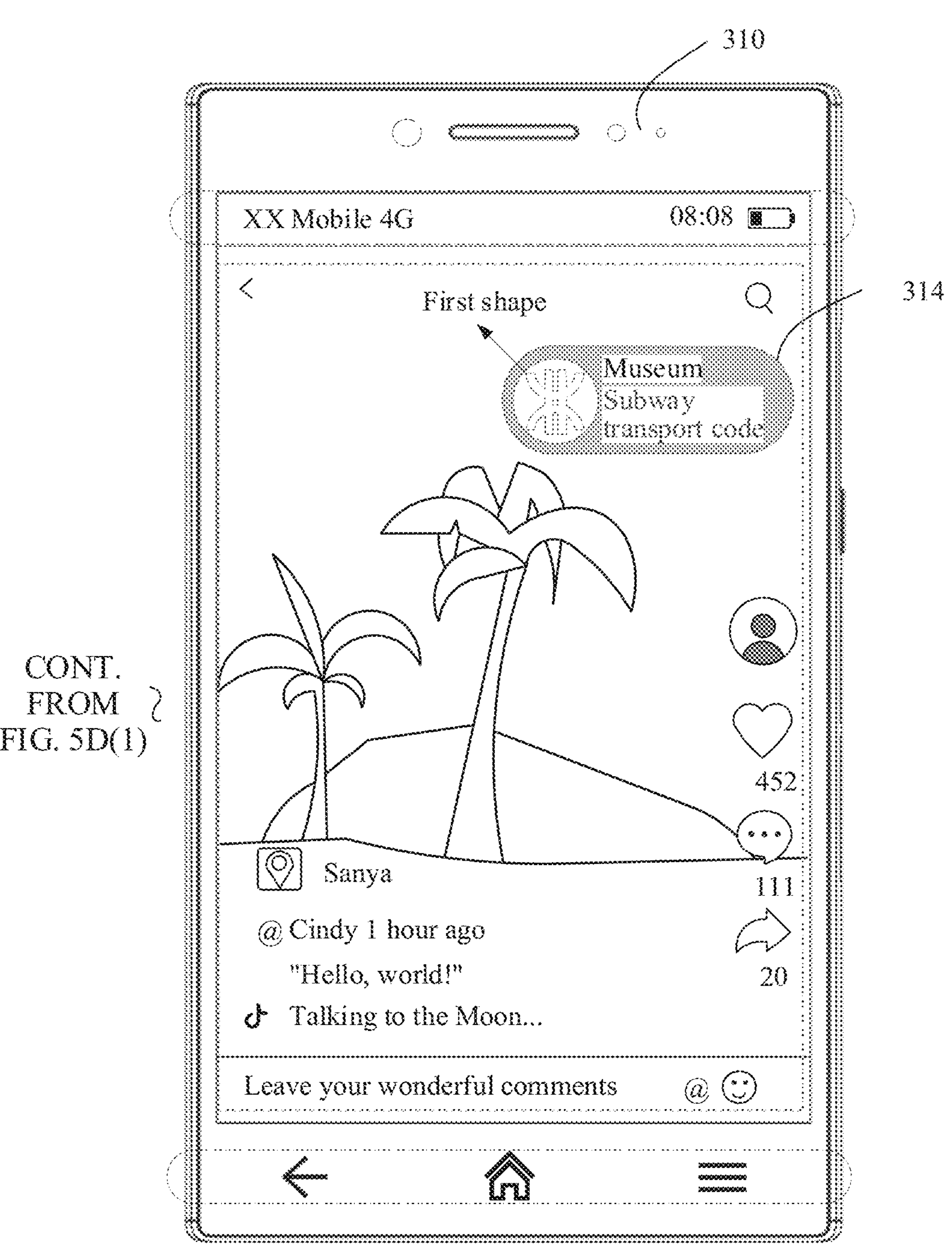
FIG. 5D(2)

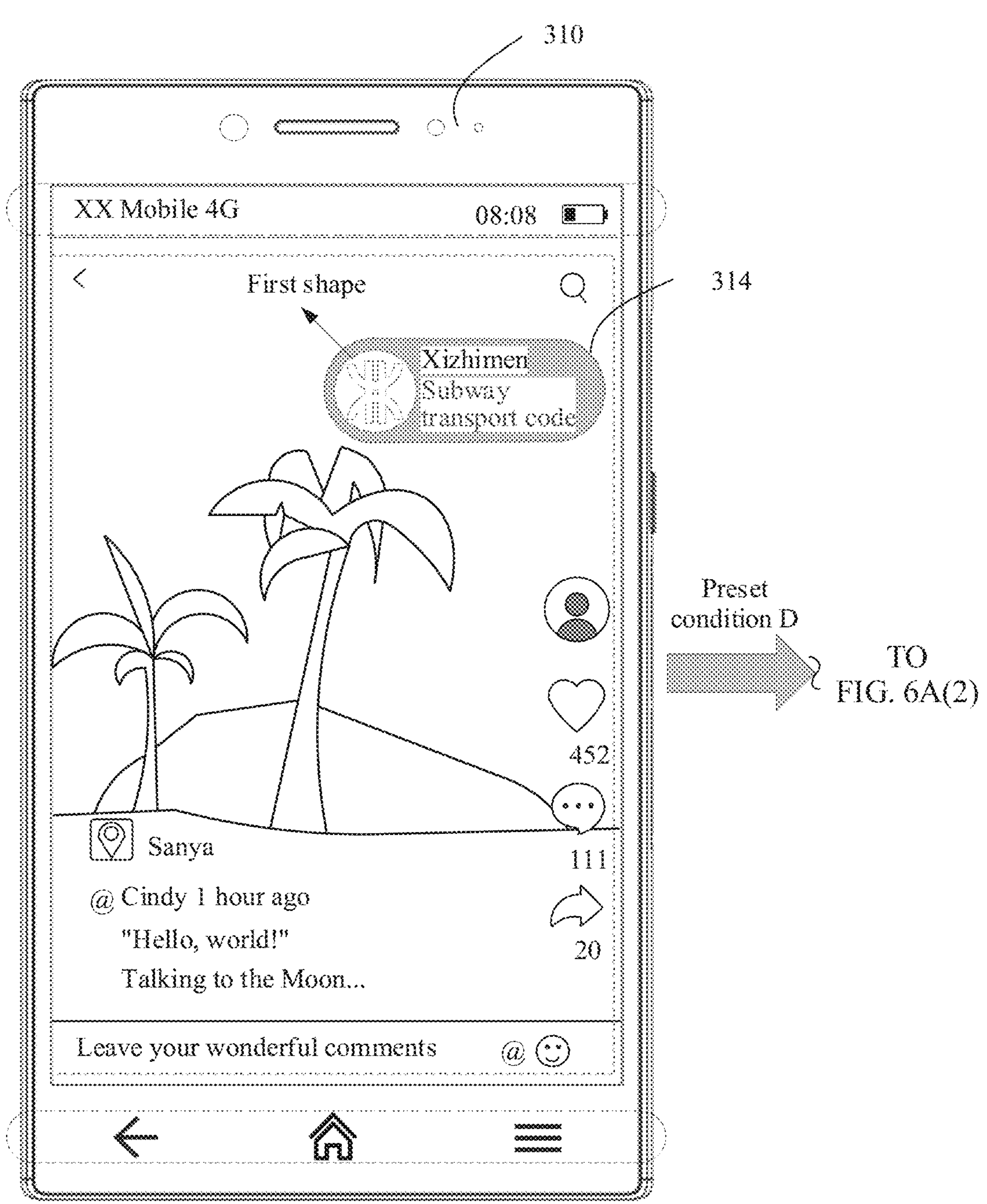
FIG. 6A(1)

310
08:08
Fourth shape
CONT. FROM FIG. 6A(1)
452
111
20
Sanya
@ Cindy 1 hour ago
"Hello, world!"
Talking to the Moon...
Leave your wonderful comments

FIG. 6A(2)

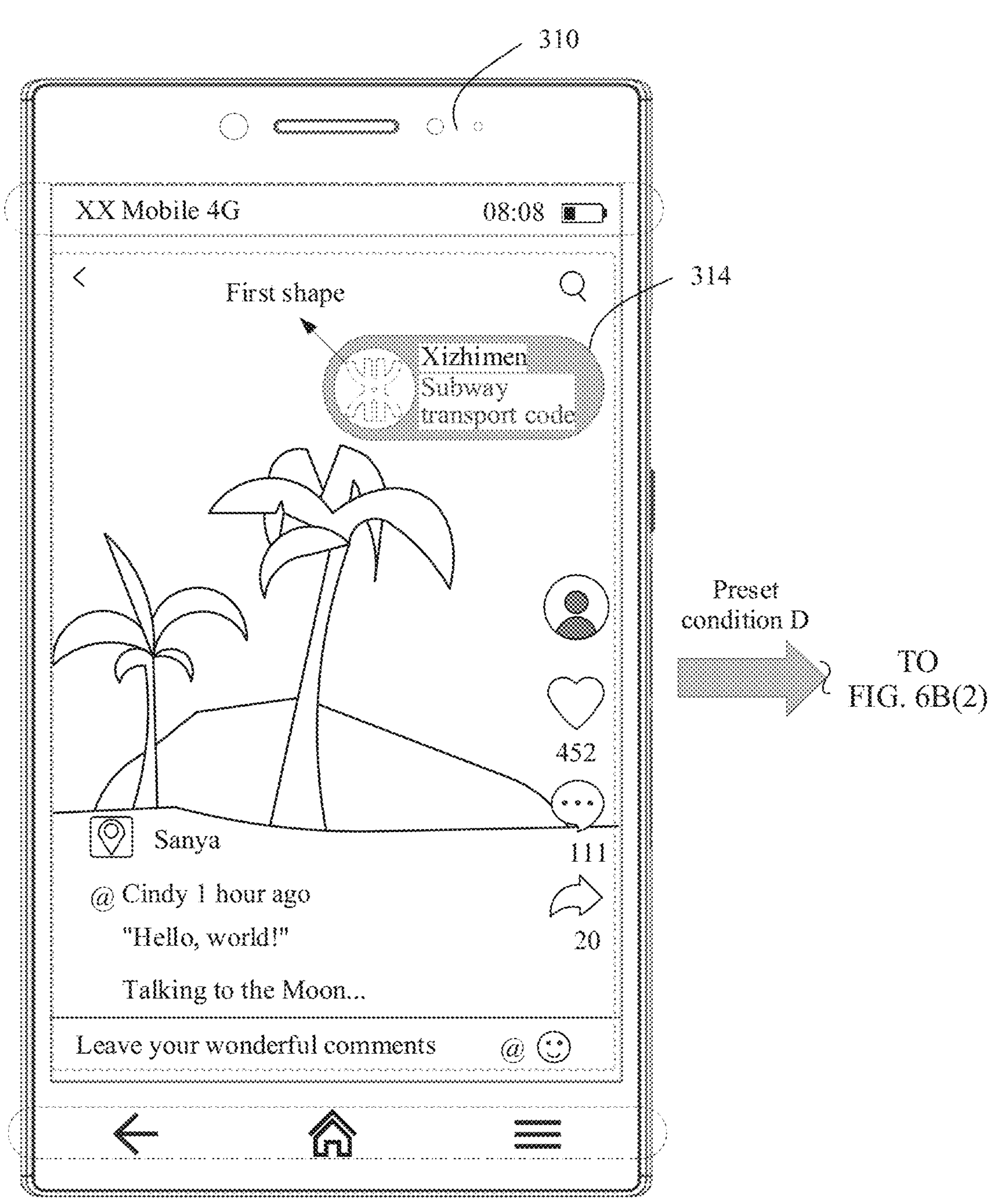
FIG. 6B(1)

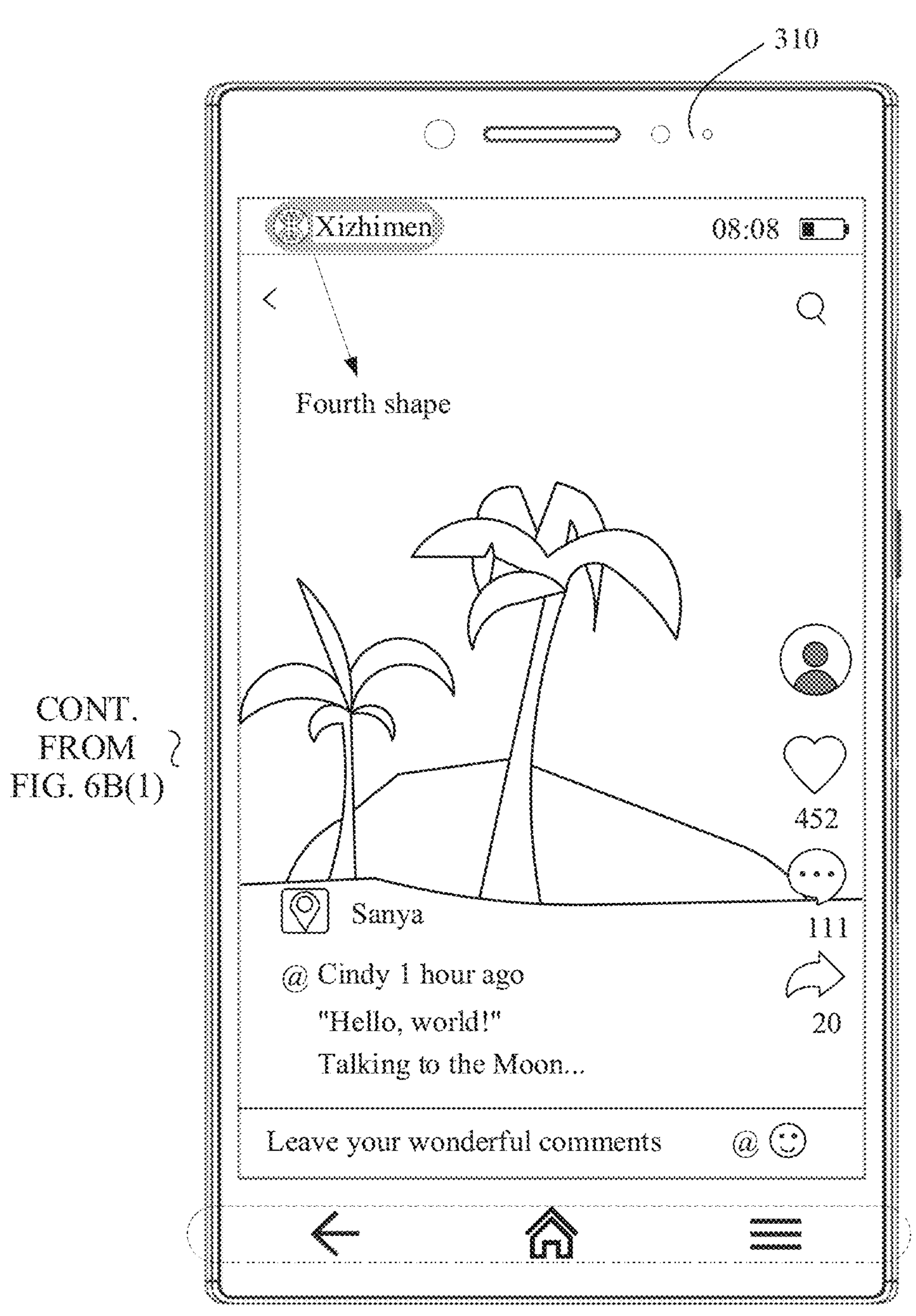
CONT. FROM FIG. 6B(1)
FIG. 6B(2)

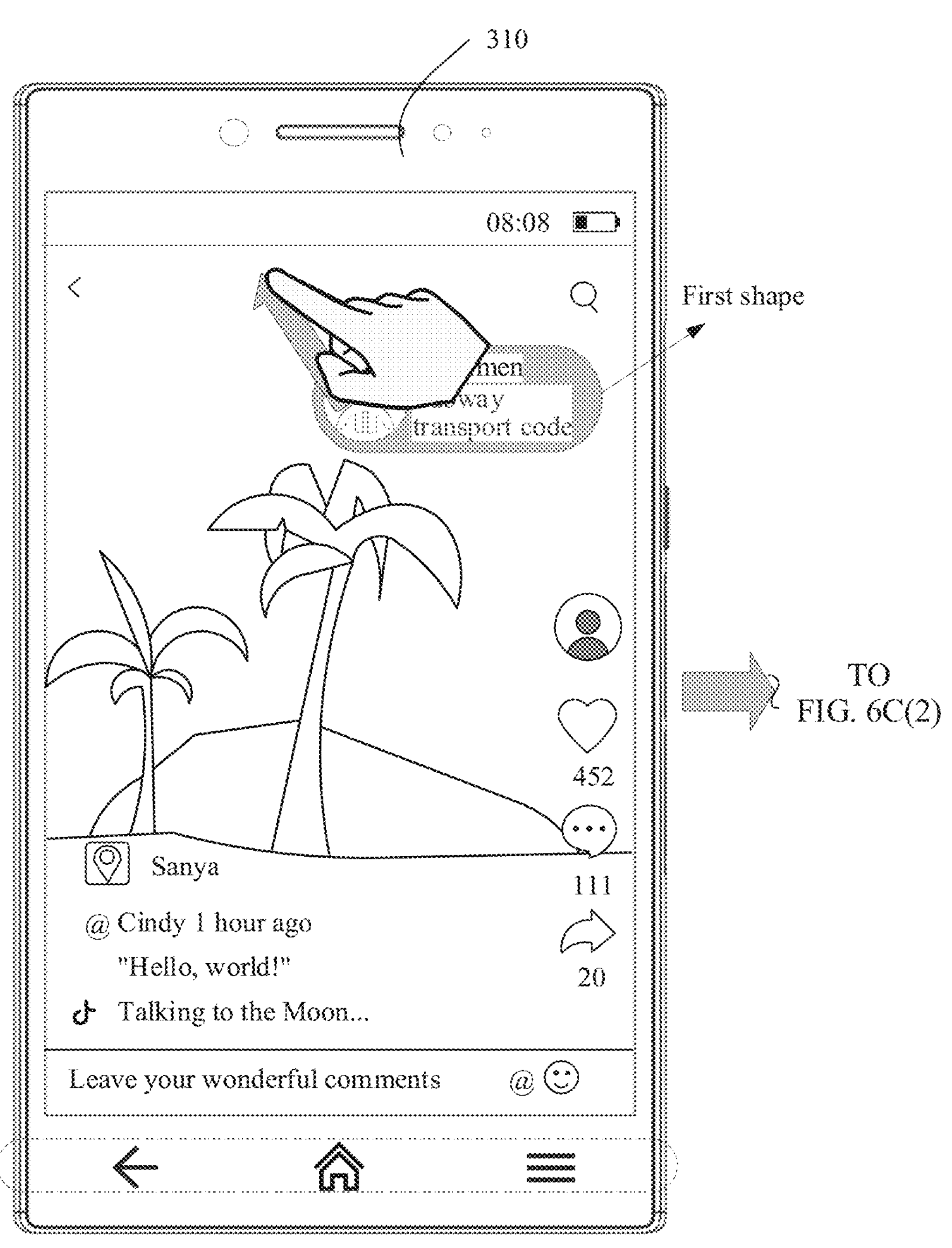
FIG. 6C(1)

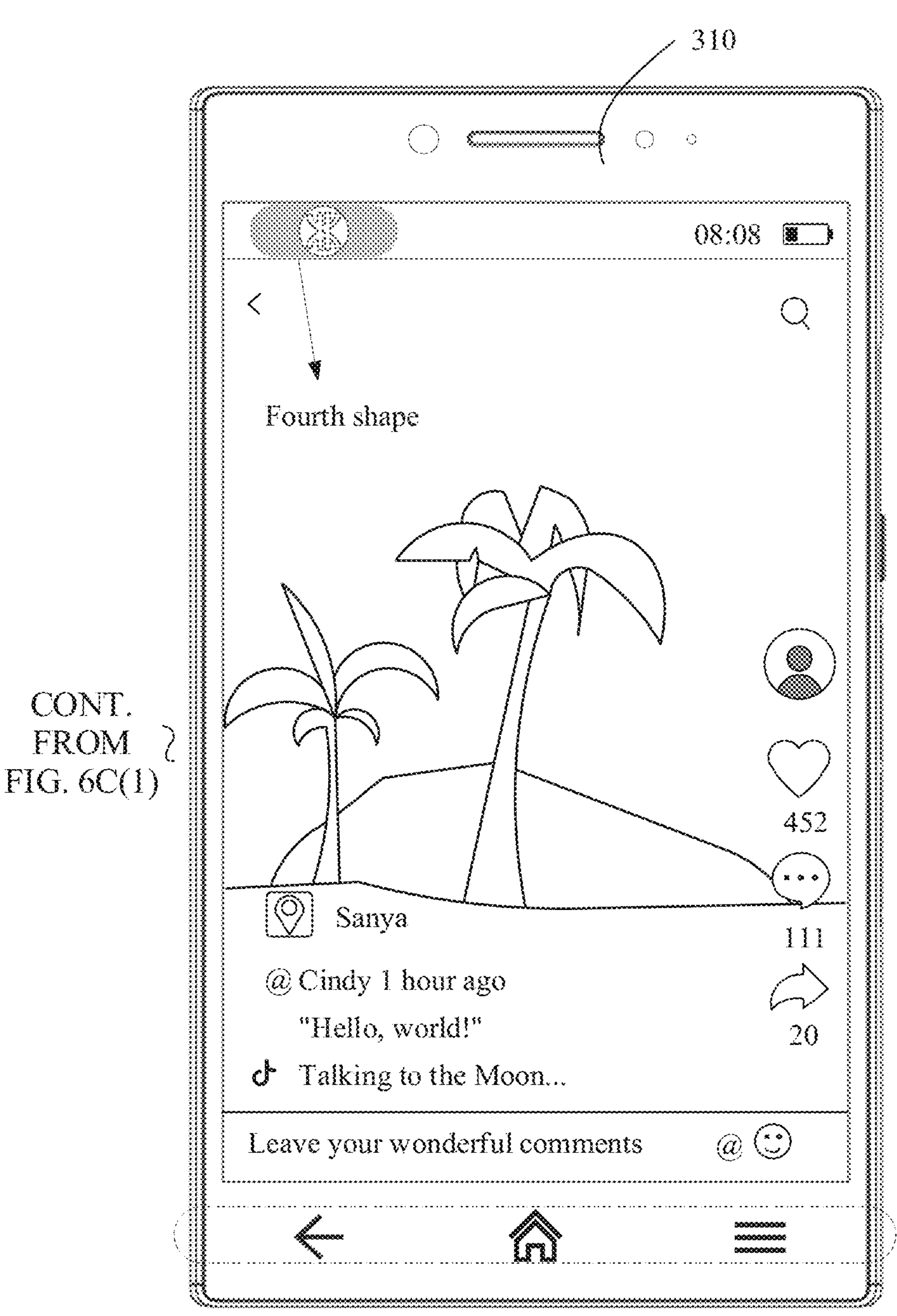
FIG. 6C(2)

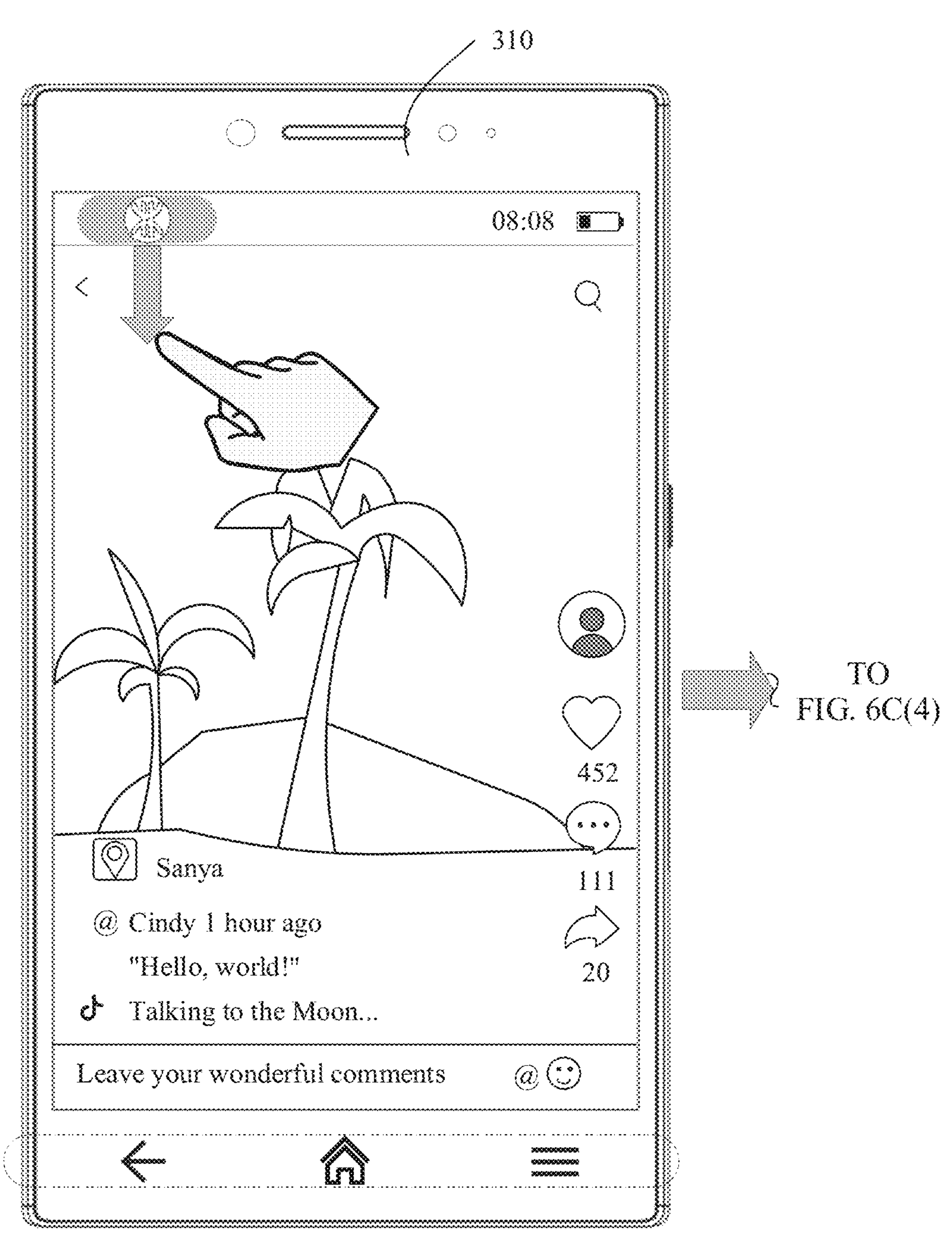
FIG. 6C(3)

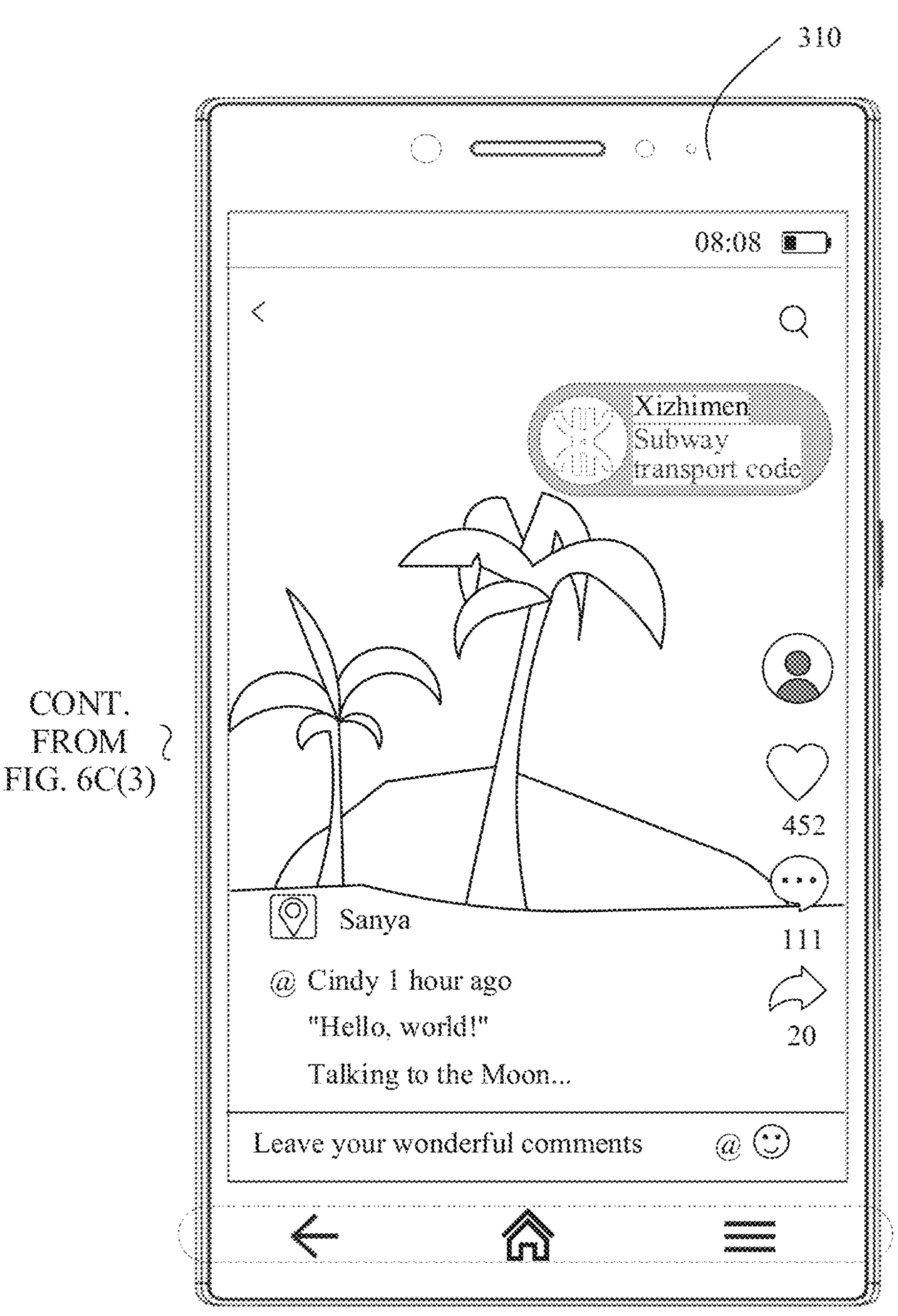
FIG. 6C(4)

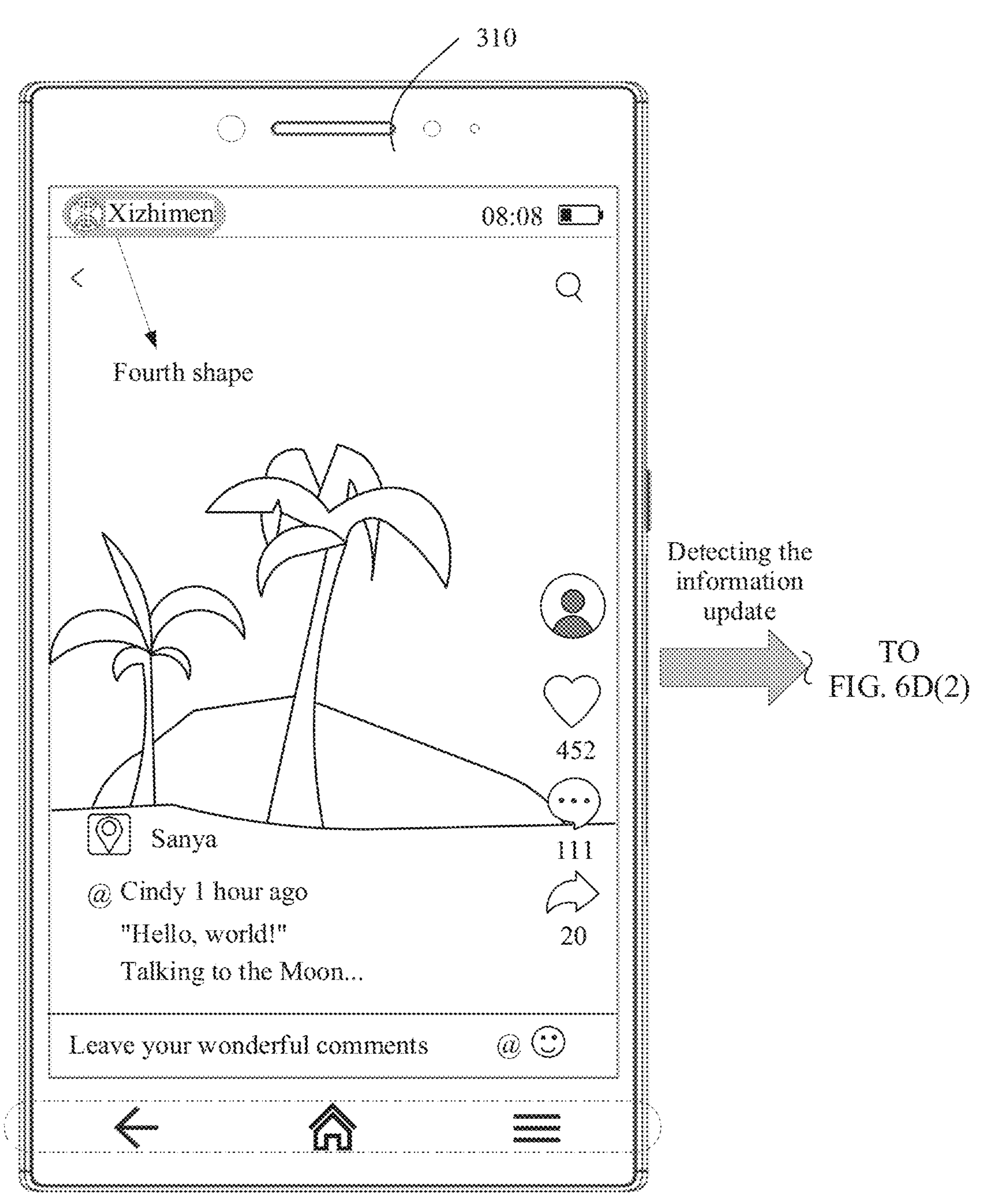
FIG. 6D(1)

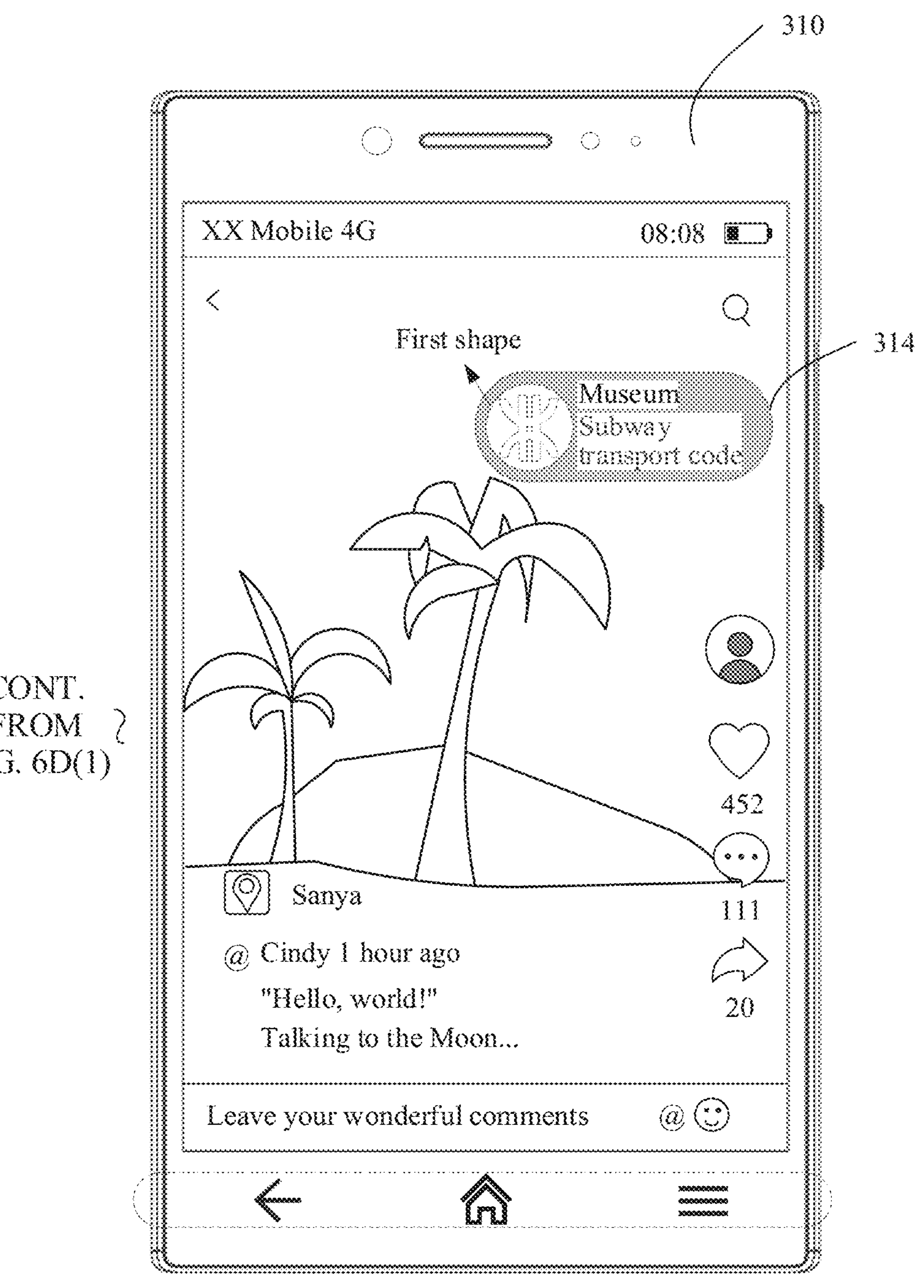
CONT. FROM FIG. 6D(1)
FIG. 6D(2)

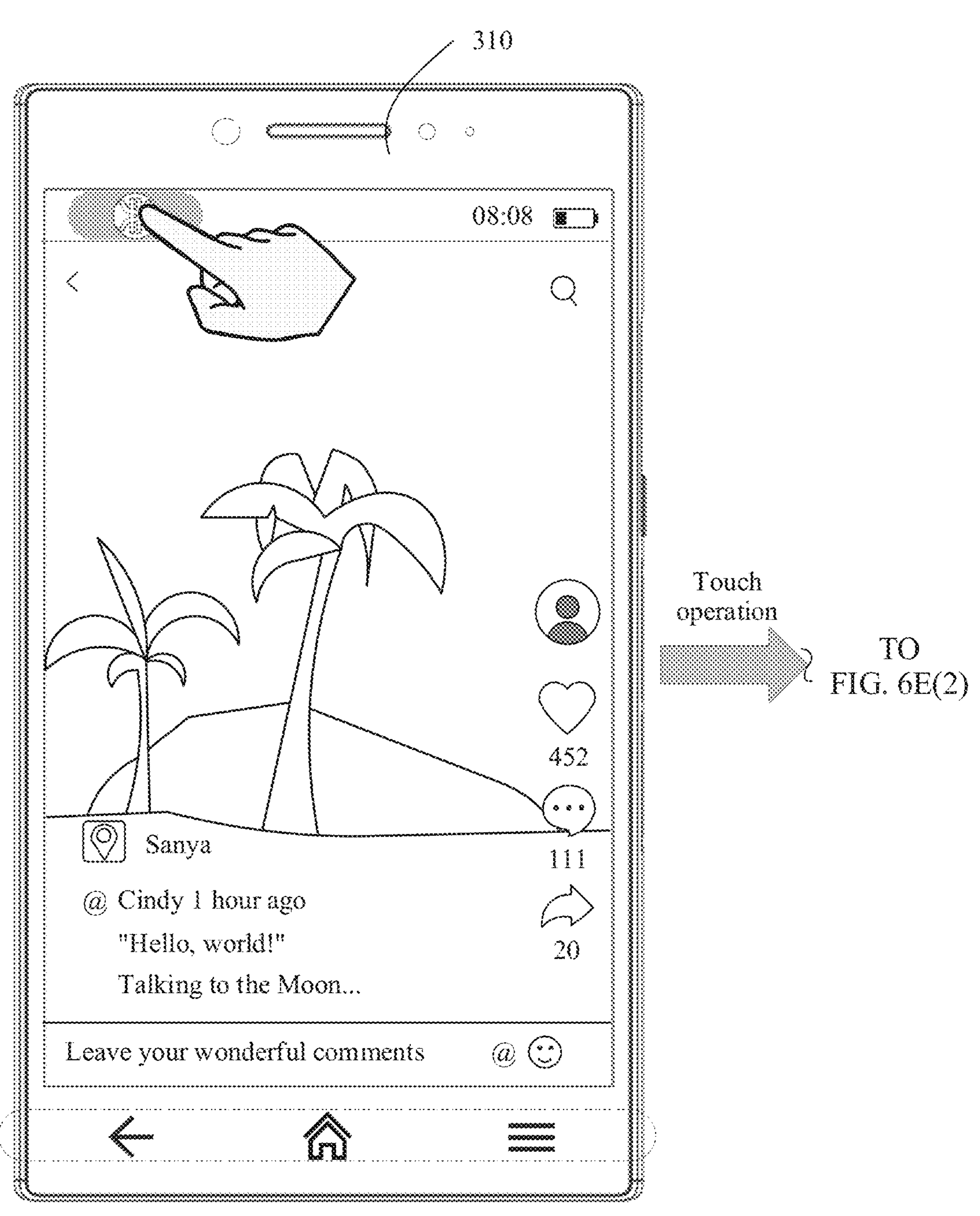
FIG. 6E(1)

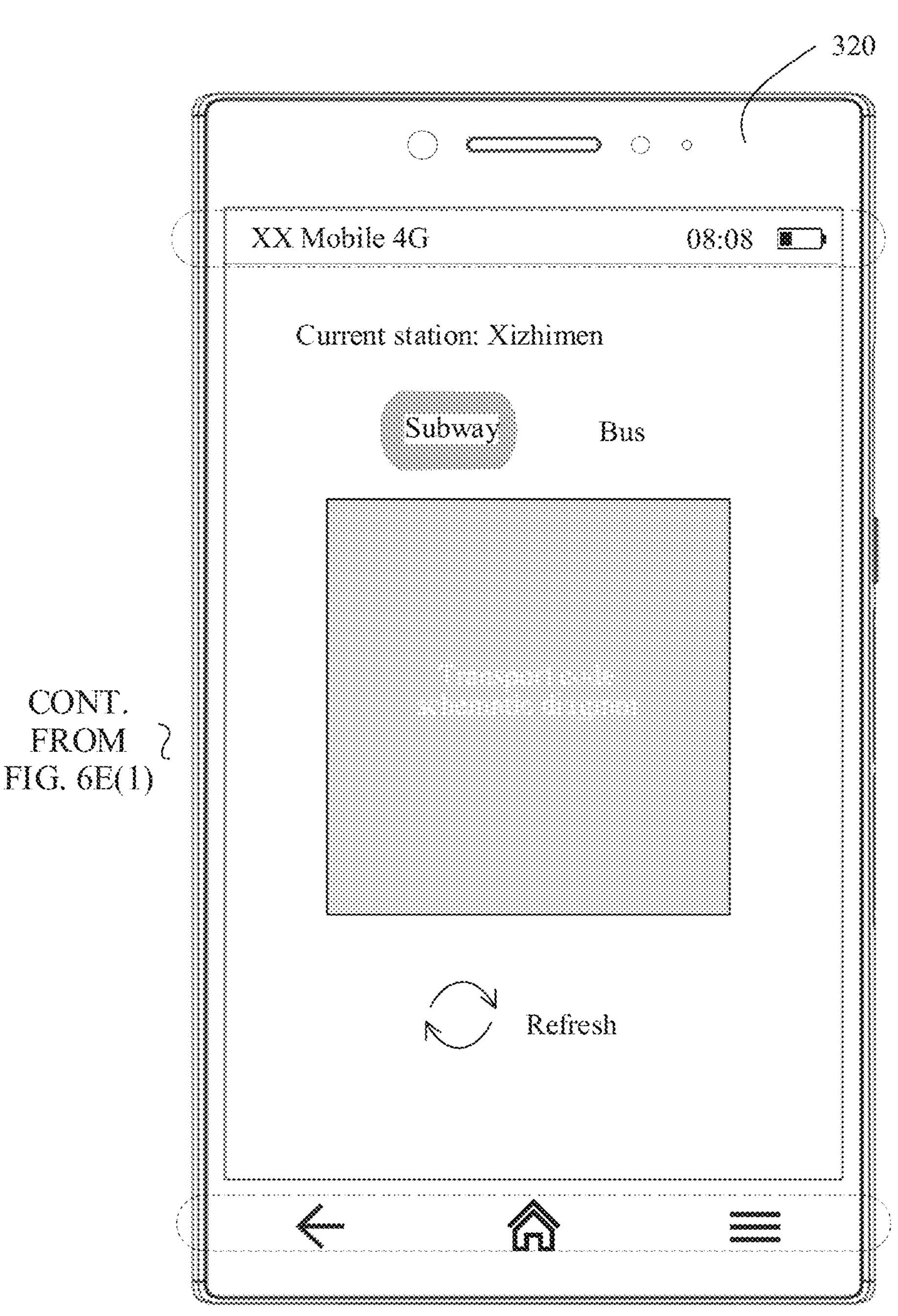
FIG. 6E(2)

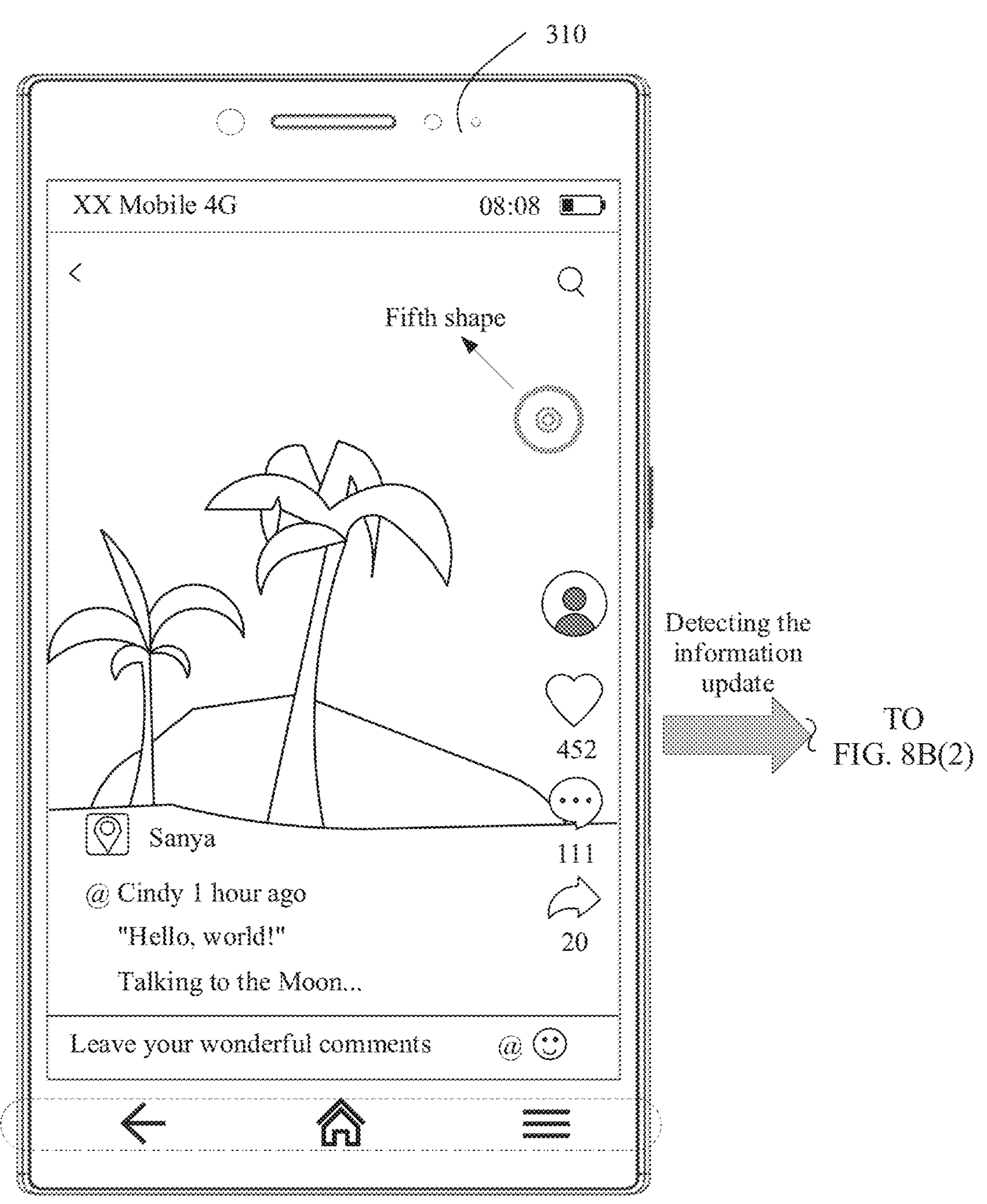
FIG. 8B(1)

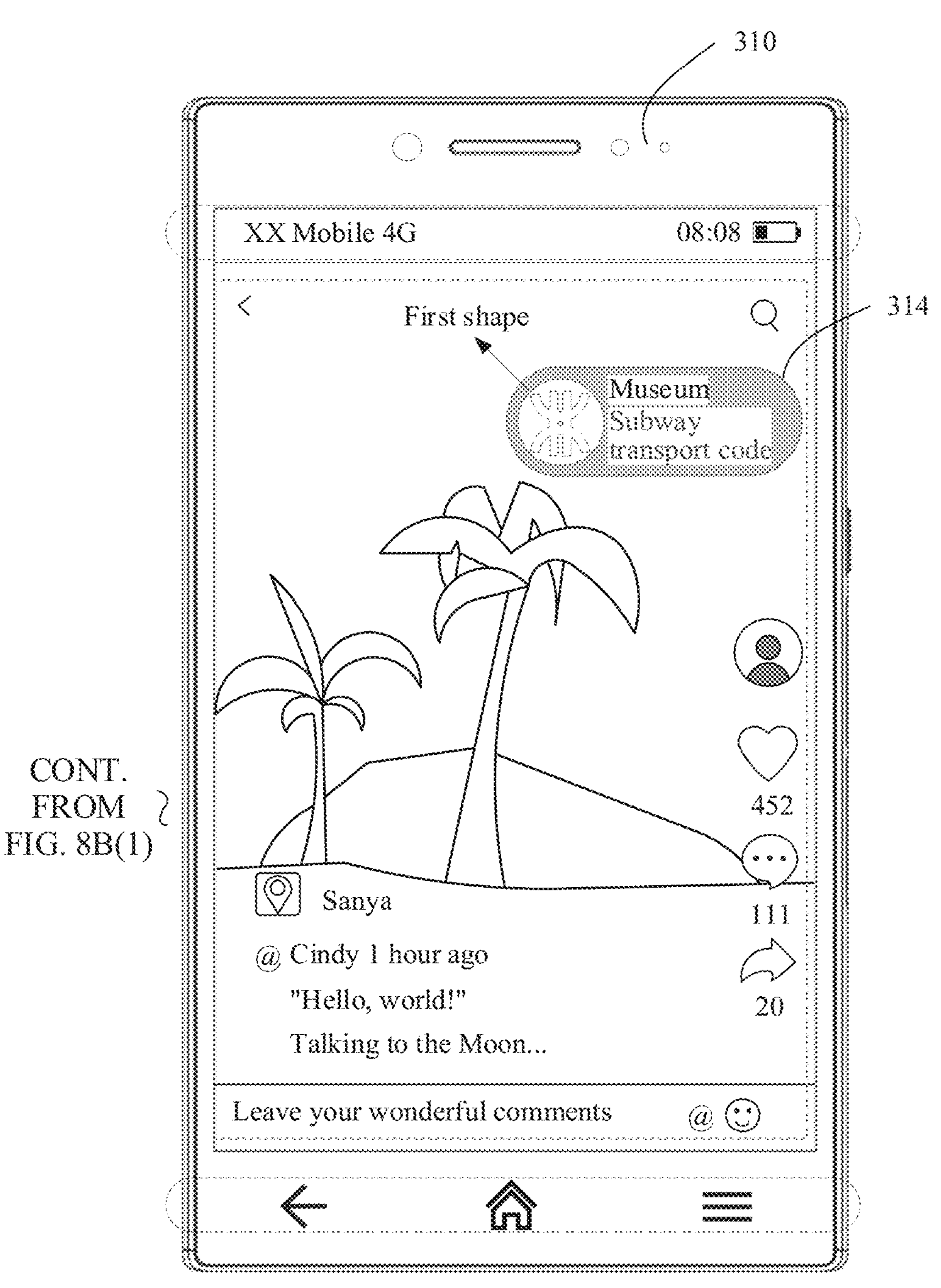
FIG. 8B(2)

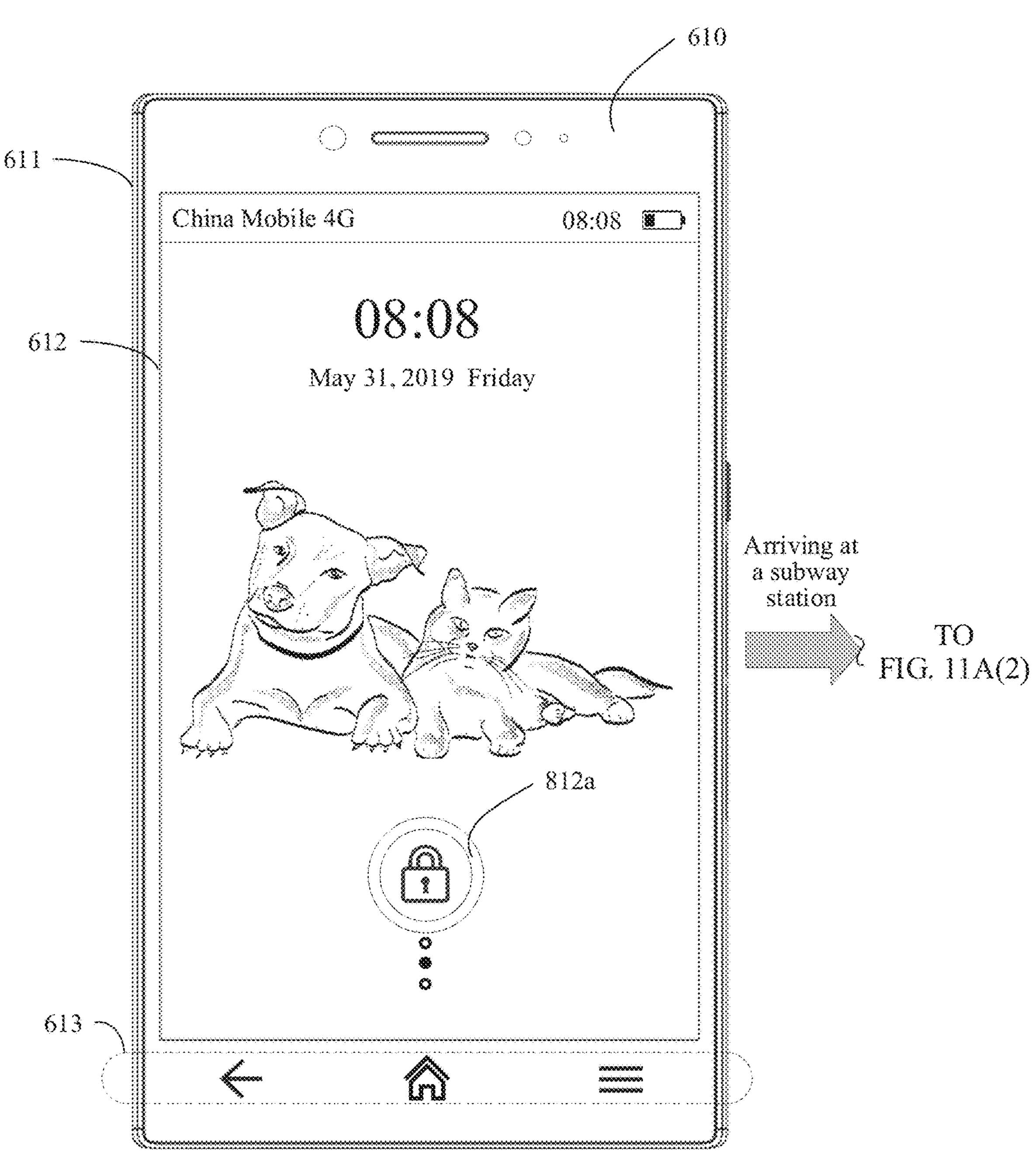
FIG. 11A(1)

610
China Mobile 4G
08:08
08:08
May 31, 2019 Friday
614
Xizhimen
Subway
transport code
CONT.
FROM
FIG. 11A(1)

FIG. 11A(2)

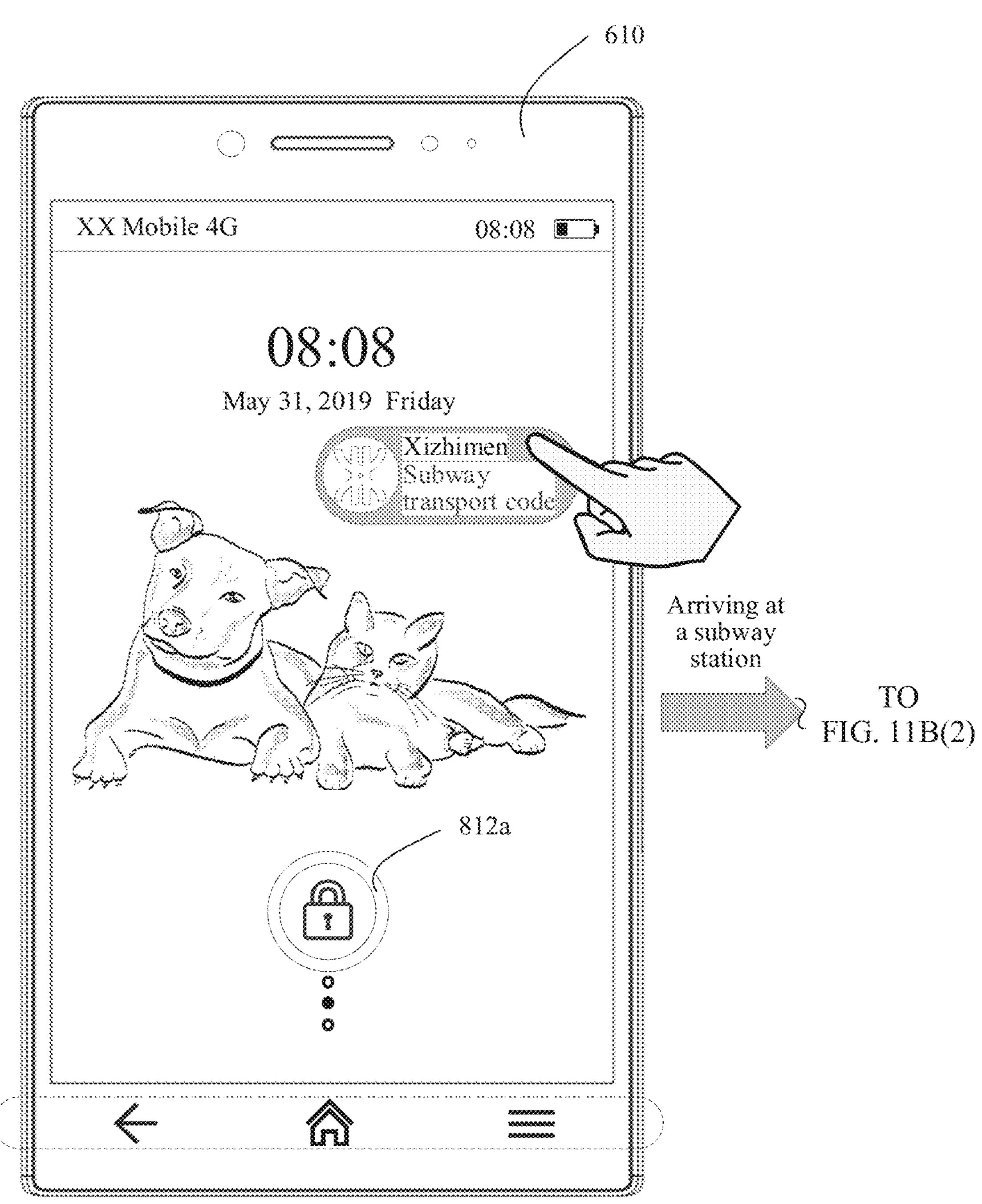
FIG. 11B(1)

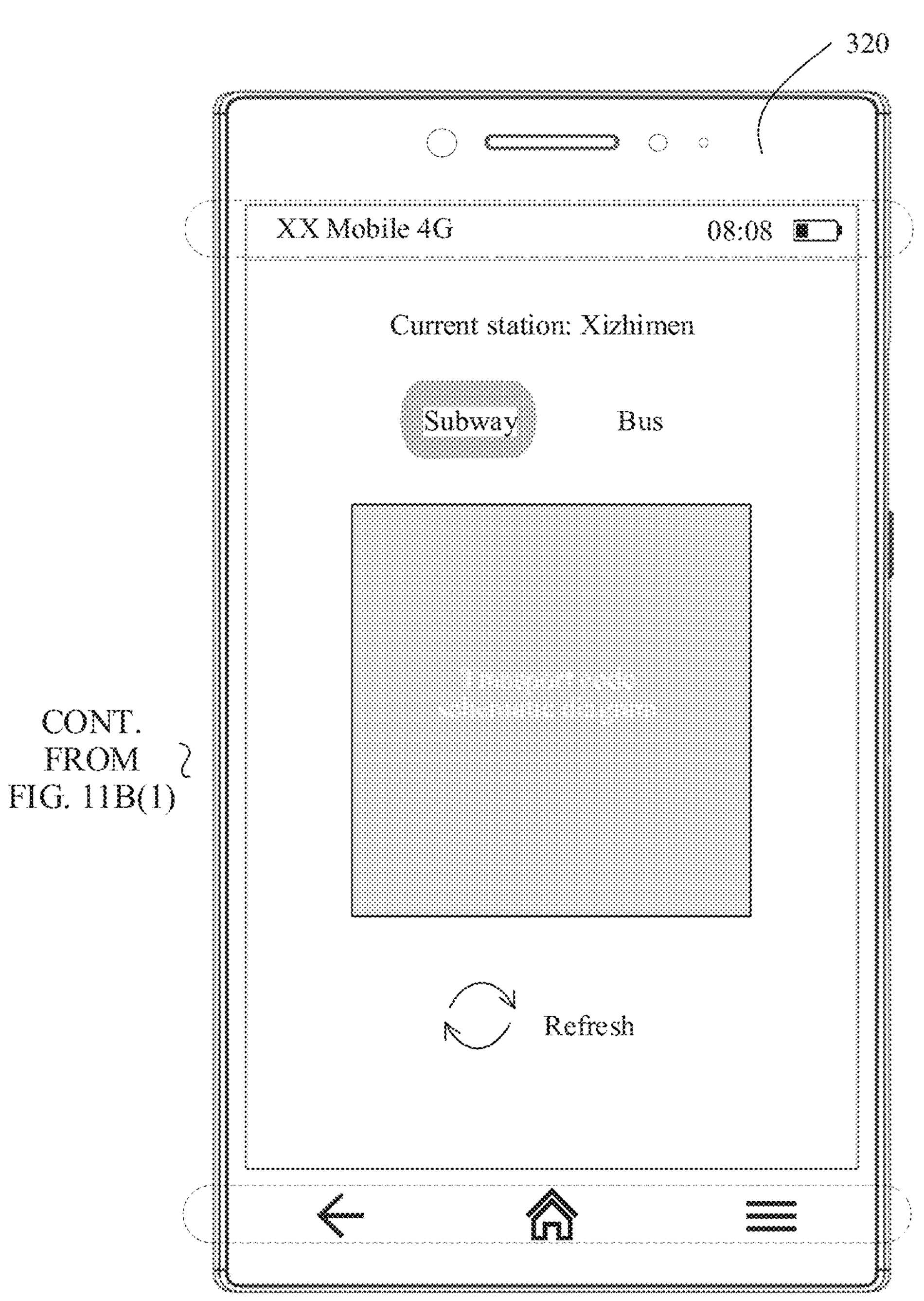
CONT. FROM FIG. 11B(1)
FIG. 11B(2)

INFORMATION DISPLAY METHOD AND ELECTRONIC DEVICE

CROSS-REFERENCE TO RELATED APPLICATIONS

This is a U.S. National Stage of International Application No. PCT/CN2022/094883 filed on May 25, 2022, which claims priority to Chinese Patent Application No. 202110927122.5, filed with the China National Intellectual Property Administration on Aug. 12, 2021, both of which are incorporated herein by reference in their entireties.

TECHNICAL FIELD

This application relates to the field of terminals and the field of communication technologies, and in particular, to an information display method and an electronic device.

BACKGROUND

As mobile terminals enter the era of intelligence, terminals with large screens are becoming more popular, and more applications are installed on such terminals. To meet needs of users such as flexible operation, a floating window is created. The floating window can quickly perform functional operations and application navigation for the users. However, at present, the display form of the floating window is single, and the display flexibility is poor, resulting in poor user experience.

SUMMARY

This application provides an information display method and an electronic device. A smart window can be displayed when a preset condition is met, and a shape of the smart window is adjusted based on a need of a user, thereby improving user experience.

According to a first aspect, this application provides an information display method. The method includes: An electronic device displays a first user interface, where the first user interface is an interface of a first application, or the first user interface is a home screen of the electronic device; and the first user interface includes a status bar and a content display area; when the electronic device detects that a current location is within a travel station area range, the electronic device displays a display window in a first shape in the content display area, and displays critical information of a transport code-related application in the display window in the first shape, where the critical information of the transport code-related application includes an icon and station information of the transport code-related application and reminding information about opening the transport code-related application, and a size of the first shape is less than ¼ of a size of the content display area; and in response to an operation of dragging the display window in the first shape displayed in the content display area to the status bar, the electronic device displays a capsule-shaped display window in the status bar, and displays identification information of the transport code-related application in the capsule-shaped display window.

In the foregoing implementation, the electronic device can automatically display the smaller display window in the first shape on the currently displayed user interface when detecting that the current location is within the travel station area range, and display the critical information of the transport code-related application in the display window in the first shape, for example, display the icon and the station information of the transport code-related application and the reminding information about opening the transport code-related application to remind a user that the transport code-related application can be opened. In this way, the user does not need to manually open the transport code-related application and then exit the transport code-related application after arriving at a travel station area, thereby reducing user operations, and improving convenience of using the electronic device. In addition, the user may drag the display window in the first shape displayed in the content display area to the status bar, and the display window is displayed in a capsule shape in the status bar. This not only enables the user to learn of information in the display window at any time, but also avoids long-term occupation of the content display area by the display window, thereby reducing interference caused by the display window to the user.

With reference to some embodiments of the first aspect, in some embodiments, the method further includes: When the first user interface displays the display window, the electronic device skips running the transport code-related application.

In the foregoing implementation, when the electronic device displays the critical information of the transport code-related application in the display window, the electronic device may skip running the transport code-related application. In this way, operations that need to be performed by the user are reduced. Moreover, resource occupation of the electronic device is reduced, and operation smoothness of the electronic device is improved.

With reference to some embodiments of the first aspect, in some embodiments, the method further includes: In response to an operation of tapping the display window in the first shape, the electronic device switches the display window in the first shape in the content display area into a rectangular display window; and the electronic device displays, in the rectangular display window in the content display area, critical information including a transport code.

In the foregoing implementation, after the user taps the display window in the first shape, the electronic device may switch the display window into a rectangular shape, and display, in the rectangular display window, content that needs to occupy a larger display area, for example, display the critical information including the transport code.

With reference to some embodiments of the first aspect, in some embodiments, the method further includes: When no operation performed on the display window in the first shape is detected within first preset duration, the electronic device switches the display window in the first shape in the content display area into a round display window; and the electronic device displays the critical information of the icon or the station information of the transport code-related application in the round display window in the content display area, where a display area of the round display window is smaller than a display area of the display window in the first shape.

In the foregoing implementation, if no operation performed on the display window in the first shape is detected within the first preset duration, the electronic device may switch the display window into a smaller circle, to avoid interference to the user caused by displaying the display window in the content display area for a long time.

With reference to some embodiments of the first aspect, in some embodiments, the method further includes: In response to an operation of a user of dragging the content display area or the display window in the status bar, the electronic device displays the dragged display window as a circle in the content display area, and skips displaying the critical information of the transport code-related application in the dragged display window.

In the foregoing implementation, in the process of dragging the display window, the electronic device may display the dragged display window as a circle in the content display area, and does not display information in the dragged display window, so that the dragging operation of the user is not interfered by the information displayed in the display window, and the user can drag the display window to a target placement position more accurately.

With reference to some embodiments of the first aspect, in some embodiments, the method further includes: The electronic device obtains the station information of the transport code-related application every second preset duration; when the station information of the electronic device is updated, the electronic device displays the display window in the first shape in the content display area; and the electronic device displays critical information of updated station information of the transport code-related application and the icon of the transport code-related application in the display window in the first shape in the content display area.

In the foregoing implementation, the electronic device may periodically obtain the station information of the transport code-related application continuously; and when determining that the station information is updated, display the display window in the first shape in the content display area and display updated station information in the display window, so that the user does not need to open the transport code-related application even if the station information is updated, and can directly obtain the updated station information from the display window, thereby reducing operations that need to be performed by the user, and improving human-machine interaction performance of the terminal device.

With reference to some embodiments of the first aspect, in some embodiments, the method further includes: In response to an operation of touching and holding the display window, the electronic device displays a user interface of the transport code-related application, and displays the transport code on the user interface of the transport code-related application.

In the foregoing implementation, the user can quickly open the user interface of the transport code-related application by touching and holding the display window, and the transport code is displayed on the user interface, thereby improving operational efficiency of the user in obtaining transport code information, and further improving the human-machine interaction performance of the terminal device.

According to a second aspect, this application provides an information display method. The method includes: An electronic device displays a first user interface, where the first user interface is a user interface of a first application running on the electronic device, or the first user interface is a lock screen of the electronic device; and the first user interface includes a status bar and a content display area; and when detecting that a first preset condition is met, the electronic device displays a display window in a first shape in the content display area, where the display window in the first shape is configured to display critical information of the second application, the critical information includes identification information of the second application, and a size of the first shape is less than ¼ of a size of the content display area, where the second application matches the first preset condition, the first preset condition includes at least one of the following: a location of the electronic device is within a preset first area range, a system time of the electronic device is within a preset first time range, or the electronic device obtains a preset first notification message, and in response to an operation of dragging the display window in the first shape displayed in the content display area to the status bar, the electronic device displays a capsule-shaped display window in the status bar, and displays critical information of the second application in the capsule-shaped display window in the status bar, where the critical information of the second application displayed in the capsule-shaped display window in the status bar is less than the critical information of the second application displayed in the display window in the first shape.

In the foregoing implementation, when detecting that the first preset condition is met, the electronic device can automatically display the smaller display window in the first shape on the currently displayed first user interface, and display the critical information of the second application and the identification information of the second application in the display window in the first shape. In this way, the user does not need to manually open the second application and then exit the second application when required, thereby reducing user operations, and improving convenience of using the electronic device. In addition, the user may drag the display window in the first shape displayed in the content display area to the status bar, and the display window is displayed in a capsule shape in the status bar. This not only enables the user to learn of information in the display window at any time, but also avoids long-term occupation of the content display area by the display window, thereby reducing interference caused by the display window to the user.

With reference to some embodiments of the second aspect, in some embodiments, the method further includes: When the first user interface displays the display window, the electronic device skips running the second application.

In the foregoing implementation, when the electronic device displays the critical information of the second application in the display window, the electronic device may skip running the second application. In this way, operations that need to be performed by the user are reduced. Moreover, resource occupation of the electronic device is reduced, and operation smoothness of the electronic device is improved.

With reference to some embodiments of the second aspect, in some embodiments, the method further includes: In response to a first user operation, the electronic device switches the display window in the first shape in the content display area to a rectangular display window; and the electronic device displays critical information of the second application in the rectangular display window in the content display area, where the critical information of the second application displayed in the rectangular display window is more than the critical information of the second application displayed in the display window in the first shape, and a display area of the rectangular display window is larger than a display area of the display window in the first shape.

In the foregoing implementation, after the user taps the display window in the first shape, the electronic device may switch the display window to a rectangular shape, and display, in the rectangular display window, content that needs to occupy a larger display area, for example, display more critical information of the second application.

With reference to some embodiments of the second aspect, in some embodiments, the first user operation is tapping the display window, pressing a first button, or entering a first voice message; and the first button includes one or more of a power button, an up-volume button, and a down-volume button.

With reference to some embodiments of the second aspect, in some embodiments, the method further includes: When no operation performed on the display window is detected within first preset duration, the electronic device switches the display window in the first shape in the content display area to a round display window; and the electronic device displays the identification information of the second application in the round display window in the content display area, or displays, in the round display window, some information of the critical information of the second application displayed in the display window in the first shape, where a display area of the round display window is smaller than the display area of the display window in the first shape.

In the foregoing implementation, if no operation performed on the display window in the first shape is detected within the first preset duration, the electronic device may switch the display window to a smaller circle, to avoid interference to the user caused by displaying the display window in the content display area for a long time.

With reference to some embodiments of the second aspect, in some embodiments, the method further includes: The electronic device receives a second user operation, where the second user operation is that a user drags the display window in the content display area or drags the display window in the status bar; and in response to the second user operation, the electronic device displays the round display window on the first user interface in a process of dragging the display window, and skips displaying the critical information of the second application in the dragged round display window.

In the foregoing implementation, in the process of dragging the display window, the electronic device may display the dragged display window as a circle in the content display area, and does not display information in the dragged display window, so that the dragging operation of the user is not interfered by the information displayed in the display window, and the user can drag the display window to a target placement position more accurately.

With reference to some embodiments of the second aspect, in some embodiments, the method further includes: The electronic device obtains the critical information of the second application every second preset duration; when the electronic device detects that the critical information of the second application is updated, the electronic device displays the display window in the first shape in the content display area; and the electronic device displays updated critical information of the second application and the identification information of the second application in the display window in the first shape in the content display area.

In the foregoing implementation, the electronic device may periodically obtain the critical information of the second application continuously; and when determining that the critical information of the second application is updated, display the display window in the first shape in the content display area and display the updated critical information of the second application in the display window, so that the user does not need to open the second application even if the critical information of the second application is updated, and can directly obtain the updated critical information of the second application from the display window, thereby reducing operations that need to be performed by the user, and improving human-machine interaction performance of the terminal device.

With reference to some embodiments of the second aspect, in some embodiments, there are a plurality of pieces of critical information of the second application, and the method further includes: The electronic device alternately displays the plurality of pieces of critical information of the second application in the display window in the first shape in the content display area.

In the foregoing implementation, when there are a plurality of pieces of critical information of the second application, the plurality of pieces of critical information may be alternately displayed in the display window, so that the user can obtain more information through the display window within a period of time.

With reference to some embodiments of the second aspect, in some embodiments, the method further includes: In response to a third user operation performed on the display window, the electronic device displays a second user interface, where the second user interface is an interface of the second application or an interface of the third application, and the third application is an application associated with the second application.

In the foregoing implementation, by performing the third user operation on the display window, the user interface of the second application or the user interface of the third application associated with the second application can be quickly opened, thereby improving operational efficiency of the user in opening the second application or the third application, and further improving human-machine interaction performance of the terminal device.

According to a third aspect, an embodiment of this application provides an electronic device. The electronic device includes: a display screen, one or more processors, and a memory. The memory is coupled to the one or more processors, the memory is configured to store computer program code, the computer program code includes computer instructions, and the one or more processors invoke the computer instructions, so that the electronic device performs the following operations; displaying a first user interface on the display screen, where the first user interface is an interface of a first application, or the first user interface is a home screen of the electronic device; and the first user interface includes a status bar and a content display area; when detecting that a current location is within a travel station area range, displaying a display window in a first shape in the content display area on the display screen, and displaying critical information of a transport code-related application in the display window in the first shape, where the critical information of the transport code-related application includes an icon and station information of the transport code-related application and reminding information about opening the transport code-related application, and a size of the first shape is less than ¼ of a size of the content display area; and in response to an operation of dragging the display window in the first shape displayed in the content display area to the status bar, displaying a capsule-shaped display window in the status bar on the display screen, and displaying identification information of the transport code-related application in the capsule-shaped display window.

With reference to some embodiments of the third aspect, in some embodiments, the one or more processors are specifically configured to invoke the computer instructions, so that the device performs the following operation: when the first user interface displays the display window, skipping, by the electronic device, running the transport code-related application.

With reference to some embodiments of the third aspect, in some embodiments, the one or more processors are further configured to invoke the computer instructions, so that the device performs the following operations: in response to an operation of tapping the display window in the first shape, switching the display window in the first shape in the content display area to a rectangular display window; and displaying, in the rectangular display window in the content display area on the display screen, critical information including a transport code.

With reference to some embodiments of the third aspect, in some embodiments, the one or more processors are further configured to invoke the computer instructions, so that the device performs the following operations: when no operation performed on the display window in the first shape is detected within first preset duration, switching the display window in the first shape in the content display area to a round display window; and displaying the critical information of the icon or the station information of the transport code-related application in the round display window in the content display area on the display screen, where a display area of the round display window is smaller than a display area of the display window in the first shape.

With reference to some embodiments of the third aspect, in some embodiments, the one or more processors are further configured to invoke the computer instructions, so that the device performs the following operations: in response to an operation of a user of dragging the content display area or the display window in the status bar, displaying the dragged display window as a circle in the content display area interface, and skipping displaying the critical information of the transport code-related application in the dragged display window.

With reference to some embodiments of the third aspect, in some embodiments, the one or more processors are further configured to invoke the computer instructions, so that the device performs the following operations: obtaining the station information of the transport code-related application every second preset duration; when the station information of the electronic device is updated, displaying the display window in the first shape in the content display area; and displaying critical information of updated station information of the transport code-related application and the icon of the transport code-related application in the display window in the first shape in the content display area on the display screen.

With reference to some embodiments of the third aspect, in some embodiments, the one or more processors are further configured to invoke the computer instructions, so that the device performs the following operations: in response to an operation of touching and holding the display window, displaying a user interface of the transport code-related application, and displaying the transport code on the user interface of the transport code-related application on the display screen.

According to a fourth aspect, an embodiment of this application provides an electronic device. The electronic device includes: a display screen, one or more processors, and a memory. The memory is coupled to the one or more processors, the memory is configured to store computer program code, and the computer program code includes computer instructions. The one or more processors invoke the computer instructions, so that the device performs the following operations: displaying a first user interface on the display screen, where the first user interface is a user interface of a first application running on the electronic device, or the first user interface is a lock screen of the electronic device; and the first user interface includes a status bar and a content display area; when detecting that a first preset condition is met, displaying a display window in a first shape in the content display area on the display screen, where the display window in the first shape is configured to display critical information of the second application, the critical information includes identification information of the second application, and a size of the first shape is less than ¼ of a size of the content display area, where the second application matches the first preset condition, the first preset condition includes at least one of the following: a location of the electronic device is within a preset first area range, a system time of the electronic device is within a preset first time range, or the electronic device obtains a preset first notification message; and in response to an operation of dragging the display window in the first shape displayed in the content display area to the status bar, displaying a capsule-shaped display window in the status bar on the display screen, and displaying critical information of the second application in the capsule-shaped display window in the status bar, where the critical information of the second application displayed in the capsule-shaped display window in the status bar is less than the critical information of the second application displayed in the display window in the first shape.

With reference to some embodiments of the fourth aspect, in some embodiments, the one or more processors are further configured to invoke the computer instructions, so that the device performs the following operation: when the first user interface displays the display window, skipping running the second application.

With reference to some embodiments of the fourth aspect, in some embodiments, the one or more processors are further configured to invoke the computer instructions, so that the device performs the following operations: in response to a first user operation, switching the display window in the first shape in the content display area to a rectangular display window; and displaying critical information of the second application in the rectangular display window in the content display area on the display screen, where the critical information of the second application displayed in the rectangular display window is more than the critical information of the second application displayed in the display window in the first shape, and a display area of the rectangular display window is larger than a display area of the display window in the first shape.

With reference to some embodiments of the fourth aspect, in some embodiments, the first user operation is tapping the display window, pressing a first button, or entering a first voice message; and the first button includes one or more of a power button, an up-volume button, and a down-volume button.

With reference to some embodiments of the fourth aspect, in some embodiments, the one or more processors are further configured to invoke the computer instructions, so that the device performs the following operations: when no operation performed on the display window is detected within first preset duration, switching the display window in the first shape in the content display area to a round display window; and displaying the identification information of the second application in the round display window in the content display area on the display screen, or displaying, in the round display window, some information of the critical information of the second application displayed in the display window in the first shape, where a display area of the round display window is smaller than the display area of the display window in the first shape.

With reference to some embodiments of the fourth aspect, in some embodiments, the one or more processors are further configured to invoke the computer instructions, so that the device performs the following operations: receiving a second user operation, where the second user operation is that a user drags the display window in the content display area or drags the display window in the status bar; and in response to the second user operation, displaying the round display window on the first user interface on the display screen in a process of dragging the display window, and skipping displaying the critical information of the second application in the dragged round display window.

With reference to some embodiments of the fourth aspect, in some embodiments, the one or more processors are further configured to invoke the computer instructions, so that the device performs the following operations: obtaining the critical information of the second application every second preset duration; when the electronic device detects that the critical information of the second application is updated, displaying the display window in the first shape in the content display area on the display screen; and displaying updated critical information of the second application and the identification information of the second application in the display window in the first shape in the content display area on the display screen.

With reference to some embodiments of the fourth aspect, in some embodiments, there are a plurality of pieces of critical information of the second application. The one or more processors are further configured to invoke the computer instructions, so that the device performs the following operation: alternately displaying the plurality of pieces of critical information of the second application in the display window in the first shape in the content display area on the display screen.

With reference to some embodiments of the fourth aspect, in some embodiments, the one or more processors are further configured to invoke the computer instructions, so that the electronic device performs the following operation: in response to a third user operation performed on the display window, displaying a second user interface on the display screen, where the second user interface is an interface of the second application or an interface of the third application, and the third application is an application associated with the second application.

According to a fifth aspect, an embodiment of this application provides a chip system. The chip system is applied to an electronic device. The chip system includes one or more processors. The processor is configured to invoke computer instructions, so that the electronic device performs the method according to any one of the first aspect and the possible implementations of the first aspect or any one of the second aspect and the possible implementations of the second aspect.

It can be understood that the chip system may include one processor 101 in an electronic device 100 shown in FIG. 2A, or may include a plurality of processors 101 in an electronic device 100 shown in FIG. 2A. The chip system may further include one or more other chips, for example, may include an image signal processing chip in a camera 107 in the electronic device 100 shown in FIG. 2A, and may further include an image display chip in a display screen 108 or the like. This is not limited herein.

According to a sixth aspect, an embodiment of this application provides a computer program product including instructions. When the computer program product runs on an electronic device, the electronic device is enabled to perform the method according to any one of the first aspect and the possible implementations of the first aspect or any one of the second aspect and the possible implementations of the second aspect.

According to a seventh aspect, an embodiment of this application provides a computer-readable storage medium, including instructions. When the instructions are run on an electronic device, the electronic device is enabled to perform the method according to any one of the first aspect and the possible implementations of the first aspect or any one of the second aspect and the possible implementations of the second aspect.

It can be understood that the electronic device provided in the third aspect, the electronic device provided in the fourth aspect, the chip system provided in the fifth aspect, the computer program product provided in the sixth aspect, and the computer storage medium provided in the seventh aspect are all configured to perform the methods provided in the embodiments of this application. Therefore, for beneficial effects that can be achieved, refer to the beneficial effects in the corresponding methods. Details are not described herein again.

Figure 1D:
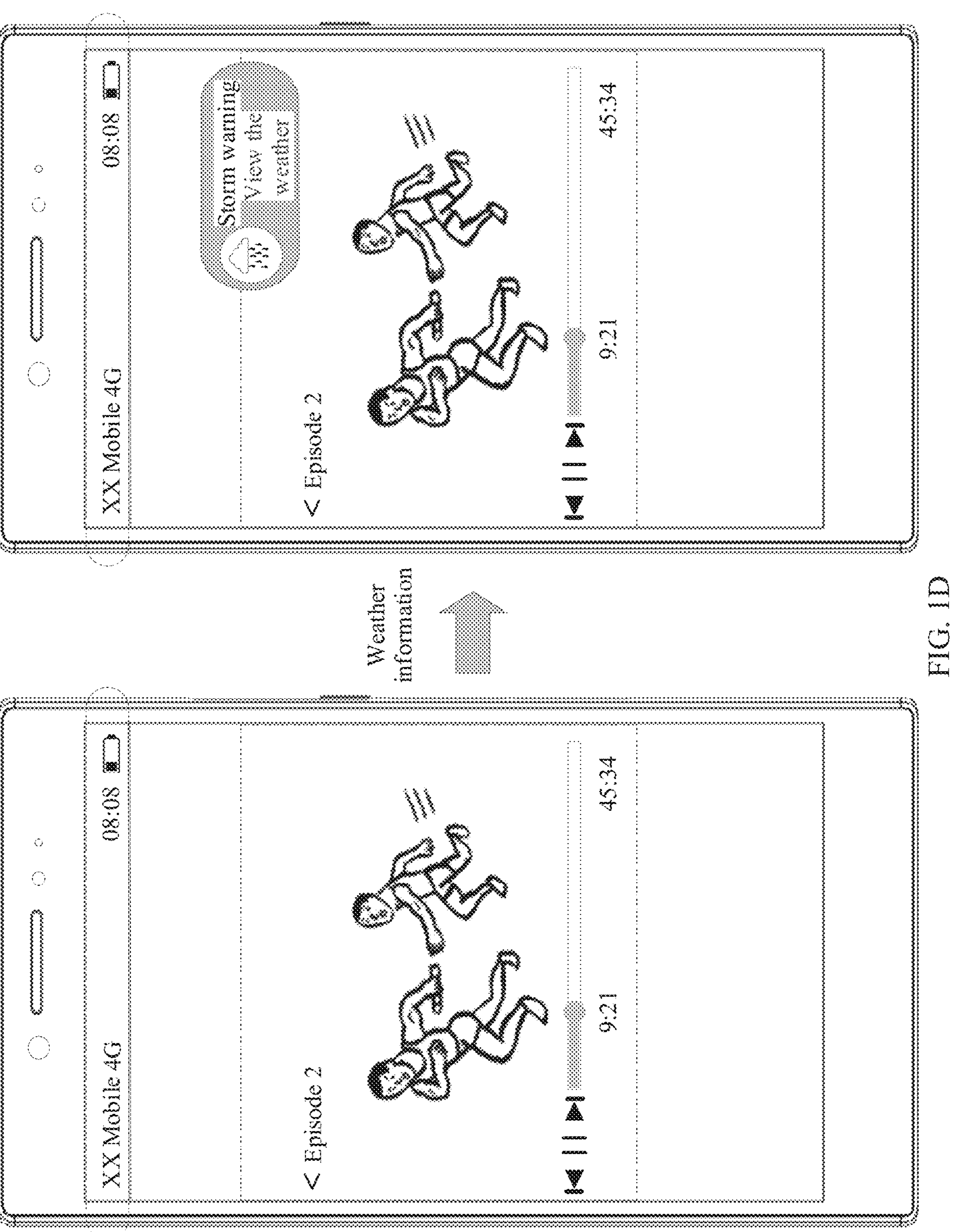
FIG. 1A(1) to FIG. 1B(2) are scenario schematic diagrams according to a conventional technology.
Figure 1E:
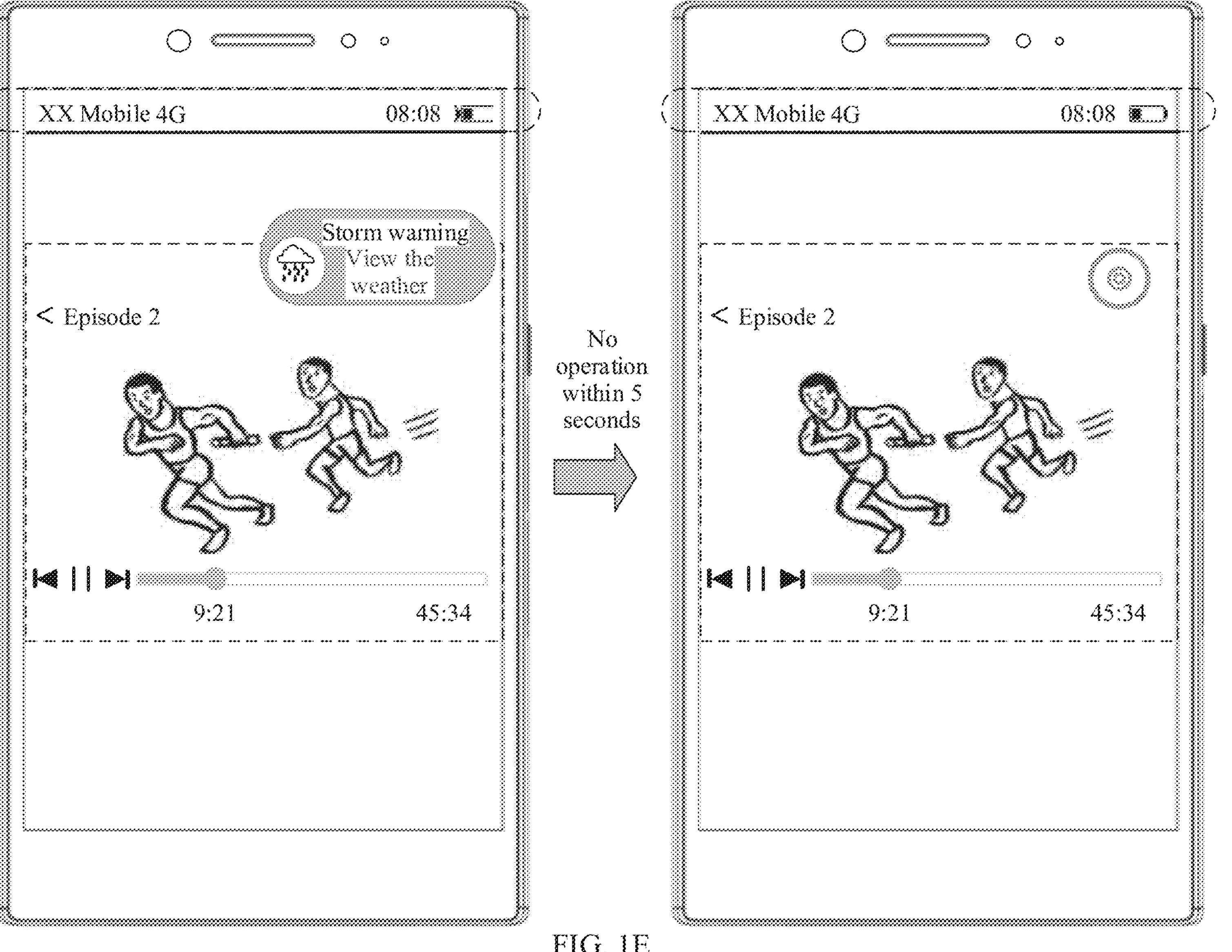
Figure 2A:
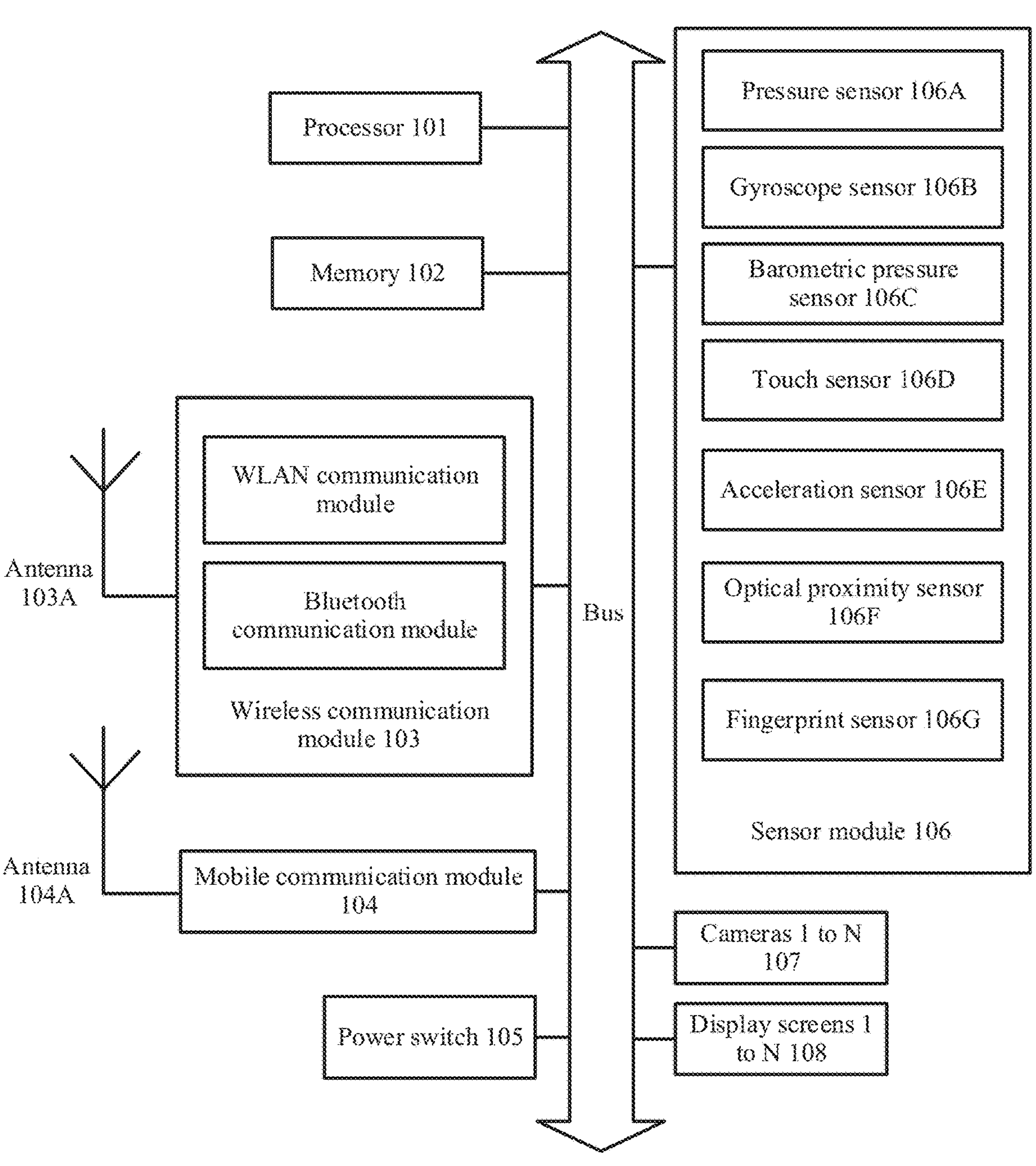
Figure 2B:
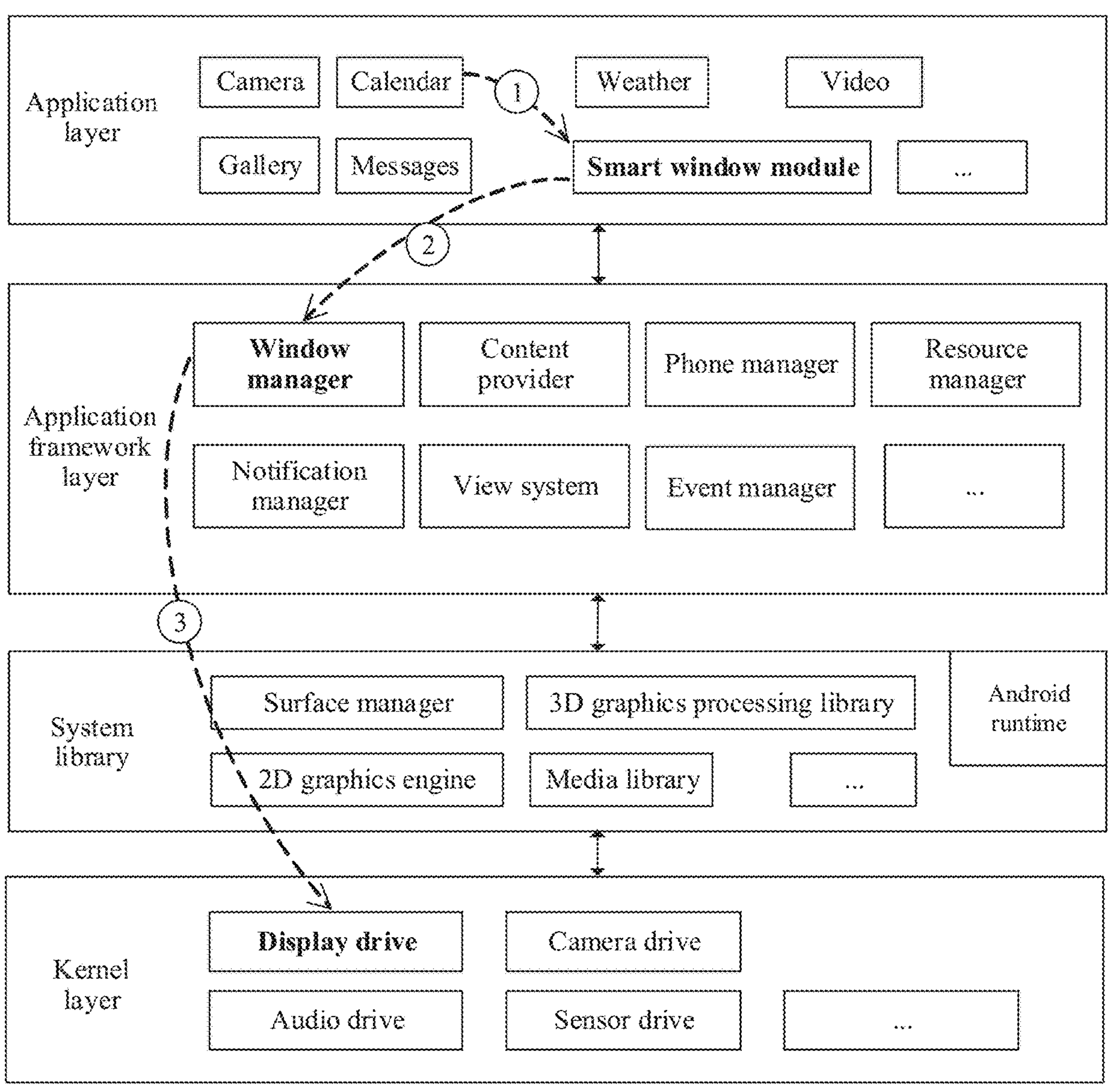
Figure 7A:
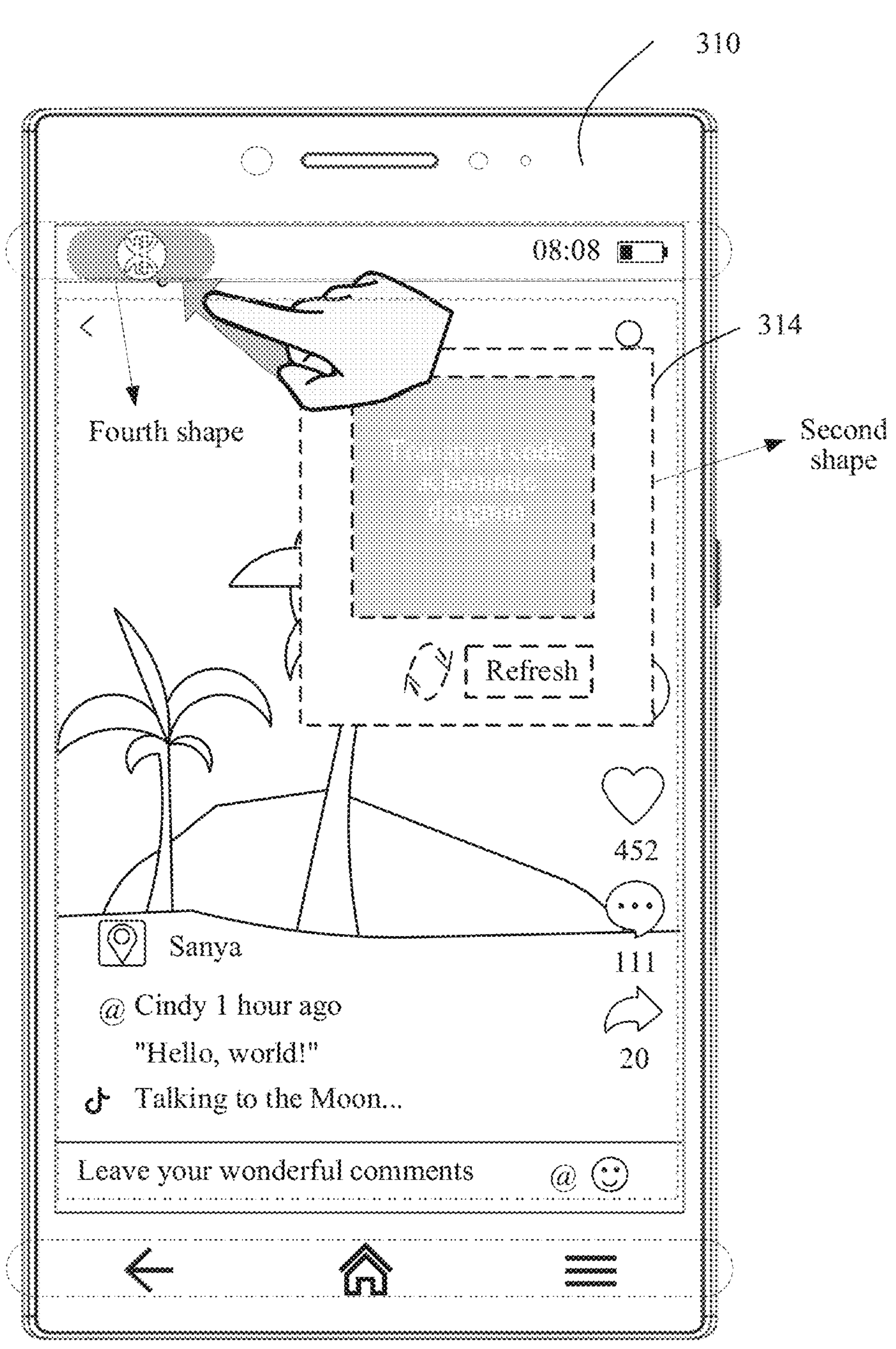
Figure 8A:
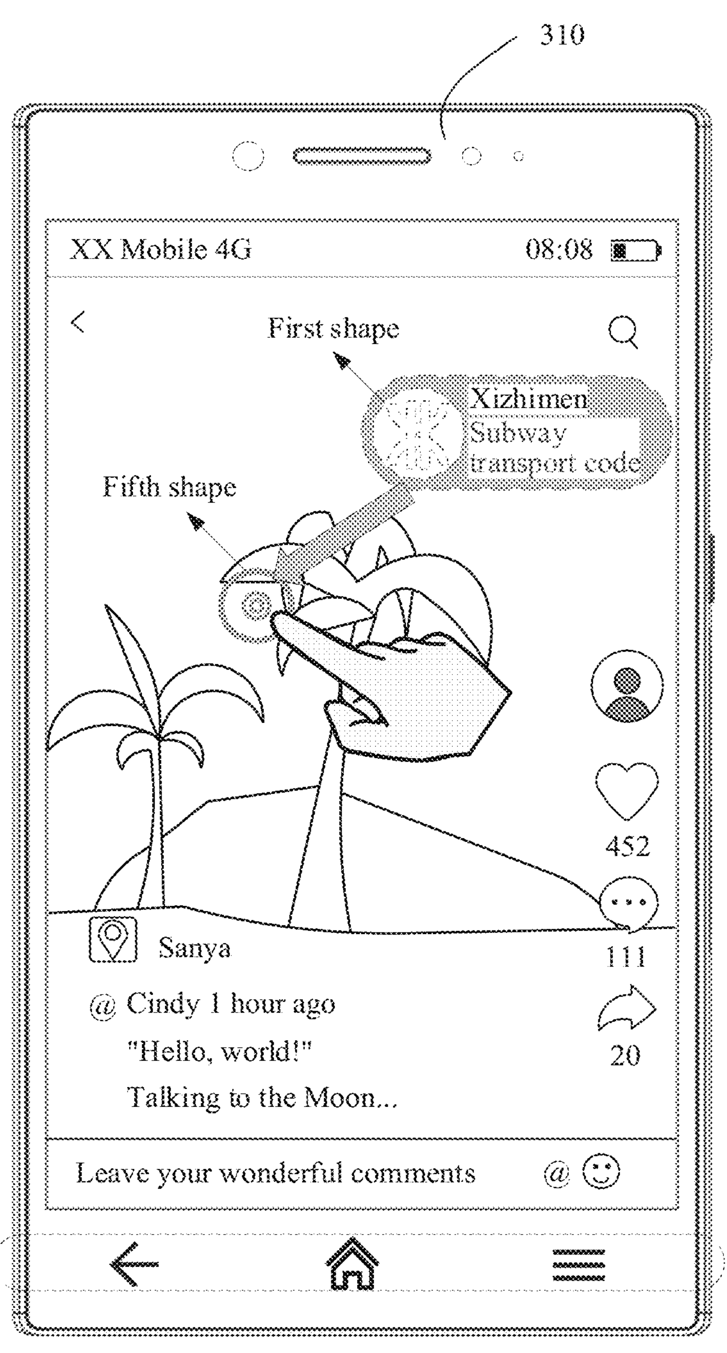
Figure 9:
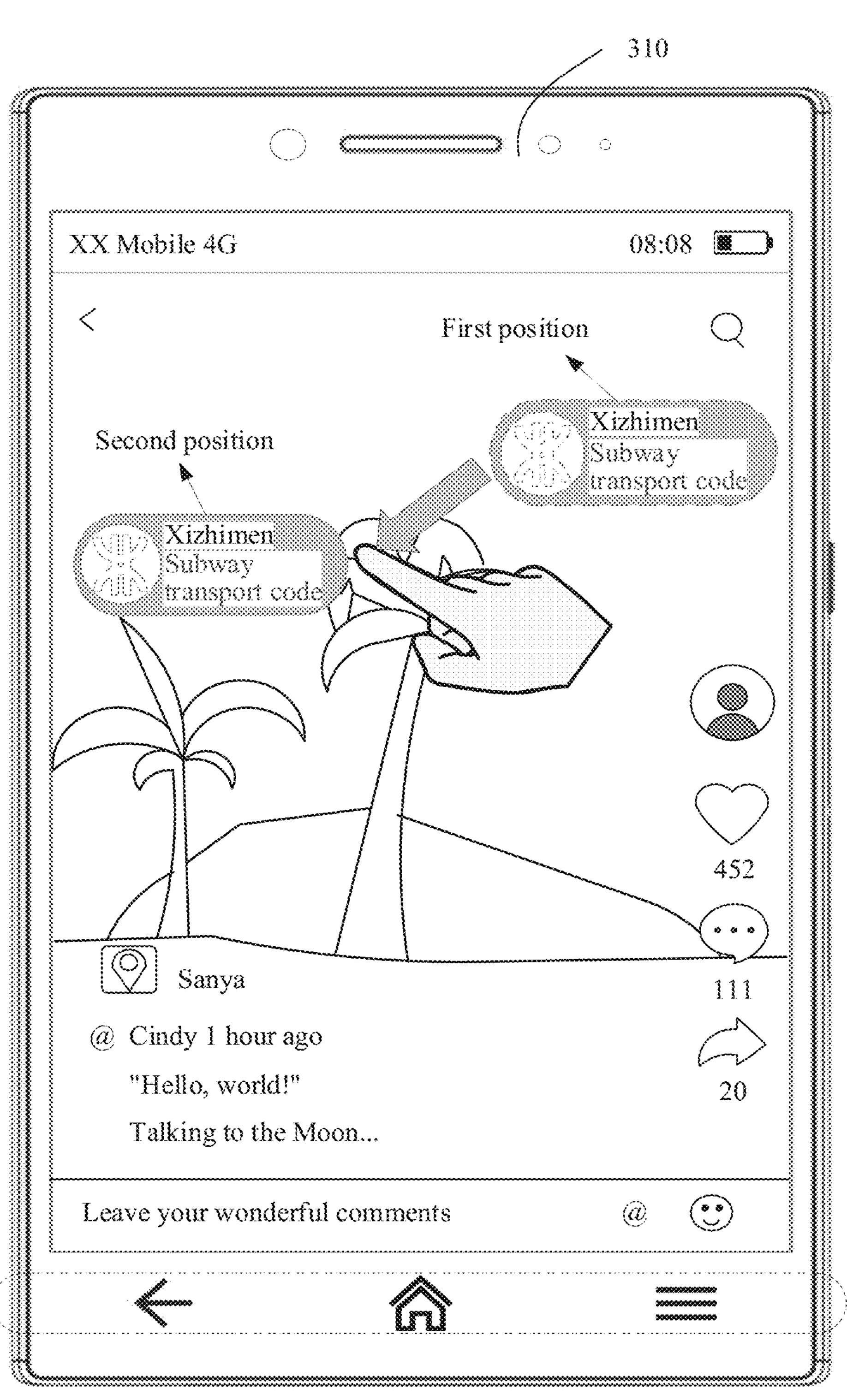
Figure 10A:
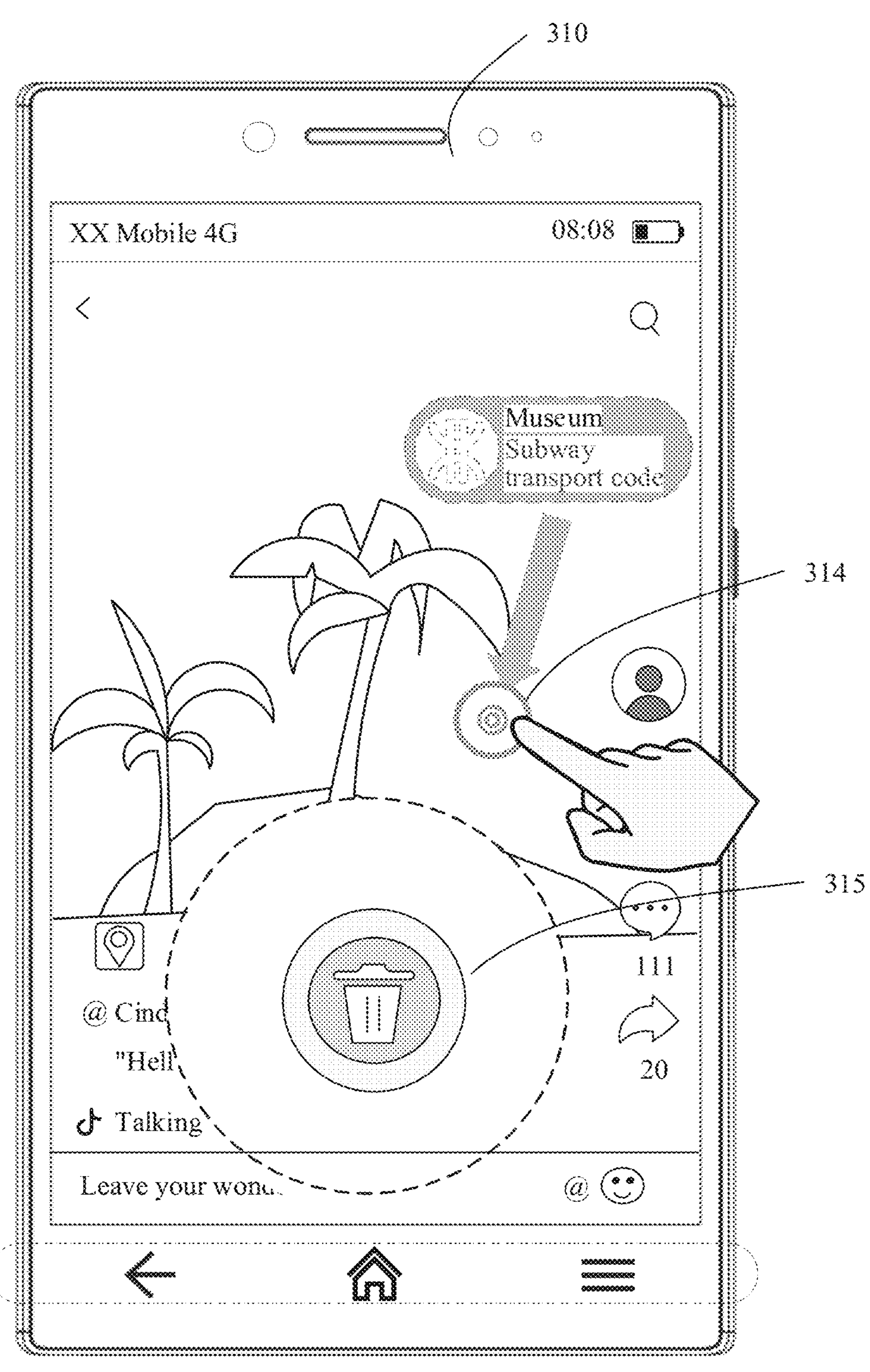
Figure 10B:
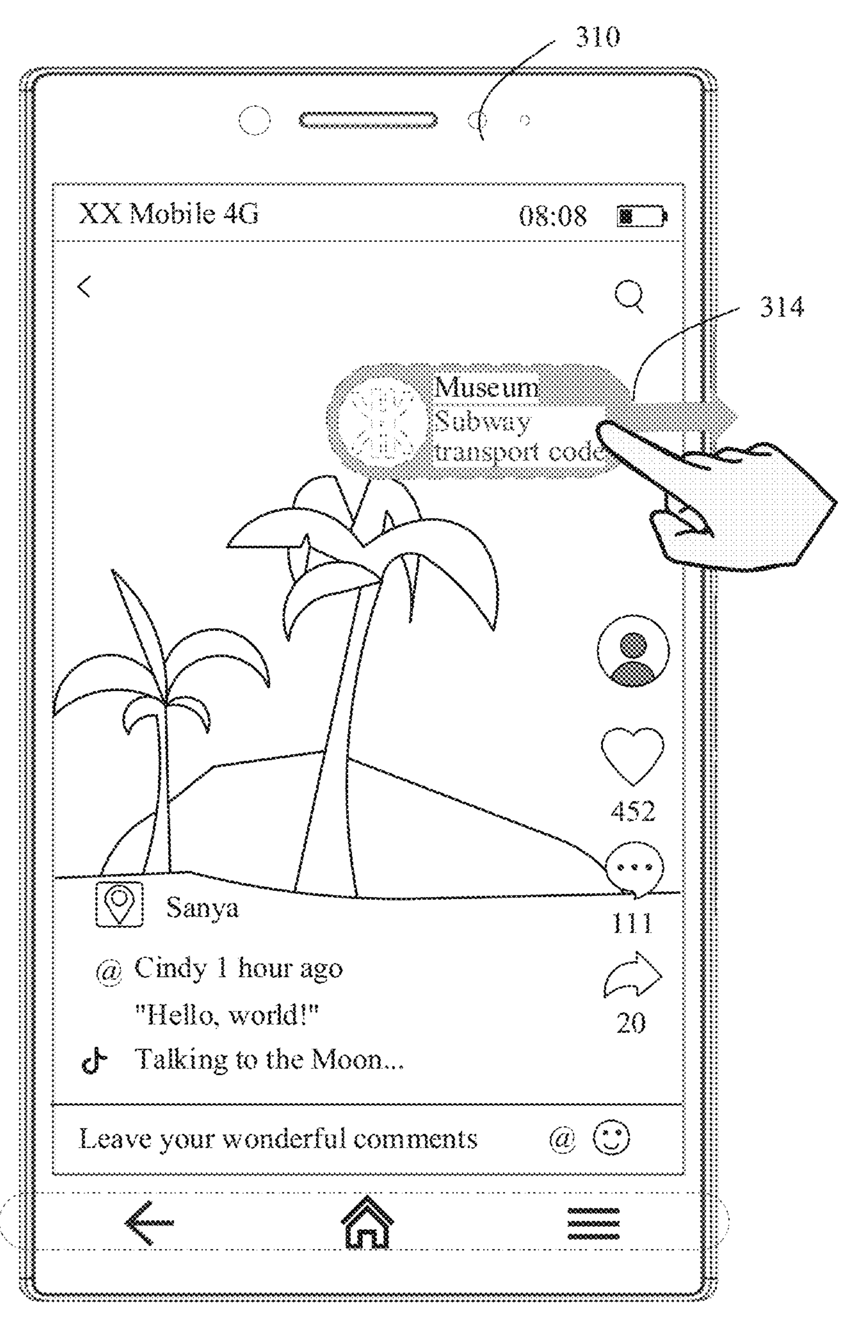
Figure 12:
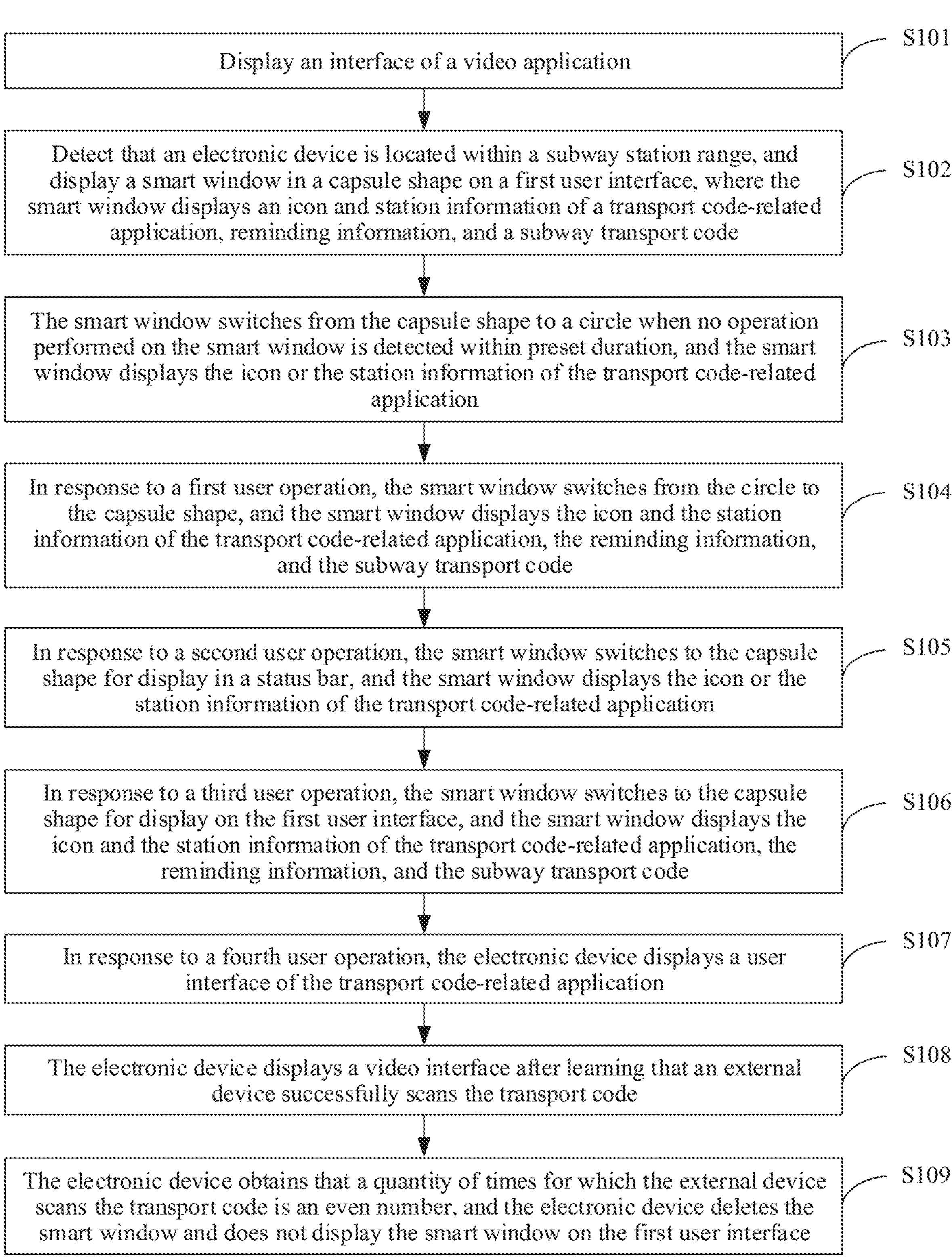
Figure 13:
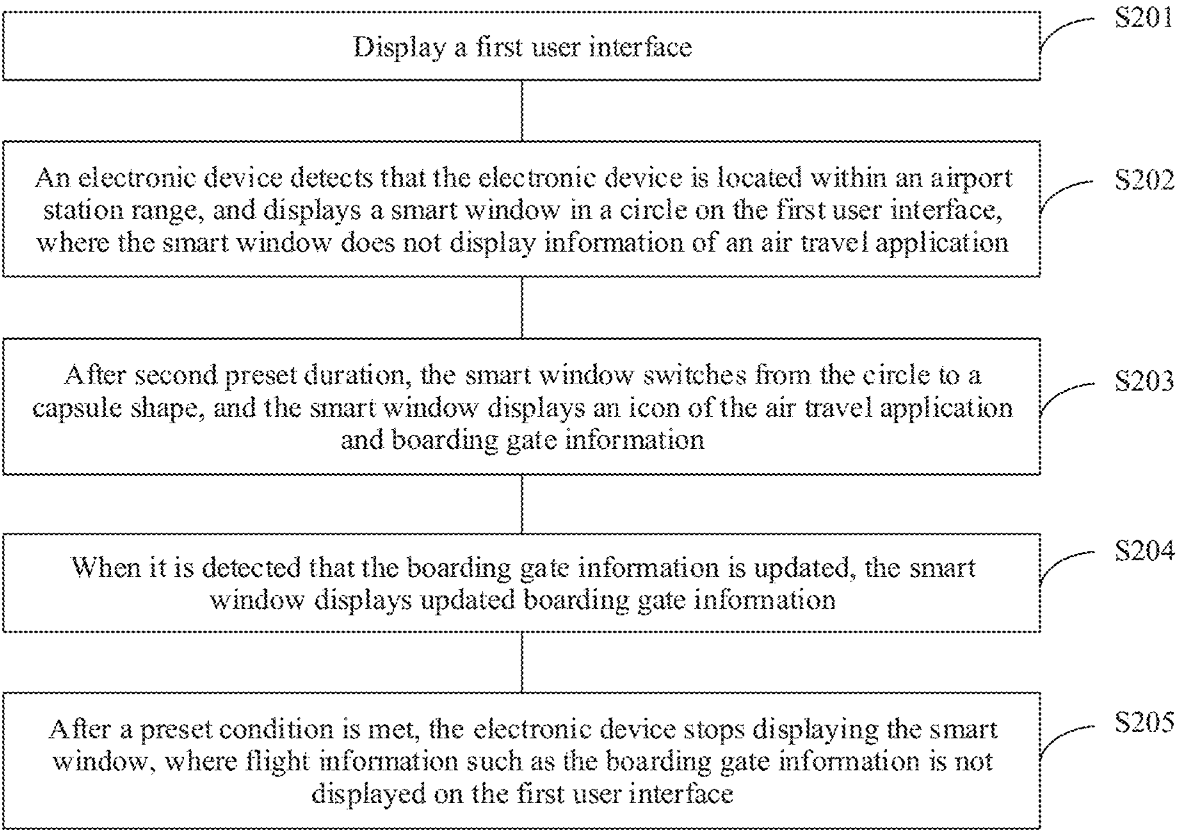

FIG. C(1) to FIG. 1E are schematic diagrams of an information display method according to an embodiment of this application;

FIG. 2A is a schematic diagram of a structure of an electronic device 100 according to an embodiment of this application:

FIG. 2B is a block diagram of a software structure of an electronic device 100 according to an embodiment of this application:

FIG. 3A(1) to FIG. 3E(2) show a process of displaying a smart window according to an embodiment of this application:

FIG. 4A(1) to FIG. 4B(2) show a process in which an electronic device displays a smart window in a first shape and the smart window switches to a second shape when a preset condition is met according to an embodiment of this application;

FIG. 5A(1) to FIG. 5D(2) show a process in which an electronic device displays a smart window in a first shape and the smart window switches to a third shape when a preset condition is met according to an embodiment of this application;

FIG. 6A(l) to FIG. 6E(2) show a process in which an electronic device displays a smart window in a first shape and the smart window switches to a fourth shape when a preset condition is met according to an embodiment of this application;

FIG. 7A shows a process in which an electronic device displays a smart window in a second shape or displays a smart window in a fourth shape, and the smart window switches to a third shape when a preset condition is met according to an embodiment of this application;

FIG. 8A to FIG. 8B(2) show a process in which an electronic device displays a smart window in a second shape or displays a smart window in a third shape, and the smart window switches to a fourth shape when a preset condition is met according to an embodiment of this application:

FIG. 9 shows a process in which an electronic device displays a smart window in any shape and the smart window switches to a fifth shape when a preset condition is met according to an embodiment of this application;

FIG. 10A and FIG. 10B show a process in which an electronic device displays a smart window in any shape and the smart window switches to a first shape when a preset condition is met according to an embodiment of this application;

FIG. 11A(1) to FIG. 11B(2) show a process in which an electronic device hides a smart window when a preset condition is met according to an embodiment of this application:

FIG. 12 is a schematic flowchart of a display method according to an embodiment of this application; and FIG. 13 is a schematic flowchart of another display method according to an embodiment of this application.

DESCRIPTION OF EMBODIMENTS

The following clearly describes technical solutions in embodiments of this application with reference to the accompanying drawings. In the descriptions of the embodiments of this application, unless otherwise stated, "i" represents "or". For example, A/B may represent A or B. In this application. "and/or" merely describes an association relationship between associated objects and represents that three relationships may exist. For example, A and/or B may represent the following three cases: Only A exists, both A and B exist, and only B exists. In addition, in the descriptions of the embodiments of this application. "a plurality of" means two or more than two.

In the following, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

The term "user interface (user interface, UI)" in the following embodiments of this application is a medium interface, used for interaction and information exchange between an application or an operating system and a user. The user interface converts an internal form of information into a form acceptable to a user. The user interface is source code written in a specific computer language such as Java or an extensible markup language (extensible markup language, XML). Interface source code is parsed and rendered on an electronic device, and is finally presented as content that can be identified by the user. The user interface is usually represented in a form of a graphical user interface (graphical user interface, GUI), which is a user interface displayed in a graphical mode and related to computer operations. The user interface may be a visual interface element such as a text, an icon, a button, a menu, a tab, a text box, a dialog box, a status bar, a navigation bar, or a widget displayed on a display screen of the electronic device.

In a display mode, as shown in FIG. 1A(1) and FIG. 1A(2), if a user is watching a video through a video application on the electronic device. In this case, if the user also needs to check the weather on the electronic device, the user may switch the electronic device to the home screen. The electronic device may switch the video application from a foreground running state to a background running state, and display a floating window of the video application.

As shown in FIG. 1B(1) and FIG. 1B(2), the user taps a weather application to check the weather. If the weather changes greatly on the day, the user wants to learn of weather changes in real time and enable the weather change information to be displayed in a floating window. The electronic device has already displayed the floating window of the video application, and the weather information cannot be directly displayed in this floating window. Therefore, as shown in FIG. 1C(1) to FIG. 1C(3), the user needs to open the weather application first, and quit the weather application from the background. Only in this way, can the electronic device display the floating window of the weather application to display the weather changes on the day in real time.

In this display mode, when the user needs to see prompt information of an application A in the floating window, the user needs to open the application A first, and then quit the application A from the background. Only in this way, can the electronic device display the floating window of the application A. The operations are complex.

However, by using the display method provided in the embodiments of this application, even if the electronic device is displaying a user interface of the application A, the electronic device directly displays a smart window on the user interface of the application A when a display condition B of the smart window is met, and displays related information corresponding to a display condition B in the smart window. In addition, the electronic device may automatically adjust a shape of the smart window based on a current scenario, or the user may actively adjust a shape of the smart window based on a requirement of the user. When a condition of hiding the smart window is met, the electronic device may automatically hide the smart window.

For example, as shown in FIG. 1D, a user is watching a video through a video application on an electronic device, and the electronic device is displaying a user interface of the video application. The weather changes greatly on the day, and the electronic device can display a smart window on the screen of the video application, and display a storm warning in the smart window to remind the user. The user does not need to quit the video application, open the weather application, and then switch the weather application from foreground to background. This is more convenient. Further, as shown in FIG. 1E, when the electronic device has not detected any operation performed on the smart window within five seconds, the smart window switches to a small circle to avoid causing interference to the user.

In this way, when a display condition of a smart window of an application A is met, the electronic device directly displays the smart window on a currently displayed screen, and displays related information of the application A in the smart window. The user does not need to open the application A manually and then quit the application A. This is more convenient.

In addition, the smart window may display different shapes to meet diversified requirements of users. Furthermore, when a condition of hiding the smart window is met, the smart window hides automatically, causing no interference to users.

It should be noted that the foregoing smart window is a movable window that is provided by the application A pre-installed on the electronic device and that is displayed in a floating manner on a screen of another application or a lock screen. When another application is not enabled on the electronic device, the application A can obtain critical information of the another application, and display the obtained critical information of the another application in the smart window provided in the application A to remind the user and/or trigger to the another application. Compared with a conventional floating window, the smart window may occupy a smaller area, and switch to a display shape more suitable for a current scenario when a condition is met, for example, display as a capsule shape, a rectangle, or a circle, thereby further reducing an occupied area and even occupying no area at all by hiding. Therefore, an impact on content displayed on a current user interface is reduced while the critical information of the another application is displayed.

In some embodiments, the smart window in this embodiment of this application may also be referred to as a display window.

With reference to FIG. 2A and FIG. 2B, the following describes an example electronic device provided in the following embodiment of this application. The electronic device in this application may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, or an artificial intelligence (artificial intelligence, AI) device. A specific type of the electronic device is not particularly limited in this embodiment of this application. An example embodiment of the electronic device 100 includes but is not limited to a portable electronic device or a non-portable device equipped with iOS®, Android®, Harmony®, Windows®, Linux, or another operating system.

FIG. 2A is a schematic diagram of a structure of an example electronic device 100 according to an embodiment of this application.

The electronic device 100 may include: a processor 101, a memory 102, a wireless communication module 103, a mobile communication module 104, an antenna 103A, an antenna 104A, a power switch 105, a sensor module 106, cameras 1 to N107, display screens 1 to N108, and the like. The sensor module 106 may include a pressure sensor 106A, a gyroscope sensor 106B, a barometric pressure sensor 106C, a touch sensor 106D, an acceleration sensor 106E, an optical proximity sensor 106F, a fingerprint sensor 106G, and the like. The wireless communication module 103 may include a WLAN communication module, a Bluetooth communication module, and the like. The foregoing plurality of parts may transmit data by using a bus.

It can be understood that the structure illustrated in this embodiment of the present invention does not constitute a specific limitation on the electronic device 100. In some other embodiments of this application, the electronic device 100 may include more or fewer components than those shown in the figure, or some components may be combined, or some components may be split, or a different component arrangement may be used. The components shown in the figure may be implemented by hardware, software, or a combination of software and hardware.

The processor 101 may include one or more processing units. For example, the processor 101 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices or may be integrated into one or more processors.

In some embodiments of this application, the processor 101 may be configured to: determine that a first preset condition is met, drive a display screen 109 to display a smart window, and so on.

The controller may be a nerve center and a command center of the electronic device 100. The controller may generate an operation control signal based on instruction operation code and a timing signal, to complete control of instruction fetching and instruction execution.

The processor 101 may further be provided with a memory for storing instructions and data. In some embodiments, the memory of the processor 101 is a cache memory. The memory can store instructions or data just used or used cyclically by the processor 101. If the processor 101 needs to use the instructions or the data again, the processor 101 may directly invoke the instructions or the data from the memory, thereby avoiding repeated access, reducing waiting time of the processor 101, and improving system efficiency. In some embodiments, the processor 101 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus, USB) interface, and/or the like.

It may be understood that an interface connection relationship between the modules shown in embodiments of the present invention is merely an example for description, and does not constitute a limitation on the structure of the electronic device 100. In some other embodiments of this application, the electronic device 100 may alternatively use an interface connection manner different from that in the foregoing embodiment, or may use a combination of a plurality of interface connection manners.

The wireless communication function of the electronic device 100 may be implemented by using the antenna 104A, the antenna 103A, the mobile communication module 104, the wireless communication module 103, the modem processor, the baseband processor, and the like.

The antenna 104A and the antenna 103A are configured to transmit or receive an electromagnetic wave signal. Each antenna in the electronic device 100 may be configured to cover one or more communication frequency bands. Different antennas may be further multiplexed to improve antenna utilization. For example, the antenna 104A may be multiplexed as a diversity antenna in a wireless local area network. In some other embodiments, the antenna may be used in combination with a tuning switch.

The mobile communication module 104 may provide a wireless communication solution including 2G/3G/4G/5G and the like to be applied to the electronic device 100. The mobile communication module 104 may include at least one filter, a switch, a power amplifier, a low noise amplifier (low noise amplifier, LNA), or the like. The mobile communication module 104 may receive an electromagnetic wave through the antenna 104A, perform processing such as filtering or amplification on the received electromagnetic wave, and transmit the electromagnetic wave to the modem processor for demodulation. The mobile communication module 104 may further amplify a signal modulated by the modem processor and convert the signal into electromagnetic waves for radiation through the antenna 104A. In some embodiments, at least some functional modules of the mobile communication module 104 may be disposed in the processor 101. In some embodiments, at least some functional modules of the mobile communication module 104 and at least some modules of the processor 101 may be disposed in a same device.

The modem processor may include a modulator and a demodulator. In some embodiments, the modem processor may be a separate device. In some other embodiments, the modem processor may be independent of the processor 101, and the modem processor and the mobile communication module 104 or another functional module may be disposed in a same device.

The wireless communication module 103 may provide a solution for wireless communication including a wireless local area network (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device 100. The wireless communication module 103 may be one or more components integrating at least one communication processor module. The wireless communication module 103 receives an electromagnetic wave through the antenna 103A, performs frequency modulation and filtering processing on an electromagnetic wave signal, and sends the processed signal to the processor 101. The wireless communication module 103 may further receive a to-be-sent signal from the processor 101, perform frequency modulation and amplification on the signal, and convert the signal into an electromagnetic wave for radiation through the antenna 103A.

In some embodiments, in the electronic device 100, the antenna 104A and the mobile communication module 104 are coupled, and the antenna 103A and the wireless communication module 103 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 109, the application processor, and the like. The GPU is an image processing microprocessor, and is connected to the display screen 109 and the application processor. The GPU is configured to perform mathematical and geometric calculation for graphic rendering. The processor 101 may include one or more GPUs, which execute program instructions to generate or change displayed information.

The display screen 109 is configured to display an image, a video, and the like. The display screen 109 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode. FLED), a Mini LED, a Micro LED, a Micro OLED, a quantum dot light emitting diode (quantum dot light emitting diodes. QLED), or the like. In some embodiments, the electronic device 100 may include one or N display screens 109, where N is a positive integer greater than 1.

In some embodiments of this application, the display screen 109 may be configured to display a user interface provided in the subsequent embodiment and implemented on the electronic device. For example, content on the screen is a video play interface provided in a video application. For specific implementation of the user interface, refer to the subsequent embodiment. Details are not described herein.

The camera 108 is configured to capture a static image or video. An object generates an optical image through a lens, and the optical image is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to an ISP to convert the electrical signal into a digital image signal. The ISP outputs the digital image signal to a DSP for processing. The DSP converts the digital image signal into an image signal in a format such as standard RGB or YUV. In some embodiments, the electronic device 100 may include one or N cameras 108, where N is a positive integer greater than 1.

The memory 102 may be configured to store computer executable program code, and the executable program code includes instructions. The processor 101 executes various functional applications and data processing of the electronic device 100 by executing instructions stored in the memory 102. The memory 102 may include a program storage area and a data storage area. The program storage area may store an operating system, an application required by at least one function (such as an audio play function or an image play function), and the like. The data storage area may store data (for example, audio data and a phone book) created in a process of using the electronic device 100 and the like. In addition, the memory 102 may include a high-speed random-access memory, and may further include a non-volatile memory, for example, at least one magnetic disk memory, a flash memory, or a universal flash storage (universal flash storage. UFS).

The pressure sensor 106A is configured to sense a pressure signal, and may convert the pressure signal into an electrical signal. In some embodiments, the pressure sensor 106A may be disposed on the display screen 109. There are many types of pressure sensors 106A, for example, a resistive pressure sensor, an inductive pressure sensor, and a capacitive pressure sensor. The capacitive pressure sensor may include at least two parallel plates with conductive a material. When a force is applied to the pressure sensor 106A, a capacitance between electrodes changes. The electronic device 100 determines strength of the pressure based on a change in the capacitance. When a touch operation is performed on the display screen 109, the electronic device 100 detects strength of the touch operation based on the pressure sensor 106A. The electronic device 100 may further calculate a touch position based on a detection signal of the pressure sensor 106A. In some embodiments, touch operations performed on a same touch position with different touch strength may correspond to different operation instructions. For example, when a touch operation with touch operation strength less than a first pressure threshold is performed on an SMS application icon, an instruction of viewing an SMS message is executed. When a touch operation with touch operation strength greater than or equal to the first pressure threshold is performed on the SMS application icon, an instruction of creating a new SMS message is executed. In some embodiments of this application, the pressure sensor 106A may be disposed on the display screen 109.

In some embodiments of this application, the pressure sensor 106A may be disposed on the display screen 109. In some optional embodiments of this application, the pressure sensor 106A may be configured to, capture a pressure value generated when a finger of a user comes into contact with the display screen, and transmit the pressure value to the processor 101, so that the processor 101 identifies a specific portion of the finger of the user that enters the user operation.

In some embodiments, the pressure sensor 106A may be configured to obtain the pressure value applied by the user to the display screen, so as to detect a touching and holding operation performed by the user on the display screen. The electronic device 100 may change a position of the smart window on the user interface based on the touching and holding operation and a dragging operation of the user, further changing a display state of the smart window. For different display states of the smart window, refer to the subsequent content. Details are not described herein.

The gyroscope sensor 106B may be configured to determine a motion posture of the electronic device 100.

The touch sensor 106D is also referred to as a “touch panel”. The touch sensor 106D may be disposed on the display screen 109. A touchscreen includes the touch sensor 106D and the display screen 109, and is also referred to as a “touch control screen”. The touch sensor 106D is configured to detect a touch operation performed on or near the touchscreen. The touch sensor 106D can transmit the detected touch operation to an application processor to determine a touch event type. A visual output related to the touch operation may be provided through the display screen 109. In some other embodiments, the touch sensor 106D may alternatively be disposed on a surface of the electronic device 100, and at a position different from that of the display screen 109.

In some optional embodiments of this application, the display screen 109 is provided with a touch panel, which may be configured to receive a touch operation of the user. The touch operation is an operation of touching the display screen 109 by the user with hand, elbow, or a stylus.

The acceleration sensor 106E can detect accelerations of the electronic device 100 in various directions (generally three axes), can detect a magnitude and a direction of gravity when the electronic device 100 is stationary, may further be configured to identify a posture of the electronic device, and is applied to horizontal and vertical screen switching and an application such as a pedometer.

In some optional embodiments of this application, the acceleration sensor 106E may be configured to: capture an acceleration value generated when a finger of a user comes into contact with the display screen, and transmit the acceleration value to the processor 101, so that the processor 101 identifies a specific portion of the finger of the user that enters the user operation.

The optical proximity sensor 106F may include, for example, a light emitting diode (LED) and an optical detector, for example, a photodiode.

In some optional embodiments of this application, when an object (such as a face) approaches the electronic device 100, the proximity light sensor 180G senses an object approaching the electronic device 100, thereby sending a signal to the processor 101 of the electronic device 100 to indicate that an object is approaching.

The fingerprint sensor 106G is configured to collect a fingerprint. The electronic device 100 may implement fingerprint unlock, application lock accessing, fingerprint photographing, fingerprint-based call answering, and the like by using a feature of the collected fingerprint.

The button 107 includes a power button, a volume button, and the like. The button 107 may be a mechanical button, or may be a touch button. The electronic device 100 may receive a button input and generate a button signal input related to a user setting and function control of the electronic device 100.

A software system of the electronic device 100 may use a layered architecture, an event-driven architecture, a micro core architecture, a micro service architecture, or a cloud architecture. In an embodiment of the present invention, a software structure of the electronic device 100 is described by using an Android system with a layered architecture as an example.

FIG. 2B is a block diagram of the software structure of the electronic device 100 according to an embodiment of the present invention.

In the layered architecture, software is divided into several layers, and each layer has a clear role and task. Layers communicate with each other through software interfaces. In some embodiments, the Android system is divided into four layers; an application layer, an application framework layer, an Android runtime (Android runtime) and a system library, and a kernel layer from top to bottom.

The application layer may include a series of application packages.

As shown in FIG. 2B, the application packages may include applications such as camera, gallery, calendar, phone, weather, video, and SMS message.

In this application, a smart window module may further be added to the application layer, and is configured to: display a floating window on an interface of another application on the electronic device or a home screen of the electronic device when a preset condition is met, display reminding information, and/or provide an entrance of another application.

The application framework layer provides an application programming interface (application programming interface, API) and a programming framework for an application at the application layer. The application framework layer includes some predefined functions.

As shown in FIG. 2B, the application framework layer may include a window manager, a content provider, a view system, a phone manager, a resource manager, a notification manager, an event manager, and the like.

The window manager is configured to manage a window program. The window manager may obtain a size of a display screen, determine whether there is a status bar, lock a screen, take a screenshot, and so on.

The content provider is configured to: store and obtain data, and make the data accessible to an application. The data may include a video, an image, audio, calls made and answered, a browse history, a bookmark, a phone book, and the like.

The view system includes a visual control, for example, a text display control or a picture display control. The view system may be configured to build an application. A display interface may include one or more views. For example, a display interface including an SMS message notification icon may include a text display view and a picture display view.

The resource manager provides various resources for an application, for example, a localized string, an icon, a picture, a layout file, and a video file.

The notification manager enables an application to display, in the status bar, notification information, which may be used to convey a notification-type message that can automatically disappear after a short stay without user interaction. For example, the notification manager is configured to: notify download completion, and give a message notification. The notification manager may further display a notification in a form of a chart or a scroll bar text in the status bar at the top of a system, for example, a notification of an application running m the background, or may display a notification in a form of a dialog window on the screen. For example, text information is prompted in the status bar, a prompt tone is made, an electronic device vibrates, or an indicator light flashes. For example, in some embodiments of this application, when the electronic device displays the smart window, the electronic device vibrates the motor or the indicator light flashes to remind a user.

The event manager may be configured to: when the electronic device displays the smart window, receive a touch operation of the user, obtain coordinates of a touch operation of the user, and upload an event of the touch operation to the application layer.

The Android runtime includes a core library and a virtual machine. The Android runtime is responsible for scheduling and management of the Android system.

The core library includes two parts: a performance function that needs to be invoked by the Java language and a core library of Android.

The application layer and the application framework layer run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of functional modules, for example, a surface manager (surface manager), a media library (Media Libraries), a 3D graphics processing library (for example, OpenGL ES), and a 2D graphics engine (for example, SGL).

The surface manager is configured to: manage a display subsystem, and converge 2D and 3D layers for a plurality of applications.

The kernel layer is a layer between hardware and software. The kernel layer includes at least a display drive, a camera drive, an audio drive, and a sensor drive.

The following describes examples of working procedures of software and hardware of the electronic device 100 with reference to a smart window scenario.

When the touch sensor 106D receives a touch operation enabling a shape change of the smart window, a corresponding hardware interruption is sent to the kernel layer. The kernel layer processes the touch operation into a raw input event (including information such as touch coordinates and a timestamp of the touch operation). The raw input event is stored at the kernel layer. The window manager of the application framework layer may obtain the raw input event from the kernel layer, and recognize a window management object corresponding to the input event, that is, an interface corresponding to the input event, so as to adjust a display shape of the smart window.

With reference to a scenario in which the smart window is displayed when the preset condition is met, the following describes a working procedure of software of the electronic device 100 by using examples.

In the embodiments of this application, the smart window module may invoke an API interface of the calendar application from the application framework layer to obtain holiday information of the calendar application, and the smart window module determines whether the holiday information is preset target information. If the holiday information is the target information, the smart window module notifies the window manager of the application framework layer, and the window manager may display the smart window on the display screen by invoking the kernel layer display drive.

The following describes display and shape change processes of the smart window in the embodiments of this application by using three different types of scenarios as examples.

Scenario type 1: At first, an electronic device does not display a smart window, but later triggers to display the smart window.

The electronic device is displaying a lock screen or a user interface of an application A. When determining that a preset condition A is met, the electronic device displays a first shape of the smart window corresponding to the preset condition A. The electronic device obtains related information of an application B corresponding to the preset condition A, and displays information corresponding to the application B in the first shape of the smart window.

A size of the first shape of the smart window is less than ¼ of a lock screen or a content display area on a user interface of the application A.

In some embodiments of this application, the display screen 109 may be configured to display the smart window and the user interface of the application A together. The smart window may be stacked and displayed on the user interface of the application A. When the display screen 109 is stacked and displayed on the user interface of the application A and the smart window, the smart window may be opaque, in other words, the user cannot see some content on the user interface of the application A through the smart window; or the smart window may be transparent, in other words, the user can see content on the user interface of the application A through the smart window. This is not limited herein.

The preset condition A may be a condition preset by the user, or may be a default factory condition of the electronic device. For example, the preset condition A may be: The electronic device arrives at a target area M, a time on the electronic device is a target time T, or target information E is obtained. This is not limited herein. The application B is an application corresponding to the preset condition A.

The following uses an example in which the user interface displayed in the smart window is a user interface of a video application to describe display of the smart window when the preset condition A is met.

FIG. 3A(1) shows an example user interface 310 of the video application on the electronic device 100. As shown in FIG. 3A(1), the user interface 310 includes: a status bar 311, a display area 312, and a navigation bar 313.

The status bar 311 may include one or more signal strength indicators of a mobile communication signal, a battery status indicator, and a time indicator.

The display area 312 may be configured to display content of a short video. The display area 312 includes a favorites control 312*a*, a comment control 312*b*, a forward control 312*c*, and an information display window 312*d*. The electronic device 100 detects a touch operation performed on the favorites control 312*c* in the video display window 312. In response to the operation, the electronic device 100 may add the currently played video content to favorites. The electronic device 100 detects a touch operation (for example, an operation of tapping the comment control 312*b*) performed on the comment control 312*b* in the video display area 312. In response to the operation, the electronic device 100 may display a comment entering window, and the user may enter a comment about the short video content in the entering window. The electronic device 100 detects a touch operation (for example, an operation of tapping the forward control 312*c*) performed on the forward control 312*c* of the video display area 312. In response to the operation, the electronic device 100 may forward the current short video content. The information display window 312*d* is configured to display a city identifier and description information about the short video content.

The navigation bar 313 may include system navigation buttons such as a return button 313A, a home screen (home screen) button 313B, and a call out task history button 313C. The home screen is an interface displayed after the electronic device 100 detects, on any user interface, a user operation performed on the home screen button 313B. When detecting that a user taps the return button 313A, the electronic device 100 may display a previous page of a current page. When detecting that the user taps the home screen button 313B, the electronic device 100 may display the home screen. When detecting that the user taps the call out task history button 313C, the electronic device 100 may display a task recently opened by the user. Each navigation button may have another name, which is not limited in this application. Each navigation button in the navigation bar 313 may alternatively be implemented as a physical button in addition to a virtual button.

For example, if the preset condition A is that the electronic device arrives at a travel station such as a subway station, an application associated with the preset condition is an application supporting a transport code. As shown in FIG. 3A(1) and FIG. 3A(2), when the user is watching a short video, the electronic device displays the user interface 310. When the electronic device 100 detects that the electronic device 100 is located in a subway station, the electronic device 100 displays the smart window 314 on the user interface 310. The electronic device 100 obtains that the subway station is Xizhimen, and the smart window displays an icon and station information "Xizhimen" of the transport code-related application to remind the user that the Xizhimen subway station is reached. The smart window 314 may further display reminding information "subway transport code" to remind the user to open the transport code interface to enter the station by scanning the code.

The electronic device 100 may obtain location information of the electronic device by using the global positioning system (global positioning system, GPS). Alternatively, the electronic device 100 may obtain a geographic location of the electronic device by using a sensorhub (sensorhub). The sensorhub is mainly used for low-power connection and processing of data from various sensor devices, for example, processing of data from sensors such as an accelerometer, a gyroscope, and a magnetometer, and fusion processing of data of various sensors. A positioning manner is not limited in this application.

For example, if the preset condition A is that the electronic device obtains notification information of the calendar application, an application corresponding to the preset condition is a shopping application. The electronic device displays the user interface 310. The electronic device 100 obtains holiday information. The electronic device 100 displays the smart window 314 on the user interface 310. The smart window 314 displays related information corresponding to the holiday information. The smart window displays "Mother's Day" and prompt information "purchasing a gift" to remind the user to open the shopping application to remind the user of the holiday information tomorrow, so that the user does not miss an important holiday.

For example, if the preset condition A is that the electronic device obtains weather-related information, the application corresponding to the preset condition is a weather application. For example, when the electronic device 100 obtains from the weather application that there is a rainstorm today, the electronic device 100 may display a storm warning in the smart window 314, and the user may view the weather prompt information in the smart window 314. The smart window 314 displays the weather warning, so that the user does not need to pull down the notification bar to learn of the weather information. This is more convenient.

For example, if the preset condition A is that a system time of the electronic device is a meal ordering time, the application corresponding to the preset condition is a meal ordering application. For example, the system time of the electronic device 100 is 11:00, the electronic device 100 displays the smart window 314, and displays reminding information such as "meal ordering time" or "viewing food" in the smart window 314 to remind the user to order a meal, so that the user does not forget to order a meal due to busy work.

In some optional embodiments, the preset condition A may be that a plurality of conditions are met. For example, the electronic device obtains target information E and a time on the electronic device is a target time T.

For example, if the preset condition A is that the electronic device obtains a boarding time and the system time of the electronic device is one hour before the boarding time. For example, as shown in FIG. 3B(1) and FIG. 3B(2), the electronic device displays the user interface 310, and the electronic device 100 obtains that the boarding time is 9:00 and needs to remind the user to prepare for boarding one hour before. When the system time of the electronic device 100 is 8:08, the electronic device 1X) displays the smart window 314 on the user interface 310, and displays reminding information such as "start boarding" and "view the boarding pass" in the smart window 314 to remind the user to prepare for boarding and avoid missing the boarding time.

The foregoing related information displayed in the smart window 314 is merely examples for description. In actual application, related information may be other information. This is not limited in this application. In some optional embodiments, the smart window 314 may alternately display different related information. For example, as shown in FIG. 3G, the preset condition is that the electronic device 100 arrives at an airport, and the electronic device 100 displays the smart window 314. The smart window 314 displays "start boarding" in the first second, "52K boarding gate" in the second second, "start boarding" in the third second, and "52K boarding gate" in the fourth second. In this way, "start boarding" and "52K boarding gate" are displayed alternately.

In some optional embodiments, the electronic device 100 obtains related information of the application B every preset duration T1. When the electronic device detects that the related information changes, the electronic device 100 updates the content displayed in the smart window 314. For example, as shown in FIG. 3D(1) and FIG. 3D(2), the smart window 314 displays the station information "Xizhimen". When the electronic device 100 obtains that the current station information is a museum, the content displayed in the smart window 314 is updated into "museum".

In some embodiments, when the electronic device 100 displays the smart window 314 on the first user interface, the electronic device 100 may receive a touch operation (for example, an operation of tapping the smart window 314) performed on the smart window 314. In response to the touch operation, the electronic device 100 displays a user interface of the application B, or the electronic device 100 displays a user interface of an application C. The application C is an application associated with the application. The application B and the application C are both applications corresponding to the preset condition A, and may be preset by the user, or may be factory settings of the electronic device.

For example, as shown in FIG. 3E(1) and FIG. 3E(2), the electronic device 100 displays "Xizhimen" in the smart window 314. When the electronic device 100 detects a touch operation (for example, an operation of tapping the smart window 314) performed on the smart window 314, in response to the operation, the electronic device 100 displays a user interface 320. The user interface 320 is a user interface of an application supporting the transport code. As shown in FIG. 3E(1) and FIG. 3E(2), the user interface 320 may include a status bar 321, a transport code display area 322, and a navigation bar 323.

The status bar 321 is consistent with the status bar 311 in the user interface 310. Details are not described herein again.

The navigation bar 323 is consistent with the navigation bar 313 in the user interface 310. Details are not described herein again.

The transport code display area 322 may include a transport code 322*a* and a refresh control 322*b*. The transport code 322*a* may be scanned to enter a station. The refresh control 322 may be configured to refresh the transport code 322*a*. The electronic device 100 detects a touch operation performed on the refresh control 322*b*. In response to the operation, the display area 322 displays a new transport code 322*a*. For example, the smart window 314 of the electronic device 100 displays information "Mother's Day" of the calendar application. When the electronic device 100 detects a touch operation (for example, an operation of tapping the smart window 314) performed on the smart window 314, in response to the operation, the electronic device 100 may display a user interface of a shopping application. The user may directly purchase a gift on this interface. When the user finishes shopping, and after the user taps an exit control in the navigation bar 333, the user may continue to watch the video, so that the user does not need to watch an advertisement again after the user exits the video play interface and re-enters the application, avoiding affecting user experience.

It can be understood that when the user exits the user interface 320 or the user interface 330, and the electronic device 100 switches back to the video application interface, the smart window is displayed on the video application interface.

Scenario type 2. When the preset condition is met, the smart window of the electronic device switches from a shape A to a shape B.

The following describes seven cases of various shape changes of the smart window by using examples.

(1) The electronic device displays a first shape of the smart window. When a preset condition B is met, the smart window on the electronic device switches to a second shape.

The second shape of the smart window is a rectangle and occupies a larger area of the user interface than the first shape does, and the smart window displays more critical information.

The preset condition B is a touch operation (for example, an operation of tapping the smart window 314) performed on the smart window 314. In response to the touch operation, the smart window 314 switches to the second shape. The touch operation, may be, for example, single tapping, double tapping, or touching and holding. This is not limited in this application.

In some optional embodiments, the preset condition B may be implemented by pressing the button 107. The button of the preset condition B may include any one or more of an up-volume button, a down-volume button, and a power button. The up-volume button and the down-volume button may be located on a side edge of the electronic device 100, and the power button may be located on the other side edge of the electronic device 100. When the button 107 configured to switch to the second shape is a combination of two buttons, the electronic device 100 may switch the smart window 314 to the second shape by receiving an operation of simultaneously pressing the foregoing two buttons by the user. The operation of simultaneously pressing two buttons may be distinguished from the operation of pressing a single button, to avoid a false response of the electronic device 100. When the button 107 for switching the smart window 314 to the second shape is any one of the foregoing buttons, the electronic device 100 may switch the smart window 314 to the second shape by receiving an operation of consecutively pressing the button by the user for two or more times. The operation of consecutively pressing a button for two or more times may be distinguished from the operation of pressing the button once, to avoid a false response of the electronic device 100.

In some optional embodiments, the preset condition B may be implemented through voice control. The electronic device 100 may collect, by using the microphone, first voice that is input by the user. For example, specific content of the first voice message is "switch the smart window to the second shape". Specific content "switch the smart window to the second shape" of the collected voice is compared with pre-stored voice keywords "switch the smart window to the second shape", and a collected voice feature is compared with a pre-stored voice feature of the owner. If the specific content of the voice is consistent with the pre-stored voice keywords, and a matching rate between the collected voice feature and the voice feature of the owner exceeds a first threshold, the smart window 314 is switched to the second shape for display. The smart window 314 is displayed in the second shape by using voice. The operation is simple and convenient, and the user does not need to perform an operation manually. The smart window 314 is switched to the second shape for display by using voice. The operation is simple and convenient, and the user does not need to perform a tapping operation with fingers.

In some optional embodiments, the preset condition B may be implemented through floating operation control.

Specifically, the electronic device 100 may collect, by using the camera, a gesture entered by the user. The gesture may be a V shape. The collected gesture is compared with a pre-stored gesture. If the collected gesture is consistent with the pre-stored gesture shape, the smart window 314 is switched to the second shape for display. The smart window 314 is switched to the second shape by using a gesture. The operation is simple and convenient. The foregoing gesture (for example, a V shape, or stretching five fingers and closing the five fingers) may be a gesture that best meets the user's psychological expectation and that is obtained after collection of a large amount of statistics. The user may directly associate the shape with the displayed user interface 310 to reduce the memory burden of the user and conform to a use habit of the user.

The preset condition B may alternatively be drawing a particular shape (for example, a Z shape, a rectangle, or a circle) in a floating manner. Specifically, a particular shape may be drawn on the user interface 310 in a floating manner. In response to the operation, the smart window 314 is displayed in the second shape.

During specific implementation, the electronic device 100 may be provided with a floating detector. The floating detector can sense an object in the three-dimensional (3D) space above the touchscreen and a motion (for example, the user draws a Z shape with a finger in the three-dimensional space above the screen) of the object. In some embodiments, the floating detector may be a 3D camera. In some embodiments, the touchscreen may have a floating detection function. For example, the touchscreen may be a self-capacitive floating touchscreen or a floating touchscreen provided with an infrared sensor. In some embodiments, the gesture sensor may also act on the floating detector.

Not limited to the preset condition B, described above, of switching the smart window 314 to the second shape, during specific implementation, the preset condition B may have another form of switching the smart window 314 to the second shape. This is not limited in the embodiments of this application.

For example, as shown in FIG. 4B(1) and FIG. 4B(2), the user is watching a video on the electronic device, the electronic device displays the smart window 314 in the first shape on a video display interface. In this case, the user needs to enter a station by using the transport code. When the user needs to view detailed related information of the transport code, the electronic device 100 may receive a touch operation (for example, an operation of tapping the smart window 314) performed on the smart window 314. In response to the touch operation, the smart window 314 is displayed in the second shape, and the smart window displays the subway transport code. An area occupied by the smart window in the second shape on the user interface is larger than an area occupied by the first shape. In this way, the user does not need to switch to the transport code-related application to open the transport code, and can enter the station by scanning the code on the current video interface. Therefore, video watching experience of the user is not affected.

For example, when the electronic device 100 displays the first shape of the smart window 314, the smart window 314 displays related information of the calendar application. When the user needs to view specific information of the calendar application, the electronic device may receive the touch operation performed by the user on the smart window, the smart window 314 is switched from the first shape to the second shape, and the smart window 314 may display detailed information of a shopping application, for example, purchasing a stuff.

In some optional embodiments, when the electronic device 100 displays the second shape of the smart window 314, the smart window 314 displays the detailed related information of the application B, the electronic device 100 detects the touch operation performed on the smart window 314, and the electronic device displays the user interface of the application B or a user interface of an application C.

The application B and the application C are both applications corresponding to the preset condition A, and may be preset by the user, or may be factory settings of the electronic device.

For example, as shown in FIG. 4B(1) and FIG. 4B(2), the electronic device 100 displays the second shape of the smart window 314, and the smart window displays some information of the transport code-related application. When the user needs to present the entire transport code for scanning, and the electronic device 100 detects a touch operation (for example, an operation of tapping the smart window 314) performed on the smart window 314, in response to the operation, the electronic device 100 displays the transport code interface.

For example, the electronic device 100 displays the second shape of the smart window 314, and the smart window displays some information of a shopping application. When the user needs to open the shopping application to purchase an object, and the electronic device 100 detects a touch operation (for example, an operation of tapping the smart window 314) performed on the smart window 314, in response to the operation, the electronic device 100 displays a shopping application interface.

It should be noted that the electronic device displays a user interface as shown in FIG. 4E. When the user switches the user interface to the video application interface, the electronic device 100 displays the smart window 314 on the video interface.

(2) The electronic device displays the first shape of the smart window. When a preset condition C is met, the smart window on the electronic device changes to a third shape.

The third shape of the smart window 314 is a circle. A display area of the smart window in the third shape on the user interface is smaller than that of the first shape, and the smart window in the third shape displays less critical information than the smart window in the first shape does. For example, in the first shape, the smart window displays the icon of the transport code-related application, Xizhimen, and the subway transport code; and in the third shape, the smart window displays only the icon of the transport code-related application or only Xizhimen.

It can be understood that when the electronic device 100 displays the third shape, namely, the circle, of the smart window 314, some edges of the circle may exceed the display screen and are not drawn or are blocked.

The preset condition C may be that the electronic device 100 has not detected, within preset duration T1, a user operation performed on the smart window 314.

For example, as shown in FIG. 5A(1) and FIG. 5A(2), the user is watching a video, the electronic device displays the first shape of the smart window 314, and the smart window displays the icon of the transport code-related application, the station information Xizhimen, and the subway transport code. The electronic device has not detected, within five seconds, a user operation performed on the smart window 314, the smart window 314 switches from the first shape to the third shape, and the smart window displays some critical information of the transport code-related application, for example, the icon of the transport code-related application. A display area of the smart window in the third shape on the user interface is smaller than that of the first shape, so that interference to the user can be reduced.

When the smart window is in the third shape, the smart window may be displayed at the right edge of the display screen or the left edge of the display screen. This is not limited in this application. The content displayed in the smart window 314 is merely examples for description. During actual implementation, the smart window 314 may further display "open the transport code". This is not limited in this application.

In some optional embodiments, when the smart window 314 is displayed in the third shape, the transparency of the smart window 314 is less than the transparency of the smart window 314 in the first shape. As shown in FIG. 5B(l) and FIG. 5B(2), when the smart window 314 is displayed in the first shape, the transparency of the smart window 314 is 0%, that is, the user cannot see the content on the user interface 310 in the display area of the smart window 314; and when the smart window 314 is displayed in the third shape, the transparency of the smart window 314 is 50%, that is, the user can see some content on the user interface in the area of the smart window 314.

Correspondingly, when the electronic device 100 displays the third shape of the smart window 314, the electronic device 100 may receive a touch operation performed on the smart window 314; or when the electronic device 100 detects that related information changes, the smart window 314 switches from the third shape to the first shape.

For example, as shown in FIG. 5C(1) and FIG. 5C(2), the electronic device 100 displays the third shape of the smart window 314. When the user needs to view detailed information in the smart window, the electronic device 100 detects a touch operation (for example, an operation of tapping the smart window 314) performed on the smart window 314, the smart window 314 switches from the third shape to the first shape, and the smart window displays the icon of the transport code-related application, the station information Xizhimen, and the subway transport code. In this way, when taking the subway, if the user needs to view the subway station, the user may directly tap the smart window, and does not need to open the transport code-related application. This is more convenient.

For example, as shown in FIG. 5D(1) and FIG. 5D(2), the electronic device 100 displays the third shape of the smart window 314, the electronic device 100 detects that the critical information changes, the station information changes from Xizhimen to museum, the smart window 314 changes from the third shape to the first shape, the smart window 314 updates the displayed content, and the smart window 314 displays the currently obtained station information "museum". In this way, when the station information changes, the smart window may switch to the first shape, and update, in the first shape, the displayed station information to remind the user, so that the user does not miss the station.

(3) The electronic device displays the first shape of the smart window. When a preset condition D is met, the smart window on the electronic device changes to a fourth shape.

The fourth shape of the smart window is a capsule shape, and the smart window is displayed in the status bar of the display screen. The smart window in the fourth shape displays less critical information than the smart window in the first shape does. For example, the smart window displays only an application icon, or an application icon and station information.

For example, as shown in FIG. 6A(I) to FIG. 6B(2), the electronic device 100 displays the first shape of the smart window 314. When the preset condition D is met, the electronic device 100 displays the fourth shape of the smart window 314. The fourth shape of the smart window 314 is that the smart window 314 is displayed in the status bar of the electronic device 100 in a capsule shape. The smart window 314 displays some of reminding information. For example, as shown in FIG. 6A(1) and FIG. 6A(2), the smart window 314 displays only an icon of a transport code application. For another example, as shown in FIG. 6B(1) and FIG. 6B(2), the smart window 314 displays an application icon of a transport code application and station information "Xizhimen". This is not limited thereto. During actual application, the smart window 314 may further display other information. This is not limited in this application.

The preset condition D is an operation of sliding the smart window 314 to the status bar of the display screen 109.

For example, as shown in FIG. 6C(1) to FIG. 6C(4), when the user thinks that the smart window in the first shape blocks the interface of the video application, the user may slide on the display screen 109 with a finger to drag the smart window 314 to move upward. The smart window 314 is moved to the status bar of the electronic device 100, the smart window 314 switches from the first shape to the fourth shape for display, and the smart window displays the icon of the transport code-related application.

In some embodiments, the user may slide on the display screen 109 with another part of the body or a tool to move the smart window. For example, the user may drag the smart window with a fingertip, a finger pad, an elbow, a stylus, or the like. This is not limited herein.

Not limited to the foregoing dragging operation of the user, the preset condition D may be controlled by voice. For another example, the preset condition D may be implemented by using the button 107. For details, refer to the related description about the button 107 in the preset condition B. The details are not described herein again.

Correspondingly, when the electronic device 100 displays the fourth shape of the smart window 314, and the user needs to view detailed critical information in the smart window, the electronic device 100 may receive a touch operation performed on the smart window 314. The electronic device obtains the critical information of the application B, the smart window 314 switches from the fourth shape to the first shape, and the smart window displays the obtained detailed critical information.

For example, as shown in FIG. 6C(1) to FIG. 6C(4), the electronic device 100 displays the fourth shape of the smart window 314. When the user needs to check the station information, the electronic device 100 may receive an operation of dragging the smart window 314 to drag the smart window 314 to move downward. In response to the operation, the electronic device obtains the station information, the smart window 314 switches to the first shape, and the smart window displays the station information. In this way, when the user needs to check the station information, the user needs only to directly slide the smart window, and does not need to open the transport code-related application. This is more convenient.

For example, as shown in FIG. 6D(1) and FIG. 6D(2), the electronic device 100 displays the fourth shape of the smart window 314, the electronic device 100 detects that the related information changes, the station information changes from Xizhimen to a museum, the smart window 314 switches from the fourth shape to the first shape, and the smart window 314 displays the updated station information "museum".

In some embodiments, as shown in FIG. 6E(1) and FIG. 6E(2), the electronic device 100 displays the fourth shape of the smart window 314. When the user needs to scan the transport code to enter the station, the electronic device 100 may receive a touch operation (for example, an operation of tapping the smart window 314) performed on the smart window 314. In response to the operation, the electronic device 100 displays the user interface of the transport code. In this way, when the user needs to use the transport code, the user may directly tap the smart window to enter the interface of the transport code, and the user does not need to exit the current video interface and then find the transport code-related application. This is more convenient, and user experience is improved.

It can be understood that when the user exits a user interface supporting the transport code-related application and switches to the video interface, the electronic device 100 displays the smart window 314.

(4) The electronic device displays the second shape of the smart window or the third shape of the smart window. When a preset condition F is met, the smart window on the electronic device changes to the fourth shape.

The preset condition F is an operation of dragging the smart window 314 to the status bar of the electronic device 100.

For example, as shown in FIG. 7A, the user is watching a video, and the electronic device 100 displays the second shape of the smart window 314 on the video interface. When the user thinks that the smart window blocks the content of the video interface, the electronic device 100 may receive an operation, performed by the user, of dragging the smart window 314 to the status bar of the electronic device 100. In response to the operation, the smart window 314 switches from the first shape to the fourth shape. In this way, when the user thinks that the smart window blocks the current user interface, the user may drag the smart window to the status bar to avoid blocking.

(5) The electronic device displays any shape of the smart window. When a preset condition G is met, the smart window on the electronic device changes to a fifth shape.

The fifth shape of the smart window is a circle. The smart window does not display the critical information.

The preset condition G is a user operation used to trigger the electronic device to drag the smart window. The user operation used to trigger the electronic device 100 to drag the smart window 314 may be sliding on the display screen 109 with a finger of the user to drag the smart window 314 to move upward, to drag the smart window 314 to move downward, to drag the smart window 314 to move leftward, or to drag the smart window 314 to move rightward. This is not limited in this application.

For example, as shown in FIG. 8A, the electronic device 100 displays the first shape of the smart window 314. The electronic device 100 detects the user operation used to trigger the electronic device 100 to drag the smart window 314. In response to the operation, the smart window 314 switches to the fifth shape.

It can be understood that when the electronic device 100 displays any shape, for example, the second shape, the third shape, or the fourth shape of the smart window 314, and the user drags the smart window 314, the smart window 314 switches to the fifth shape.

In some optional embodiments, as shown in FIG. 8B(1) and FIG. 8B(2), when the electronic device 100 meets the preset condition, the electronic device 100 may display the smart window 314 in the fifth shape on the video application interface. When the electronic device detects that the critical information changes, the smart window switches from the fifth shape to the first shape, and the smart window displays the updated station information "museum".

In some optional embodiments, when the user needs to check the station information, the electronic device 100 may receive a user operation performed on the smart window 314. In response to the operation, the electronic device 100 switches the smart window 314 from the fifth shape to the first shape, and the smart window displays the station information.

In some optional embodiments, as shown in FIG. 9, when the user thinks that the smart window 314 blocks some important content on the interface of the application A, the touchscreen of the electronic device 100 may further receive a user operation used to trigger the electronic device 100 to move the smart window 314. When the electronic device displays the first shape of the smart window 314, and the electronic device 100 detects an operation of dragging the smart window 314, in response to the operation, the electronic device 100 moves a position of the smart window 314 on the display screen 109. The foregoing dragging operation may be sliding on the display screen with a finger of the user. A start point of the sliding is at a first position on the display screen, and an end point of the sliding is at a second position on the display screen. The electronic device 100 obtains the first position and the second position, and moves the smart window 314 from the first position to the second position. As shown in FIG. 9, in a moving process of the smart window 314, a relative position between the finger of the user and the smart window 314 remains unchanged.

This application is not limited to moving the smart window 314 from the first position to the second position on the display screen 109 with the finger of the user. In some embodiments, the user may slide on the display screen 109 with another part of the body or a tool to move the smart window. For example, the user may move the smart window with a fingertip, a finger pad, an elbow, a stylus, or the like. This is not limited herein.

Scenario type 3: The electronic device displays a smart window in a shape. When a preset condition I is met, the smart window stops to be displayed.

The preset condition I may be that the electronic device obtains that a quantity for which an external device scans the transport code is an even number, may be that the smart window meets display duration, may be a touch operation performed on the smart window, or so on.

The following uses an example in which the electronic device displays the first shape of the smart window 314 to describe a case in which the electronic device stops displaying the smart window 314 when the preset condition I is met.

For example, as shown in FIG. 10A, when the user thinks that the smart window 314 blocks the content on the user interface 310, the electronic device 100 may receive a touch operation performed on the smart window 314. In response to the touch operation, the electronic device 100 deletes the smart window from the display screen 109, that is, the electronic device 100 does not display the smart window 314 on the display screen 109.

For example, the foregoing touch operation may be that a finger of the user slides downward on the display screen 109 by a distance reaching a first threshold, and the electronic device 100 displays the user interface shown in FIG. 10A. The display screen 109 of the electronic device 100 displays a recycling icon 315, and the recycling icon 315 is used to prompt the user to keep sliding downward to delete the smart window 314. When the finger of the user continues to slide downward on the display screen 109, the electronic device 100 deletes the smart window 314 from the display screen 109.

For another example, the foregoing touch operation may alternatively be an operation of dragging the smart window 314 by the user to drag the smart window 314 to the right edge or the left edge of the first user interface for deletion, and the electronic device 100 does not display the smart window 314 any more. For example, as shown in FIG. 10B, the smart window 314 may be deleted by dragging the smart window on the electronic device to an edge area of the interface and releasing the smart window.

Not limited to the preset condition I described above, the preset condition I may alternatively be triggered by voice control, gesture control, button control, or the like. For detailed related descriptions, refer to the related descriptions about the preset condition B. Details are not described herein again.

Not limited to the case in which the electronic device 100 displays the first shape of the smart window 314 and the smart window 314 may be deleted, when the electronic device 100 displays another shape of the smart window 314 and the preset condition I is met, the electronic device 100 deletes the smart window 314, and does not display the smart window 314 on the current user interface. For example, when the electronic device 100 displays the third shape of the smart window 314, and the electronic device 100 detects an operation of dragging the smart window 314 downward, in response to the operation, the electronic device 100 deletes the smart window 314, and does not display the smart window 314 on the current user interface.

It should be noted that, in this application, after the smart window 314 is deleted, the smart window 314 may run in the background of the electronic device 100. When the electronic device 100 detects that the related information of the application B changes, or when the electronic device 100 meets the display condition of the smart window 314, the electronic device 100 may display the smart window 314 again.

The foregoing describes the display process of the smart window by using an example in which the electronic device displays the interface of the video application. When the electronic device 100 displays the lock screen and the preset condition B is met, the electronic device 100 may further display the smart window on the lock screen.

The following uses an example in which the preset condition B is that the electronic device 100 arrives at a subway station, to describe display of the smart window and a shape of the smart window 314 when the electronic device 100 displays the lock screen.

FIG. 11A(1) to FIG. 11B(2) show a series of user interfaces related to the smart window when the electronic device 100 displays a lock screen.

FIG. 11A(1) shows an example of a lock screen 610 of the electronic device 100. As shown in FIG. 11A(1), the lock screen 610 includes: a status bar 611, a display area 612, and a navigation bar 613.

The status bar 611 is consistent with the status bar 311 in the user interface 310. Details are not described herein again.

The navigation bar 613 is consistent with the navigation bar 313 in the user interface 310. Details are not described herein again.

The display area 612 is configured to display a lock screen picture or a lock screen or lock screen animation. The display area 612 further includes an application lock 812*a*. The application lock 812*a* is used for slide unlocking or fingerprint unlocking. The electronic device detects a touch operation performed on the application lock 812*a*, and in response to the operation, the electronic device unlocks.

As shown in FIG. 11A(1) and FIG. 11A(2), the electronic device 100 displays the lock screen shown in FIG. 11A(1). When the electronic device 100 detects that the electronic device 100 is located in a subway station, the electronic device 100 displays the smart window 614 on the user interface 610. The electronic device 100 obtains that the subway station is Xizhimen, and the smart window displays the words "Xizhimen" to remind the user that the Xizhimen subway station is reached. The smart window 614 may further display related information "subway transport code" to remind the user to open the transport code interface to enter the station by scanning the code.

In some embodiments, as shown in FIG. 11B(1) and FIG. 11B(2), the electronic device 100 detects a touch operation (for example, an operation of tapping the smart window 314) performed on the smart window 314. In response to the user operation, the electronic device 100 may collect, by using a fingerprint sensor 106G, a fingerprint of a specific finger entered by a user, and the electronic device 100 displays the user interface 310 of the transport code.

The electronic device 100 may collect, by using the fingerprint sensor 106G, the fingerprint of the specific finger entered by the user, and compare the collected fingerprint with a fingerprint pre-stored in an internal memory 102. If a match degree between the collected fingerprint and the pre-stored fingerprint exceeds a threshold, the electronic device 100 displays the user interface 310 of the transport code.

In some optional embodiments, the electronic device 100 may collect a facial image by using the camera 108 for face recognition. For example, the electronic device 100 may compare the collected facial image with a facial image of an owner stored in the internal memory 102. If a match degree exceeds a second threshold, it is considered that the recognized face matches the face of the owner, and the electronic device 100 displays the user interface 310 of the transport code.

In some optional embodiments, the electronic device 100 detects a touch operation (for example, an operation of sliding from bottom to top) performed on the smart window 614. In response to the operation, the electronic device 100 may display a password enter screen. The electronic device 100 may detect a password entered by the user on the password enter screen, and compare the password entered by the user with a password pre-stored in the internal memory 102. If the two passwords are consistent, the electronic device 100 displays the user interface 310 of the transport code.

Not limited to the foregoing user operations, which are merely used as examples, the user operation may actually be another operation manner, for example, may be voice control, or may be entering a preset pattern in a preset area of the user interface. This is not limited in this application.

In some embodiments, when the electronic device displays the smart window shown in FIG. 11A(2), the electronic device 100 detects a touch operation (for example, an operation of tapping the smart window 314) performed on the smart window 314. In response to the user operation, the electronic device 100 may collect, by using the fingerprint sensor 106G, a fingerprint of a specific finger entered by the user, and the smart window switches from the first shape to another shape, for example, may switch to the second shape.

In this application, the smart window 614 includes another shape. For details, refer to the related descriptions in the embodiments shown in FIG. 3 to FIG. 10. The details are not described herein again.

Based on the UI embodiments shown in FIG. 3 to FIG. 11, the display method provided in the embodiments of this application is described in detail. FIG. 12 is a schematic flowchart of an information display method according to an embodiment of this application.

In the information display method provided in this embodiment of this application, an electronic device 100 displays a first user interface on a display screen 109. When a first preset condition is met, the electronic device 100 displays a smart window 314 on the first user interface, and displays related information corresponding to the first preset condition in the smart window 314. In addition, the electronic device may automatically adjust a shape of the smart window 314 based on a current scenario, or a user may actively adjust a shape of the smart window 314 based on a requirement of the user. When a condition of deleting the smart window 314 is met, the electronic device 100 may automatically delete the smart window 314.

With reference to FIG. 12, the following describes an example of a procedure of the information display method in this embodiment of this application by using a subway scenario as an example and by using an example in which the first user interface is a video interface.

S101. Display a first user interface.

Specifically, the first user interface may be an interface of a first application running on the electronic device 100, or may be a lock screen of the electronic device 100.

The first user interface may be the user interface 310 provided in the embodiment shown in FIG. 3A(1) and FIG. 3A(2), or the first user interface may be the user interface 610 provided in the embodiment shown in FIG. 12A. Not limited to the user interfaces described above, during specific implementation, the first user interface may alternatively be another user interface. This is not limited in this application.

S102: The electronic device detects that the electronic device is located within a subway station range, and displays the smart window in a capsule shape on the first user interface, where the smart window displays an icon and station information of a transport code-related application, reminding information, and a subway transport code.

The smart window displays the icon of the transport code-related application, Xizhimen, the subway transport code, and the like. For details, refer to the embodiment shown in FIG. 3A(1) and FIG. 3A(2). The details are not described herein again.

The electronic device 100 may obtain location information of the electronic device by using the global positioning system (global positioning system, GPS). Alternatively, the electronic device 100 may obtain a geographic location of the electronic device by using a sensorhub (sensorhub). The sensorhub is mainly used for low-power connection and processing of data from various sensor devices, for example, processing of data from sensors such as an accelerometer, a gyroscope, and a magnetometer, and fusion processing of data of various sensors. A positioning manner is not limited in this application.

S103: The smart window switches from the capsule shape to a circle when no operation performed on the smart window is detected within preset duration, and the smart window displays the icon or the station information of the transport code-related application.

The embodiment shown in FIG. 5A(1) and FIG. 5A(2) is used as an example. After the smart window switches from the capsule shape to a circle, a display area of the smart window on the first user interface becomes smaller, and the smart window displays only the icon of the transport code-related application. Details are not described herein.

S104: In response to a first user operation, the electronic device obtains the station information, the smart window switches from the circle to the capsule shape, and the smart window displays the icon and the station information of the transport code-related application, the reminding information, and the subway transport code.

The embodiment shown in FIG. 5C(1) and FIG. 5C(2) is used as an example. The first user operation is a touch operation performed on the smart window. The smart window switches from the circle to the capsule shape. The smart window displays the icon of the transport code-related application, Xizhimen, and the subway transport code. Not limited to these information, during specific implementation, the smart window may further display other information. This is not limited in this application.

S105: In response to a second user operation, the smart window switches to the capsule shape for display in the status bar, and the smart window displays the icon or the station information of the transport code-related application.

The second user operation may be an operation of sliding upward on the display screen to drag the smart window 314 to the status bar of the electronic device 100, for example, the upward sliding operation shown in FIG. 6C(1) to FIG. 6C(4). The second user operation may be a voice instruction, a floating operation, or the like. This is not limited in this application. After the electronic device switches to display the smart window in the capsule shape in the status bar, the smart window displays the icon of the transport code-related application or the station information Xizhimen. For details, refer to the embodiments shown in FIG. 6A(1) to FIG. 6B(2). The details are not described herein again.

S106: In response to a third user operation, the smart window switches to the capsule shape for display on the first user interface, and the smart window displays the icon and the station information of the transport code-related application, the reminding information, and the subway transport code.

The third user operation may be a downward sliding operation on the display screen, for example, the downward sliding operation shown in FIG. 6C(1) to FIG. 6C(4). The third user operation may be a voice instruction, a floating operation, or the like. This is not limited in this application.

S107: In response to a fourth user operation, the electronic device displays the user interface of the transport code-related application.

The fourth user operation may be a tapping operation shown in FIG. 31, or may be a voice instruction, a floating operation, or the like. This is not limited in this application.

S108: The electronic device displays the video interface after learning that an external device successfully scans the transport code.

Specifically, the user operation may be, for example, that the user taps a return button in the navigation bar 323 on the user interface 320. During specific implementation, the preset condition may alternatively be another case. Details are not described herein.

S109: The electronic device obtains that a quantity of times for which the external device scans the transport code is an even number, and the electronic device deletes the smart window and does not display the smart window on the first user interface.

That the preset condition B is met may mean that information indicating that a task is completed is displayed. For example, if the electronic device obtains that a quantity of times for which the external device scans the transport code is an even number, it indicates that the user has gotten out of the station and the smart window does not need to be displayed, and the electronic device does not display the smart window on the first user interface.

With reference to FIG. 13, the following describes an example of a procedure of the display method in this embodiment of this application by using an airport scenario as an example.

S201: Display a first user interface.

Specifically, the first user interface may be an interface of a first application running on the electronic device 100, or may be a lock screen of the electronic device 100. During specific implementation, the first user interface may alternatively be another user interface. This is not limited in this application. For example, the first user interface may be the user interface 310 in FIG. 3A(1) and FIG. 3A(2).

S202: The electronic device detects that the electronic device is located within an airport station range, and displays the smart window in a circle on the first user interface, where the smart window does not display information of an air travel application.

A fifth shape of the smart window is a circle. When the electronic device displays the fifth shape of the smart window, the smart window does not display the information of the air travel application.

S203: After second preset duration, the smart window switches from the circle to a capsule shape, and the smart window displays an icon of the air travel application and boarding gate information.

For example, the smart window 314 displays the 52K boarding gate, the application icon, viewing the boarding pass, and the like. For details, refer to the embodiment shown in the figure, and details are not described herein again.

S204: When it is detected that the boarding gate information is updated, the smart window displays updated boarding gate information.

Specifically, the electronic device obtains related information of the air travel application every third preset duration. When detecting that the boarding gate information is updated, the electronic device updates the boarding gate information in the smart window. For example, when the smart window displays the 52K boarding gate, and the electronic device obtains that the boarding gate information is the 68K boarding gate, the electronic device updates the boarding gate information in the smart window into the 68K boarding gate.

S205: After the preset condition is met, the electronic device stops displaying the smart window, where flight information such as the boarding gate information is not displayed on the first user interface.

The preset condition may be that a display task is completed. For example, a time of the electronic device is a flight departure time or 15 minutes before a flight departure time. The preset condition may alternatively be a sliding operation of the user, for example, the rightward sliding operation shown in FIG. 4. The preset condition may alternatively be that display duration of the smart window meets first duration. For example, the smart window disappears after display of 30 seconds.

It should be noted that information displayed in the smart window in the foregoing embodiments is merely examples, and may be other information during specific implementation. This is not limited in this application.

It should be noted that, for brief description, the foregoing method embodiments are represented as a combination of a series of actions. However, a person skilled in the art should be aware that the present invention is not limited to the described order of the actions. In addition, a person skilled in the art should also be aware that the embodiments described in the specification are preferred embodiments, and the actions involved are not necessarily required by the present invention.

The various implementations of this application may be arbitrarily combined to achieve different technical effects.

An embodiment of this application further provides a computer-readable storage medium. All or some procedures in the foregoing method embodiments may be implemented by a computer program instructing related hardware. The program may be stored in the foregoing computer storage medium. When the program is executed, the procedures in the foregoing method embodiments can be included. The computer-readable storage medium includes any medium that can store program code, such as a read-only memory (read-only memory, ROM), a random access memory (random access memory, RAM), a magnetic disk, an optical disc, or the like.

Some or all the foregoing embodiments may be implemented by software, hardware, firmware, or any combination thereof. When implemented by software, some or all the foregoing embodiments may be implemented in a form of a computer program product. The computer program product includes one or more computer instructions. When the computer program instructions are loaded and executed on a computer, some or all the procedures or functions described in this application are generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one network site, computer, server, or data center to another network site, computer, server, or data center in a wired (such as a coaxial cable, an optical fiber, or a digital subscriber line) or wireless (such as infrared, wireless, or microwave) manner. The computer-readable storage medium may be any usable medium accessible by a computer, or a data storage device such as a server or a data center in which one or more usable media are integrated. The usable medium may be a magnetic medium (for example, a floppy disk, a hard disk, or a magnetic tape), an optical medium (for example, a DVD), a semiconductor medium (for example, a solid-state disk (solid state disk, SSD)), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments can be included. The foregoing storage medium includes any medium that can store program code, for example, a ROM, a random access memory RAM, a magnetic disk, or an optical disc.

In conclusion, the foregoing descriptions are only embodiments of the technical solutions of this application, and are not intended to limit the protection scope of this application. Any modification, equivalent replacement, improvement, and the like made based on the disclosure of the present invention shall fall within the protection scope of the present invention.

What is claimed is:

1. An information display method, comprising:

displaying a first user interface, wherein the first user interface is either an interface of a first application or a home screen of an electronic device, wherein the first user interface comprises a status bar and a content display area, and wherein the status bar is a system-level status bar that displays system status information comprising at least one of a signal strength indicator, a battery status indicator, or a time indicator;

displaying a display window in a first shape in the content display area, and displaying critical information of a transport code-related application in the display window in the first shape when the electronic device detects that a current location is within a travel station area range, wherein the critical information of the transport code-related application comprises an icon and station information of the transport code-related application and reminding information about opening the transport code-related application, and wherein a size of the first shape is less than ¼ of a size of the content display area; and displaying, in response to an operation dragging the display window in the first shape displayed in the content display area to the status bar, a capsule-shaped display window in the status bar, wherein the capsule-shaped display window is bounded within a height dimension of the status bar and occupies only a portion of the status bar along a width direction of a display screen of the electronic device, and displaying identification information of the transport code-related application in the capsule-shaped display window.

2. The method of claim 1, further comprising skipping running the transport code-related application when the first user interface displays the display window.

3. The method of claim 1, further comprising:

switching the display window in the first shape in the content display area to a rectangular display window in response to an operation of tapping the display window in the first shape; and displaying critical information comprising a transport code in the rectangular display window in the content display area.

4. The method of claim 1, further comprising:

switching the display window in the first shape in the content display area to a round display window when no operation performed on the display window in the first shape is detected within a first preset duration; and displaying the critical information of the icon or the station information of the transport code-related application in the round display window in the content display area, wherein a display area of the round display window is smaller than a display area of the display window in the first shape.

5. The method of claim 1, further comprising displaying, in response to an operation dragging the content display area or the display window in the status bar, the dragged display window as a circle in the content display area, and skipping displaying the critical information of the transport code-related application in the dragged display window.

6. The method of claim 1, further comprising:

obtaining updated station information of the transport code-related application periodically after a second preset duration has elapsed;

displaying the display window in the first shape in the content display area when the station information of the electronic device is updated; and displaying critical information of the updated station information of the transport code-related application and the icon of the transport code-related application in the display window in the first shape in the content display area.

7. The method of claim 1, further comprising displaying, in response to an operation of touching and holding the display window, a user interface of the transport code-related application, and displaying the transport code on the user interface of the transport code-related application.

8. An information display method, comprising:

displaying a first user interface, wherein the first user interface is either a user interface of a first application running on an electronic device or is a lock screen of the electronic device, and wherein the first user interface comprises a status bar and a content display area, wherein the status bar is a system-level status bar that displays system status information comprising at least one of a signal strength indicator, a battery status indicator, or a time indicator; and displaying a display window in a first shape in the content display area when a first preset condition is met, wherein the display window in the first shape is configured to display critical information of a second application that matches the first preset condition, wherein the critical information comprises identification information of the second application, wherein a size of the first shape is less than ¼ of a size of the content display area, wherein the first preset condition comprises at least one of the following: a location of the electronic device being within a preset first area range, a system time of the electronic device being within a preset first time range, or the electronic device obtaining a preset first notification message; and displaying, in response to an operation dragging the display window in the first shape displayed in the content display area to the status bar, a capsule-shaped display window in the status bar, wherein the capsule-shaped display window is bounded within a height dimension of the status bar and occupies only a portion of the status bar along a width direction of a display screen of the electronic device, and displaying critical information of the second application in the capsule-shaped display window in the status bar, wherein an amount of the critical information of the second application displayed in the capsule-shaped display window in the status bar is less than an amount of the critical information of the second application displayed in the display window in the first shape.

9. The method of claim 8, further comprising skipping running the second application when the first user interface displays the display window.

10. The method of claim 8, further comprising:

switching the display window in the first shape in the content display area to a rectangular display window in response to a first user operation; and displaying critical information of the second application in the rectangular display window in the content display area, wherein the amount of critical information of the second application displayed in the rectangular display window is more than the amount of critical information of the second application displayed in the display window in the first shape, and wherein a display area of the rectangular display window is larger than a display area of the display window in the first shape.

11. The method of claim 10, wherein the first user operation is tapping the display window, pressing a first button, or entering a first voice message, and wherein the first button comprises one or more of a power button, an up-volume button, and a down-volume button.

12. The method of claim 8, further comprising:

switching the display window in the first shape in the content display area to a round display window when no operation performed on the display window is detected within a first preset duration; and displaying in the round display window in the content display area, either a) the identification information of the second application, or b) some of the critical information of the second application displayed in the display window in the first shape, wherein a display area of the round display window is smaller than the display area of the display window in the first shape.

13. The method of claim 12, further comprising:

receiving a second user operation of a user dragging the display window in the content display area or dragging the display window in the status bar;

displaying, in response to the second user operation, the round display window on the first user interface in a process of dragging the display window; and skipping displaying the critical information of the second application in the dragged round display window.

14. The method of claim 8, further comprising:

obtaining updated critical information of the second application periodically after a second preset duration has elapsed;

displaying the display window in the first shape in the content display area when the critical information of the second application is updated; and displaying the updated critical information of the second application and the identification information of the second application in the display window in the first shape in the content display area.

15. The method of claim 8, wherein there are a plurality of pieces of critical information of the second application, and the method further comprises alternately displaying the plurality of pieces of critical information of the second application in the display window in the first shape in the content display area.

16. The method of claim 8, further comprising displaying a second user interface in response to a third user operation performed on the display window, wherein the second user interface is an interface of the second application or an interface of a third application, and wherein the third application is an application associated with the second application.

17. An electronic device, comprising:

one or more processors;

a display screen coupled to the one or more processors; and a memory coupled to the one or more processors, wherein the memory is configured to store instructions that, when executed by the one or more processors, cause the electronic device to be configured to:

display a first user interface on the display screen, wherein the first user interface is either an interface of a first application or is a home screen of the electronic device, and wherein the first user interface comprises a status bar and a content display area, wherein the status bar is a system-level status bar that displays system status information comprising at least one of a signal strength indicator, a battery status indicator, or a time indicator;

display a display window in a first shape in the content display area on the display screen, and display critical information of a transport code-related application in the display window in the first shape when the electronic device detects that a current location is within a travel station area range, wherein the critical information of the transport code-related application comprises an icon and station information of the transport code-related application and reminding information about opening the transport code-related application, and wherein a size of the first shape is less than ¼ of a size of the content display area; and display, in response to an operation dragging the display window in the first shape displayed in the content display area to the status bar, a capsule-shaped display window in the status bar on the display screen, wherein the capsule-shaped display window is bounded within a height dimension of the status bar and occupies only a portion of the status bar along a width direction of the display screen, and display identification information of the transport code-related application in the capsule-shaped display window.

18. The electronic device of claim 17, wherein the instructions, when executed by the one or more processors, further cause the electronic device to be configured to skip running the transport code-related application when the first user interface displays the display window.

19. The electronic device of claim 17, wherein the instructions, when executed by the one or more processors, further cause the electronic device to be configured to:

switch the display window in the first shape in the content display area to a rectangular display window in response to an operation of tapping the display window in the first shape; and display critical information comprising a transport code in the rectangular display window in the content display area on the display screen.

20. The electronic device of claim 17, wherein the instructions, when executed by the one or more processors, further cause the electronic device to be configured to:

switch the display window in the first shape in the content display area to a round display window when no operation performed on the display window in the first shape is detected within a first preset duration; and display the critical information of the icon or the station information of the transport code-related application in the round display window in the content display area on the display screen, wherein a display area of the round display window is smaller than a display area of the display window in the first shape.

* * * * *